(12) United States Patent
Kamiya et al.

(10) Patent No.: US 10,938,863 B2
(45) Date of Patent: *Mar. 2, 2021

(54) SECURE DOCUMENT MANAGEMENT THROUGH VERIFICATION OF SECURITY STATES OF INFORMATION PROCESSING APPARATUSES IN THE PEER-TO-PEER TRANSMISSION OF ENCRYPTED DOCUMENTS

(71) Applicant: FUJI XEROX CO., LTD., Tokyo (JP)

(72) Inventors: Shigeki Kamiya, Tokyo (JP); Tetsuo Iyoda, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 216 days.

This patent is subject to a terminal disclaimer.

(21) Appl. No.: 16/115,583

(22) Filed: Aug. 29, 2018

(65) Prior Publication Data
US 2019/0289039 A1 Sep. 19, 2019

(30) Foreign Application Priority Data
Mar. 15, 2018 (JP) .............................. JP2018-048162

(51) Int. Cl.
*H04L 29/06* (2006.01)
(52) U.S. Cl.
CPC ........ *H04L 63/205* (2013.01); *H04L 63/0428* (2013.01); *H04L 63/10* (2013.01)
(58) Field of Classification Search
CPC ... H04L 63/205; H04L 63/20; H04L 63/0428; H04L 63/04; H04L 63/10
See application file for complete search history.

(56) References Cited

U.S. PATENT DOCUMENTS 9,767,300 B2 * 9/2017 Keohane ............. G06F 21/6209
2007/0064675 A1 * 3/2007 Szucs ................... H04L 12/6418
370/352

(Continued)

FOREIGN PATENT DOCUMENTS

JP 2004171396 6/2004
JP 2007200276 8/2007

(Continued)

OTHER PUBLICATIONS

Office Action of Japan Counterpart Application, with English translation thereof, dated May 14, 2019, pp. 1-6.

*Primary Examiner* — Eleni A Shiferaw
*Assistant Examiner* — Stephanie S Ham
(74) *Attorney, Agent, or Firm* — Volpe Koenig

(57) ABSTRACT

An information processing system includes a first, second and management apparatus. The first apparatus stores an encrypted document, notifies the management apparatus of a first state of the first apparatus regarding information security requirements, sends information for specifying the first apparatus as a transmission source and information for specifying the second apparatus as a transmission destination to the management apparatus, requests transmission permission to the management apparatus, and transmits the encrypted document to the second apparatus when transmission permission is granted. The second apparatus notifies the management apparatus of a second state of the second apparatus regarding the information security requirements, and receives the encrypted document from the first apparatus. The management apparatus issues transmission permission for transmission of the encrypted document from the first to the second apparatus when both of the first and second states satisfy the information security requirements in response to the request for transmission permission.

17 Claims, 26 Drawing Sheets

(56) References Cited

U.S. PATENT DOCUMENTS

2017/0279625 A1\* 9/2017 Safa .................. H04L 67/06
2018/0089297 A1\* 3/2018 Dong .................. G06F 16/27

FOREIGN PATENT DOCUMENTS

| JP | 2007200276 A | \* | 8/2007 |
| JP | 2008117315 | | 5/2008 |
| JP | 2008117315 A | \* | 5/2008 |
| JP | 2010061390 | | 3/2010 |
| JP | 2010061390 A | \* | 3/2010 |
| JP | 2016139230 | | 8/2016 |
| JP | 2017052850 | | 3/2017 |
| JP | 2017052851 | | 3/2017 |
| JP | 2017052852 | | 3/2017 |
| JP | 2017052853 | | 3/2017 |
| JP | 2017180213 | | 10/2017 |

\* cited by examiner

| | MATCH | SPECIAL SETTING |
|---|---|---|
| A (COMPANY BATCH) | BB | O |
| D (SALES) | BB | O |
| D1 (TOKYO SALES OFFICE) | AA | O |
| SPECIAL AUDIT PROJECT G-Y-X-1 | CC | × |

FIG. 27

| ITEM NAME | CONTENT | SETTING SUBJECT |
|---|---|---|
| METADATA NUMBER | MANAGEMENT NUMBER OF METADATA | MANAGEMENT SYSTEM |
| METADATA TYPE | TYPE NAME/NUMBER OF METADATA (TAG 1 FOR eDoc TRANSMISSION) | TRANSMISSION SIDE PROCESSING APPARATUS |
| TRANSMISSION TIME | TRANSMISSION TIME OF TAG TRANSMISSION INSTRUCTION | TRANSMISSION SIDE PROCESSING APPARATUS |
| ENCRYPTION FLAG | WHETHER OR NOT TAG METADATA IS TO BE ENCRYPTED OR TO BE NON-DISCLOSED | TRANSMISSION SIDE PROCESSING APPARATUS |
| From) USER ID OF TRANSMITTING PERSON | USER ID OF TRANSMISSION DESTINATION | TRANSMISSION SIDE PROCESSING APPARATUS |
| From) USER NAME OF TRANSMITTING PERSON | DISPLAY NAME OF TRANSMITTING PERSON | TRANSMISSION SIDE PROCESSING APPARATUS |
| From) ID INFORMATION OF TRANSMISSION SIDE PROCESSING APPARATUS | ID OF TRANSMISSION SIDE PROCESSING APPARATUS AND ACCESS DESTINATION INFORMATION | TRANSMISSION SIDE PROCESSING APPARATUS |
| To) USER ID OF RECEIVING PERSON | USER ID OF TRANSMISSION DESTINATION | TRANSMISSION SIDE PROCESSING APPARATUS |
| To) USER NAME OF RECEIVING PERSON | DISPLAY NAME OF TRANSMISSION DESTINATION USER | TRANSMISSION SIDE PROCESSING APPARATUS |
| To) ID INFORMATION OF RECEPTION SIDE PROCESSING APPARATUS | ID OF RECEPTION SIDE PROCESSING APPARATUS AND ACCESS DESTINATION INFORMATION | MANAGEMENT SYSTEM |
| eDoc-ID (DID) | IDENTIFICATION INFORMATION OF eDoc | TRANSMISSION SIDE PROCESSING APPARATUS |
| TAG) TITLE OF TAG | TITLE CHARACTER STRING OF TAG | TRANSMISSION SIDE PROCESSING APPARATUS |
| TAG) COMMENT OF TAG | DISPLAY CONTENT OF TAG | TRANSMISSION SIDE PROCESSING APPARATUS |
| TAG) DISPLAY COLOR NUMBER | COLOR NUMBER (UNIVERSAL COLOR NUMBER SUCH AS WEB COLOR) | TRANSMISSION SIDE PROCESSING APPARATUS |
| TAG) SHAPE NUMBER | SHAPE TYPE NUMBER (PREDEFINED NUMBER OF RECTANGULAR SHAPE, HEART SHAPE, ARROW FEATHER, OR THE LIKE) | TRANSMISSION SIDE PROCESSING APPARATUS |
| TAG) VIEWED FLAG | VIEWING INCOMPLETION/COMPLETION FLAG | RECEPTION SIDE PROCESSING APPARATUS |
| TAG) DISPLAY STATE NUMBER (ASYNCHRONOUS) | 1. ATTACHMENT DISPLAY, 2. ATTACHMENT DYEING, 3. VACANCY, 4. MINIMUM ICON | RECEPTION SIDE PROCESSING APPARATUS |
| RESPONSE REQUEST FLAG | FLAG INDICATING WHETHER OR NOT RESPONSE IS REQUESTED | TRANSMISSION SIDE PROCESSING APPARATUS |

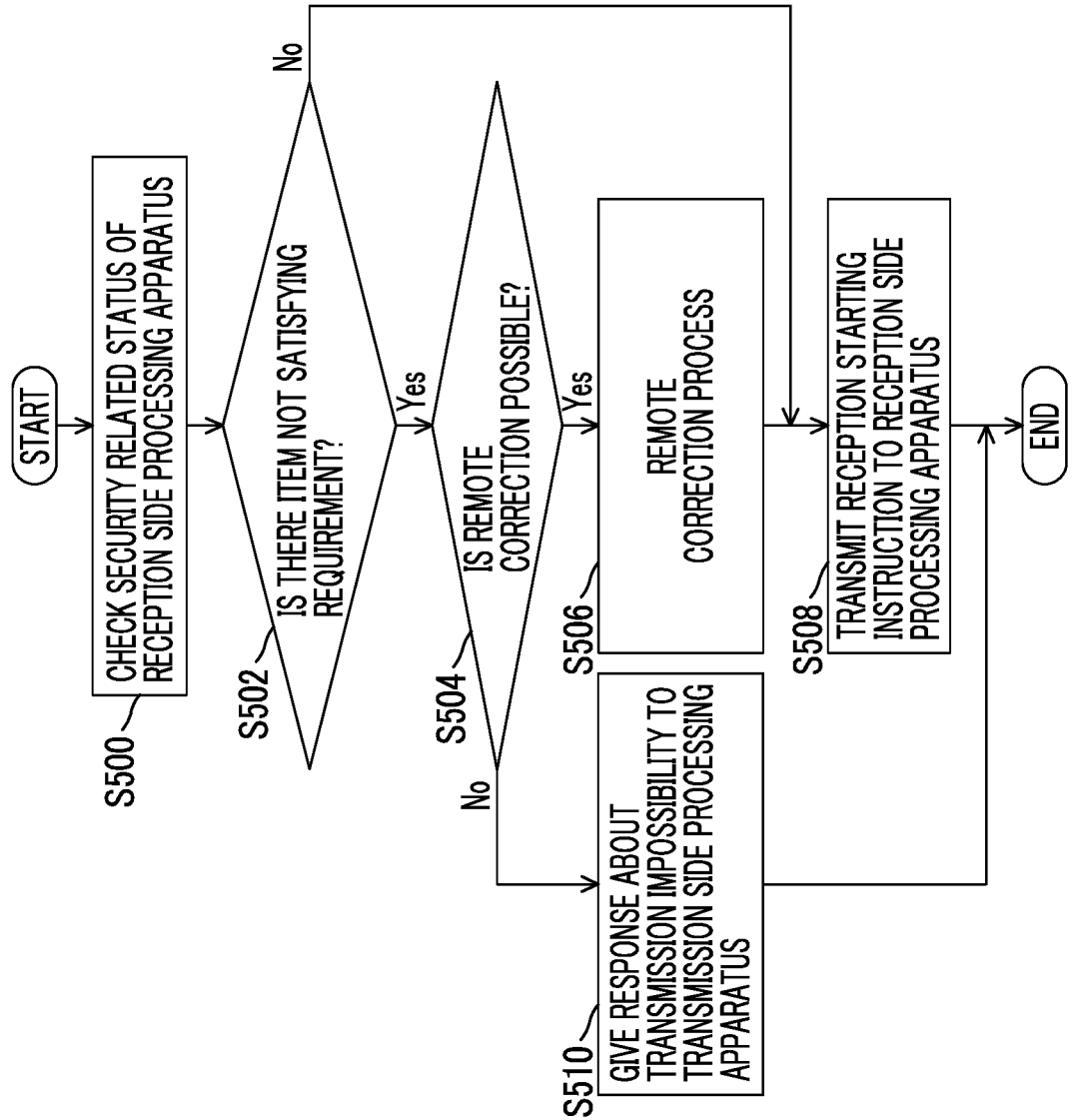

SECURE DOCUMENT MANAGEMENT THROUGH VERIFICATION OF SECURITY STATES OF INFORMATION PROCESSING APPARATUSES IN THE PEER-TO-PEER TRANSMISSION OF ENCRYPTED DOCUMENTS

CROSS-REFERENCE TO RELATED APPLICATIONS

This application is based on and claims priority under 35 USC 119 from Japanese Patent Application No. 2018-048162 filed Mar. 15, 2018.

BACKGROUND

(i) Technical Field

The present invention relates to an information processing system, an information processing apparatus, and a non-transitory computer readable medium storing a program.

(ii) Related Art

JP2016-139230A discloses a document management system which stores a document in a document storage unit together with attribute information such as a commodity regarding a content of the document, and stores access information regarding a person permitting to access to the document in an access information storage unit in correlation with the attribute information regarding the content of the document. In the document management system, in a case where an access reception unit receives a request for access to the document in the document storage unit, a requesting person information acquisition unit acquires requesting person information regarding a person requesting for the access to the document, and an access control unit controls the access request on the basis of the requesting person information regarding the access requesting person and the access information regarding the document.

JP2004-171396A discloses a method in which, in a case where a terminal apparatus accesses to document data, an authority checking unit acquires the access authority of an access source with reference to a database, and an invalidation processing unit converts the address of a link destination designated by a tag in the document data so as to invalidate the address. A cancellation processing unit compares the access authority checked by the authority checking unit with a security level set in the document data, and permits display of a link destination document by canceling the invalidation process on the link destination with a security level less than the access authority.

SUMMARY

In a method of transmitting data via one or more servers on a network in the middle of transmission, such as an electronic mail, there is a risk that the data leaks out of a server on a transmission path. In peer-to-peer data transmission, data is transmitted via only an apparatus in a lower layer close to a physical layer in a communication protocol hierarchy, and thus a risk of leakage in the middle of transmission is lower than in an electronic mail or the like.

However, even in peer-to-peer transmission, a transmission source apparatus and a transmission destination apparatus are often apparatuses of different users, and thus it is common that information security states (for example, a version update situation of an operating system or virus check software) and other states of the apparatuses are separately maintained and managed. Therefore, there may be a case where information security states of one or both of the transmission source apparatus and the transmission destination apparatus are not sufficient.

Aspects of non-limiting embodiments of the present disclosure relate to an information processing system, an information processing apparatus, and a non-transitory computer readable medium storing a program enabling even one of a transmission source apparatus and a transmission destination apparatus to prevent transmission of an encrypted document in a state in which an information security state is not sufficient.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing system including a first apparatus, a second apparatus, and a management apparatus, in which the first apparatus includes a storage unit that stores an encrypted document, a unit that notifies the management apparatus of a first state of the first apparatus regarding information security requirements, a permission request unit that sends information for specifying the first apparatus which is a transmission source and information for specifying the second apparatus which is a transmission destination to the management apparatus, and requests transmission permission to the management apparatus, and a transmission unit that transmits the encrypted document to the second apparatus in a case where transmission permission is obtained from the management apparatus in response to the request, in which the second apparatus includes a unit that notifies the management apparatus of a second state of the second apparatus regarding the information security requirements, and a reception unit that receives the encrypted document from the first apparatus in a case where transmission permission is obtained from the management apparatus in response to the request, and in which the management apparatus includes an issue unit that issues transmission permission for transmission of the encrypted document from the first apparatus to the second apparatus related to the request for transmission permission in a case where both of the first state sent from the transmission source first apparatus and the second state sent from the transmission destination second apparatus satisfy the information security requirements in response to the request for transmission permission from the first apparatus.

BRIEF DESCRIPTION OF THE DRAWINGS

Exemplary embodiment(s) of the present invention will be described in detail based on the following figures, wherein:

FIG. 27 is a diagram illustrating an example of a data structure of tag metadata; and FIG. 28 is a diagram illustrating an example of a procedure of checking a security requirement for the reception side processing apparatus, performed by the management system.

DETAILED DESCRIPTION

Prior to description of document transmission control according to exemplary embodiments of the invention, a document management system to which the transmission control is applied will be described. The document management system is similar to the document management systems exemplified in the specifications of JP2017-052850, JP2017-052851, JP2017-052852, JP2017-052853, and JP2017-180213 previously filed by the applicant.

Figure 1:
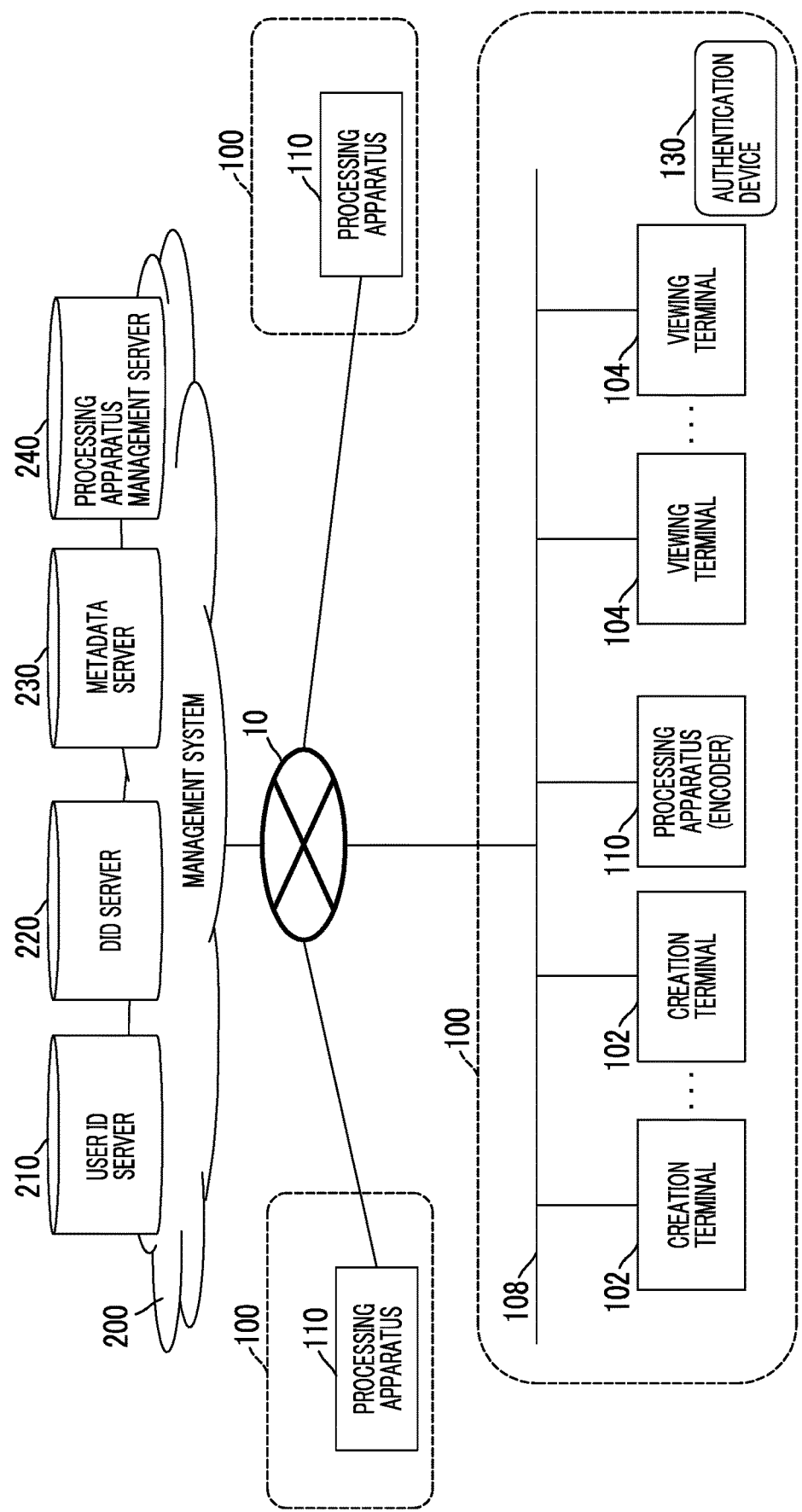
FIG. 1 is a diagram illustrating an example of a configuration of a document management system.

FIG. 1 illustrates a schematic configuration of a document management system.

In a case of a paper document, a person having the document may freely copy the document or hands the document to another person. A person acquiring the document may read the document. As mentioned above, a paper document has a considerably high risk of causing information leakage.

In contrast, the document management system is directed to reducing a risk of leakage of document information by providing an environment in which an electronic document may be securely used. Here, a document is content data which is distributable in a single unit (for example, a single file), and the type of data is not particularly limited. For example, a concept of the document includes text data, document data created by word processor software, spreadsheet data created by spreadsheet software, computer aided design (CAD) data, image data, video data, audio data, multimedia data, page data displayed by a web browser, and data which is created, edited, and viewed on a PC and is printed out.

The document management system includes a plurality of local systems 100 and a management system 200 which performs management of the local systems (particularly, management of a processing system which will be described later). The management system 200 may perform communication with each of the local systems 100 via a wide area network 10 such as the Internet.

The local system 100 includes one or more creation terminals 102, one or more viewing terminals 104, and a processing apparatus 110 connected to a local network 108. The local network 108 is a private network (configured with, for example, a LAN) provided in an organization such as a company, and is protected from the wide area network 10 by a firewall. A single processing apparatus 110 is fundamentally provided in the local system 100. In a case where a private network in an organization has a large scale, each network segment configuring the private network may be set as the local system 100, and a single processing apparatus 110 may be provided in each local system 100. For example, a network segment in a room of each department of a certain company serves as the local system 100 of the department, and a single processing apparatus 110 is provided in the segment. In this example, the local system 100 having the processing apparatus 110 as a core is formed in each company or each department of a company, and each processing apparatus 110 is managed by the management system 200 located at the center.

The creation terminal 102 is a terminal used to create a document, and is, for example, a desktop or notebook personal computer, a workstation, a tablet terminal, a smart phone, a multi-function peripheral, a scanner, a facsimile apparatus, or a digital camera. An application for creating and editing a document is installed in the creation terminal 102. Software for requesting the document management system to deliver a created document is installed in the creation terminal 102. Regarding of a form of installation of the software, the software may be installed as a device driver exchanging information with the processing apparatus 110 which will be described later, or may be installed by using a web application.

The processing apparatus 110 performs a protection process of converting a document created by the creation terminal 102 into a protected document (hereinafter, also referred to as an "eDoc file") in a form used in a secure environment provided by the document management system. The protection process can be said to be a process of encoding an original document with an eDoc, and the processing apparatus 110 is a kind of encoder in this meaning. In the protection process, a document is converted into data with a dedicated format designed for the system of the present exemplary embodiment, and is encrypted in a form of being able to be decrypted by only a user designated as a delivery destination of the document. Either format conversion or encryption may be performed first.

The processing apparatus 110 creates metadata of the protected document, and registers the created metadata in the management system 200 which is a host system. The metadata includes bibliographic matters of the protected document, information regarding a delivery destination, information regarding a key used for each delivery destination to decrypt the protected document, and the like. The metadata includes a plurality of items, and data is assigned, edited, or updated from a corresponding device or user according to a function provided by this service.

As an example, a user who instructs a document to be registered in the document management system designates some of the items, and the others are created by the processing apparatus 110. The management system 200 or the viewing terminal 104 may set values of some of the items of the metadata. The processing apparatus 110 transmits the generated protected document (eDoc file) to the viewing terminal 104 which is a delivery destination designated by a user.

The protected document, that is, an eDoc file is obtained by converting an original document into a document with a dedicated format which is then encrypted, and is also referred to as the entity of an eDoc. In order to view the eDoc file, corresponding to metadata is necessary. The eDoc file and the metadata are provided, and thus a complete protected document which is viewable is configured. As mentioned above, a set of the eDoc file and metadata corresponding thereto will be referred to as an "eDoc".

The processing apparatus 110 may have an access point function of a wireless LAN. In this case, the viewing terminal 104 may perform communication with the processing apparatus 110 via the wireless LAN.

The viewing terminal 104 is a terminal used to view a protected document (eDoc file). The term "viewing" mentioned here indicates using a protected document in an aspect corresponding to an information content indicated by the document. For example, in a case where a protected document has a document such as word processor data or a drawing as an information content, viewing is that a user reads or watches the document displayed by the viewing terminal 104. In a case where an information content indicated by a protected document is a voice, viewing is that a user listens to the voice reproduced by the viewing terminal 104. The viewing terminal 104 is configured, for example, by installing a viewer application for viewing a protected document in a general purpose computer such as a desktop or notebook personal computer, a workstation, a tablet terminal, or a smart phone. A terminal for viewing only such as an electronic book terminal, which has a function equivalent to that of the viewer application, may be used as the viewing terminal 104. The viewer application has a function of decrypting an encrypted protected document by using information of metadata, or decoding data represented by a dedicated format of a protected document into data in a readable state. A computer not having a viewer application corresponding to the document management system of the present exemplary embodiment may not decode data in a dedicated format into readable data.

The viewing terminal 104 may also have a function of receiving processing (editing) on a document from a user in addition to the function of decrypting and decoding a protected document. The processed document has a content which is different from that of an original protected document, but this edited document may be sent to the processing apparatus 110 from the viewing terminal 104 so as to be registered (that is, encoded into the protected document) in the document management system. As mentioned above, a single terminal may have both of the functions of the creation terminal 102 and the viewing terminal 104. Authority (access authority information in metadata which will be described later) permitted to a viewing person is set in the eDoc, and a content of the authority may include a restriction of writing to the eDoc, a restriction of a redistribution destination, and the like. In a case of an eDoc in which such restrictions are defined in access authority information, the viewing terminal 104 receives a processing (editing) operation from a viewing person only within a scope of the writing restriction, and receives designation of a redistribution destination of a new eDoc after being processed only within a scope of the restriction of a redistribution destination.

As an example, an authentication device 130 carried by a user is used as a tool for authenticating the user using the document management system. The authentication device 130 is a device, such as an IC card, which has identification information specific to the user carrying the device and performs data processing for user authentication in response to a request from an external apparatus. The authentication device 130 may be a portable terminal such as a smart phone having a function equivalent to that of an IC card for personal authentication. The viewing terminal 104 or the creation terminal 102 has a function of communicating with the authentication device 130 by using a wireless communication protocol such as Near Field Communication (NFC). The viewing terminal 104 or the creation terminal 102 exchanges information for user authentication with the authentication device 130 according to a predetermined protocol, and thus authenticates the user carrying the authentication device 130. Alternatively, there may be a method in which a server side of the document management system of the present exemplary embodiment, such as the processing apparatus 110 or the management system 200, performs actual user authentication, and the viewing terminal 104 or the creation terminal 102 relays data transmission between the server side and the authentication device 130. The viewing terminal 104 or the creation terminal 102 may have the function of the authentication device 130.

The management system 200 manages the processing apparatus 110 in each local system 100. The management system 200 manages metadata of the protected document generated by each processing apparatus 110, and provides the metadata to the viewing terminal 104 in response to a request. The management system 200 is configured with a single computer or a plurality of computers communicable with each other, and has functions of a user ID server 210, a DID server 220, a metadata server 230, and a processing apparatus management server 240.

The user ID server 210 is a server managing information regarding each user using the document management system. There are two hierarchies in users using the document management system. One is a contractor making a contract for using the document management system with an administrator of the document management system, and the other is a general user who registers or views a document by actually using the system under the contract. For example, a case is often supposed in which a company is contractor, the processing apparatus 110 is provided on the local network 108 of the company, and an employee of the company uses the document management system via the processing apparatus 110 as a general user. The user ID server 210 holds and manages information regarding each of a contractor and a general user.

The DID server 220 manages document ID (DID) which is identification information (ID) of a protected document. The processing apparatus 110 creating a protected document actually assigns a DID to the protected document, but the DID server 220 assigns DID issue authority and an issue scope (number of issues) to the processing apparatus 110, and receives and records a report of a DID which is actually issued by the processing apparatus 110 within the issue authority and issue scope. Consequently, the DID server 220 can suppress the occurrence of an illegal DID, and can detect a document having an illegal DID.

The metadata server 230 holds and manages metadata of a protected document (eDoc file) generated by the processing apparatus 110. In a case where metadata of a protected document is requested from a user via the viewing terminal 104, and the user is an authorized person, the metadata server 230 provides the metadata to the viewing terminal 104. The case where a user (viewing person) requesting metadata is an "authorized person" in the metadata server 230 is a case where a combination of the user and the viewing terminal 104 used when the user issues the request corresponds to a combination of a delivery destination user indicated by delivery destination information (which will be described later in detail) in metadata which is held in the metadata server 230 in correlation with a DID (included in the request) of the eDoc file, and the viewing terminal 104 which is a delivery destination.

The processing apparatus management server 240 is a server managing a status (state) of each processing apparatus 110.

Figure 2:
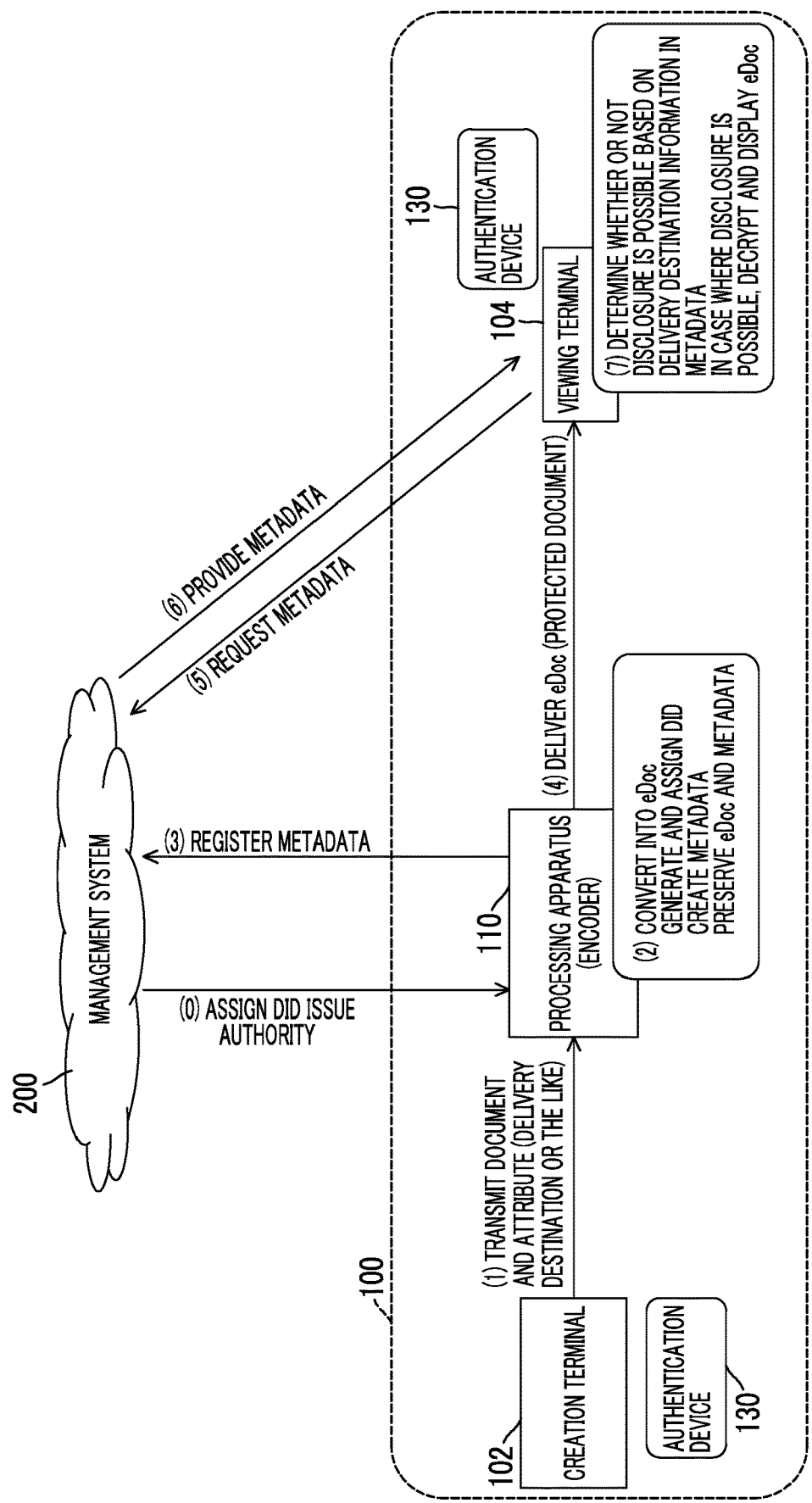
FIG. 2 is a diagram for explaining a summary of delivery and viewing of a document using the document management system.

With reference to FIG. 2, a structure of the document management system will be schematically described.

(0) The management system 200 (DID server 220) assigns in advance, to the processing apparatus 110 of the local system 100, issue authority for a DID (document ID) and an issue scope (number of documents) associated therewith. The DID issue authority is not unlimited, and is limited to the issue scope from the management system 200. In other words, the processing apparatus 110 can assign a DID based on the issue authority assigned together to a document up to a number indicated by the issue scope assigned by the management system 200. In a case where the issue scope is exhausted, the processing apparatus 110 is assigned with new issue authority and issue scope from the management system 200.

(1) In a case where a user wants a document to register (that is, deliver) in the document management system, the user instructs the creation terminal 102 to register the document (for example, gives an instruction for "registration" on a menu of an application). The creation terminal 102 having received the instruction requests user authentication. This authentication may be performed by inputting a user ID and a password, and may be performed by the user making the authentication device 130 come close to a card reader of the creation terminal 102. The user authentication may be performed by the creation terminal 102, and may be performed by the processing apparatus 110 which is a document registration destination. The user selects a document to be registered in the document management system from among documents held in the creation terminal 102, and gives an instruction for registration thereof.

In a case where a document registration instruction is received from the user, the creation terminal 102 (more specifically, a registration processing program installed in the creation terminal 102) receives input of an item (for example, a delivery destination of a document) to be designated by the user from attribute data regarding the document. Here, designation of a combination of the user and the viewing terminal 104 may be received as a delivery destination. In this case, in a case where a combination of the user and the viewing terminal 104 used for the user to view a document matches a combination designated as a delivery destination, the user can view the document.

The creation terminal 102 transmits attribute data obtained by combining attribute items such as a delivery destination input by the user with other attribute items (for example, information regarding a registration person and the creation date and time) created by the creation terminal 102, to the processing apparatus 110 along with data of the document. The creation terminal 102 may include a driver which converts documents with various formats created by various applications into a unified format which can be handled on the viewing terminal 104 side. For example, in a case of data indicating a static document image, such as word processor data, a spreadsheet, or CAD data, the driver converts the data into a document expressed in a page description language, such as a printer driver. For example, in a case where original data is audio data, the driver converts the audio data into data (document) with a specific audio data format with which the document management system (particularly, the viewing terminal 104) of the present exemplary embodiment copes.

(2) The processing apparatus 110 performs a protection process on a registration target document received from the creation terminal 102, so as to generate a protected document (eDoc file). In this generation, the received document is encoded into a dedicated format of the document management system, and the encoded data is encrypted by using a generated encryption key such that an eDoc file is generated. Orders of encoding and encryption may be reversed. The processing apparatus 110 assigns a unique DID to the eDoc. The DID includes information (an issue authority key which will be described later) for certifying that the DID is based on the issue authority received from the management system 200 and information (an issue proof key which will be described later) for certifying that the DID is assigned by the processing apparatus 110. A detailed example of a data structure of the DID will be described later. The generated DID is incorporated into an eDoc file (for example, as a first item of property of the file).

The processing apparatus 110 generates metadata corresponding to the generated eDoc file. The metadata includes the attribute data received from the creation terminal 102 along with the document, and attribute items (for example, the DID, an ID of the processing apparatus, the encoding date and time, and an encryption key information) generated by the processing apparatus 110. The encryption key information included in the metadata is information indicating a key for decrypting the eDoc file. In a case where a common key method is used for encryption, the encryption key information is information indicating a common key. However, in a case where the common key is included in the metadata in plaintext, there is concern that the common key may be abused due to eavesdropping or interception, and thus a result of encrypting the common key with a public key of a delivery destination user is incorporated into the metadata as encryption key information.

The processing apparatus 110 preserves the generated eDoc file and metadata in an internal database.

(3) The processing apparatus 110 transmits the generated metadata to the management system 200, and registers the metadata therein. The management system. 200 (metadata server 230) preserves the received metadata.

(4) The processing apparatus 110 delivers the generated eDoc file to the viewing terminal 104 designated as a delivery destination. This delivery may be of a push type, may be of a pull type, and may be of both of the two types (for example, an eDoc is created and is delivered in a push type, and the viewing terminal 104 which is not activated at that time and thus receives the eDoc in a pull type). The delivery is performed via the local network 108 in the local system 100.

(5) The eDoc file received by the viewing terminal 104 is protected through encryption or the like, and thus may not be viewed in the current state. In a case where the user wants to view the eDoc file with the viewing terminal 104, the user makes the authentication device 130 thereof come close to the card reader of the viewing terminal 104 so as to receive user authentication, and then gives an instruction for viewing of the eDoc on a screen of the viewing terminal 104. The viewing terminal 104 having received the instruction accesses the management system 200, and requests the metadata of the eDoc. The request includes the DID of the eDoc.

(6) The management system 200 (metadata server 230) transmits the latest metadata of the eDoc requested from the viewing terminal 104 to the viewing terminal 104.

(7) In a case where the requested metadata is received from the management system 200, the viewing terminal 104 determines whether or not a combination of the viewing terminal 104 and the user (authenticated with the authentication device 130) currently using the viewing terminal 104 is included in delivery destination information included in the metadata. In a case where the combination is not included, the user has no authority to view the eDoc with the viewing terminal 104, and thus the viewing terminal 104 does not open the eDoc file, and displays an error message indicating that there is no viewing authority. In a case where the combination is included, the user has authority to view the eDoc file with the viewing terminal 104. In this case, the viewing terminal 104 decrypts the eDoc file by using encryption key information included in the metadata, and displays the eDoc file on a screen (that is, outputs the eDoc file in an aspect corresponding to an information content of the eDoc file).

The expiration date may be set in the metadata. The expiration date is obtained by adding a defined valid period or a valid period designated by a delivering person to the date and time at which the metadata is transmitted. After the expiration date of the metadata elapses, the viewing terminal 104 may not open (decrypt and display) a corresponding eDoc file unless metadata is acquired again from the management system 200. In a case where the viewing terminal 104 is communicable with the processing apparatus 110 or the management system 200, the viewing terminal 104 acquires the latest metadata at the time of an instruction of an eDoc file which is instructed to be viewed from the processing apparatus 110 or the management system 200, and determines whether or not viewing is possible on the basis of the latest metadata.

There is a case where metadata is initially registered in the management system 200, and then delivery destination information or access authority information included in the metadata is changed by a delivering person or a person (for example, a person having authority to edit data) having authority to change a delivery destination. In a case where even a user designated as a delivery destination at the time of creation and registration of an eDoc is excluded from the delivery destination due to the subsequent change, the viewing terminal 104 detects the exclusion on the basis of delivery destination information included in the latest metadata acquired from the management system 200, and does not display the eDoc file.

Next, with reference to FIG. 3, a description will be made of an example of a data content of metadata 300 of an eDoc.

Among items included in the metadata 300, first, a "DID" is a document ID assigned by the processing apparatus 110 generating the eDoc. A "document name" is a name or a title of the eDoc.

A "delivering person ID" is a user ID of a person delivering the eDoc, that is, a person (hereinafter, referred to as a delivering person) who performs a document registration operation on the processing apparatus 110 from the creation terminal 102, and performs delivery via the processing apparatus 110.

The "encode date and time" is the date and time at which a document from the creation terminal 102 is encoded (protection process), and an eDoc thereof is created. A "processing apparatus ID" is identification information of a processing apparatus performing the protection process. "Encryption information" is information regarding encryption at the time of generation of the eDoc, and includes a software name used for encryption, a version of the encryption software, and key information indicating a key for canceling the encryption (that is, decryption). Key information is obtained, for example, by encrypting a key for decryption with a public key of each delivery destination user. "Keyword information" is a list of keywords extracted from the eDoc (or original data). For example, the keyword information is used to retrieve an eDoc.

"Delivery destination information" is information indicating a user and a viewing terminal designated as a delivery destination of the eDoc by the delivering person. In the example illustrated in FIG. 3, the delivery destination information includes a user ID of a user and an ID (identification information) of the viewing terminal 104 for the user to view the eDoc for each user of a delivery destination. In a case where a plurality of viewing terminals 104 which are able to be used for the user to view the eDoc are designated, a set of a user ID of the user and IDs of the plurality of viewing terminals 104 is incorporated into delivery destination information.

As another example, in a case where a delivery destination user is able to view the eDoc by using any one of the viewing terminals 104 designated as delivery destinations, delivery destination information includes a list of IDs of delivery destination users and a list of IDs of the viewing terminals 104 of delivery destinations. For example, there is a case where a shared terminal of a department or a terminal provided in a room or a conference room of the department is supposed as a candidate of the viewing terminal 104 which is a delivery destination. The shared terminal or the terminal provided in the room (this is also a kind of shared terminal) may be used by any user in an organization, but a delivering person knows at least the kind of terminal, and also knows that there is a low possibility that the terminal is taken outside the organization. The terminal is appropriate as a delivery destination of a secret document. In a case where an eDoc is used in the shared terminal of which the feature is known as mentioned above, there may be a usage form in which a delivery destination user is able to use any of the viewing terminals 104 designated as delivery destinations.

"Access authority information" is information indicating usage authority for the eDoc assigned to a delivery destination user by the delivering person.

An "offline valid period" is information indicating a length of a valid period of the metadata. In other words, even when the viewing terminal 104 is in a state of not being able to access the management system 200 (offline state), in a case where there is metadata which is acquired during previous viewing of the eDoc and is cached, and the "offline valid period" from the acquisition date and time of the metadata does not elapse, the viewing terminal 104 decrypts the eDoc by using encryption key information of the metadata and displays the eDoc. On the other hand, in a case where an offline valid period of cached metadata for an eDoc instructed to be viewed has already elapsed in an offline state, the viewing terminal 104 does not decrypt the eDoc and thus does not display the eDoc. While the viewing terminal 104 is able to access the management system 200 (that is, an online state), in a case where a user gives an instruction for viewing of an eDoc, the viewing terminal 104 acquires and uses the latest metadata of the eDoc from the management system 200 (particularly, the metadata server 230).

"Original data information" includes information indicating whether or not original data before an eDoc is generated (encoded) is preserved, and information (for example, a uniform resource locator: URL) indicating a location where the original data is preserved in a case where the original data is preserved. The original data here is a document (before a protection process is performed) sent from the creation terminal 102 to the processing apparatus 110, application data (for example, in a case where a document is page description language data, data of word processor software before being converted into the data) which is a basis of the document, or both of the two.

The "document acquisition date and time" is the date and time at which the viewing terminal 104 acquires a file (that is, an eDoc file) of entity data of the eDoc. The "metadata acquisition date and time" is the date and time at which the viewing terminal 104 acquires the latest metadata of the eDoc which is currently cached from the management system 200. The document acquisition date and time and the metadata acquisition date and time are not included in metadata held in the management system 200, and the viewing terminal 104 adds the date and time to metadata acquired from the management system 200 in order to manage the metadata.

Figure 3:
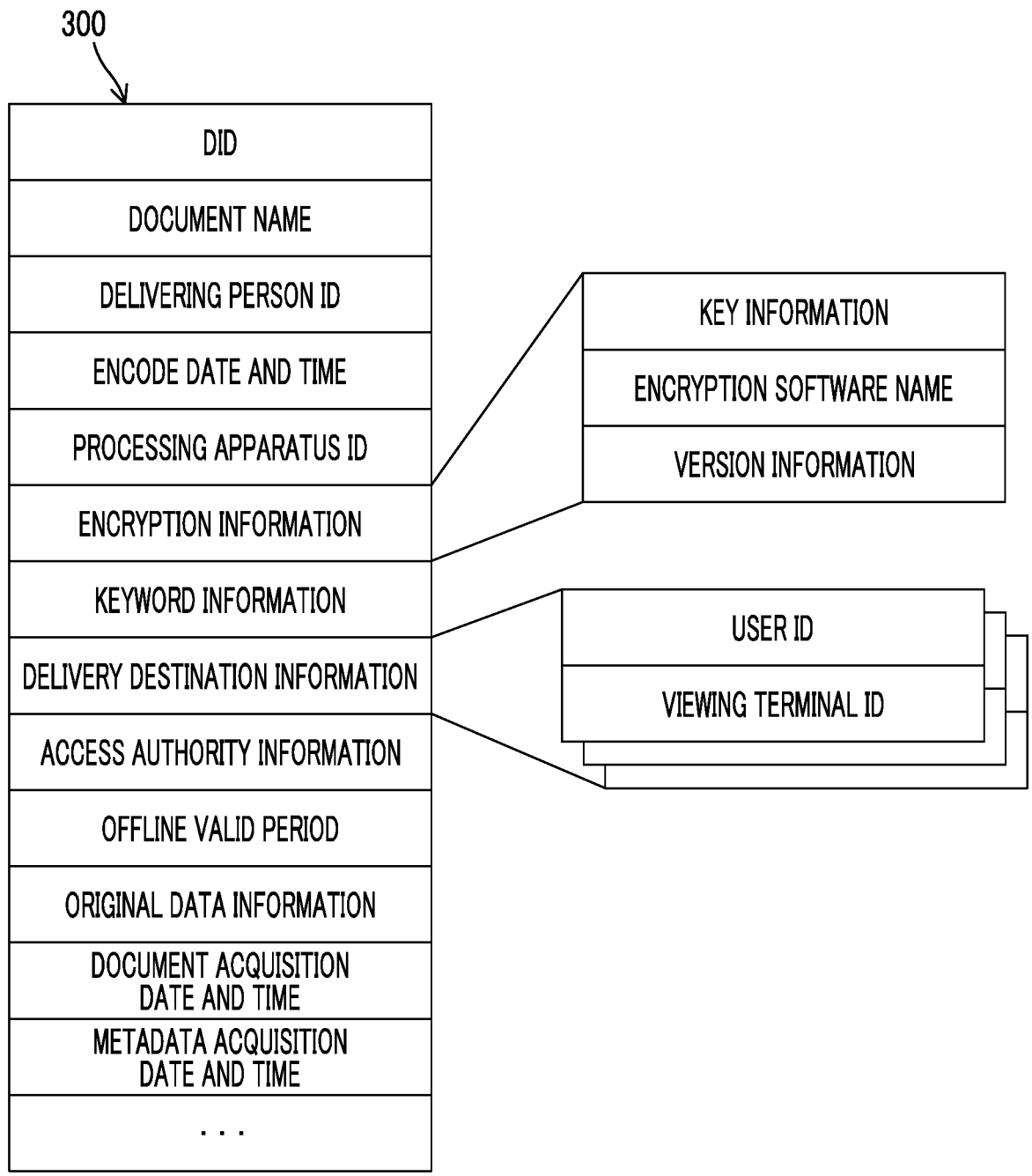
FIG. 3 is a diagram illustrating an example of a data content of metadata.

Among the items of metadata illustrated in FIG. 3, the DID, the encode date and time, the processing apparatus ID, the encryption information, and the keyword information are information generated by the processing apparatus 110. The document name, the delivering person ID, the delivery destination information, the access authority information, the offline valid period, and the original data information are derived from a document or attribute data sent from the creation terminal 102 to the processing apparatus 110.

Next, a description will be made of an example of a data content of information managed by each of the servers 210 to 250 of the management system 200.

Figure 4:
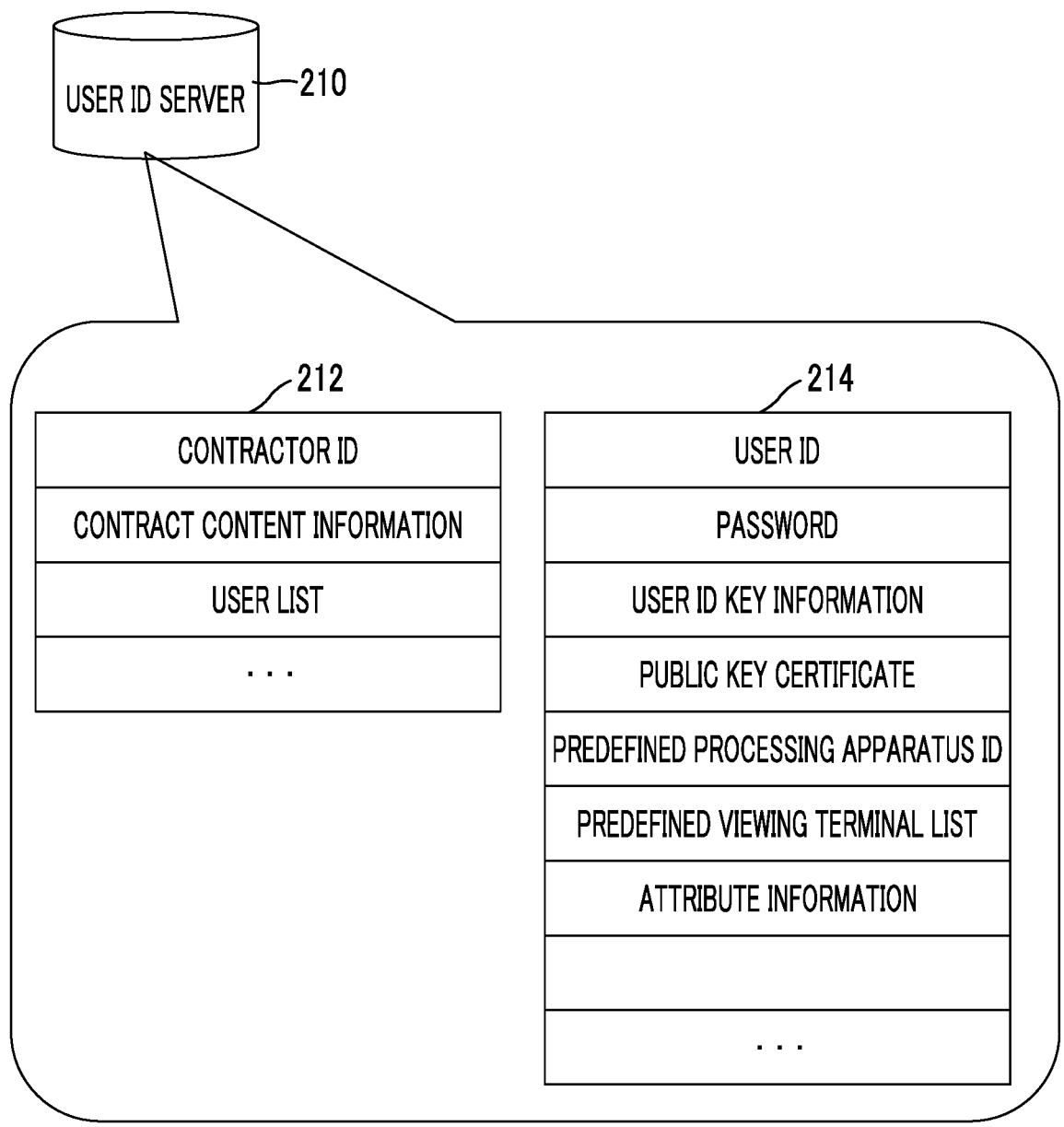
FIG. 4 is a diagram illustrating an example of a data content managed by a user ID server.

First, with reference to FIG. 4, a description will be made of an example of a data content managed by the user ID server 210. Contractor data 212 of each contractor and user data 214 of each general user are registered in the user ID server 210.

The contractor data 212 includes a contractor ID, contract content information, and a user list. The contractor ID is identification information of a contractor (for example, an organization or a department of the organization) making a contract with an administrator of the document management system. The user list is a list of user IDs of general users (for example, members belonging to the organization which is the contractor) using the document management system due to the contract of the contractor.

The general user data 214 includes a user ID, a password, user ID key information, a public key certificate, a predefined processing apparatus ID, a predefined viewing terminal list, and belonging information of the general user. The user ID key information is authentication information used by the authentication device 130 of the user. The public key certificate is a digital certificate for certifying a public key of the user. The predefined processing apparatus ID is an ID of the processing apparatus 110 in which the user is registered. Typically, the user is registered in the processing apparatus 110 placed in an office to which the user belongs, and the processing apparatus 110 is a predefined processing apparatus to the user. The predefined viewing terminal list is a list of IDs of one or more viewing terminals which are frequently used by the user. The viewing terminals included in the list are candidates of delivery destination terminals in a case where an eDoc is delivered to the user. The belonging information is information for specifying an organization or a department to which the user belongs, and is, for example, a contractor ID of the organization or the department.

Next, with reference to FIG. 5, a description will be made of a data content managed by the DID server 220.

Figure 5:
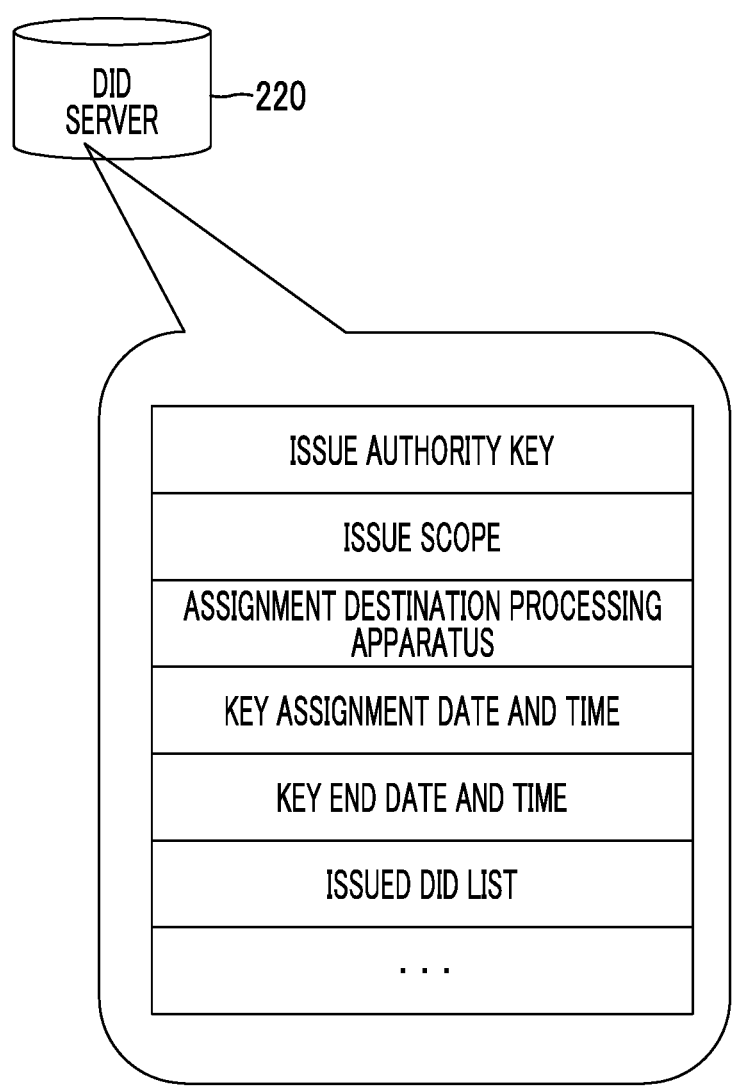
FIG. 5 is a diagram illustrating an example of a data content managed by a DID server.

As illustrated in FIG. 5, the DID server 220 holds information of respective items of an issue scope, an assignment destination processing apparatus, the key assignment date and time, the key end date and time, and an issued DID list, for each an issue authority key which is issued to a processing apparatus.

The issue authority key is key information (for example, a character string generated at random) for certifying DID issue authority which is assigned to the processing apparatus 110 by the DID server 220. The processing apparatus 110 causes the issue authority key assigned by the DID server 220 to be included in a DID issued thereby, and thus certifies that the DID is issued under the authorized issue authority.

The issue scope is a DID issue upper limit number (an upper limit number of documents to which DIDs are able to be assigned) assigned to the processing apparatus 110 along with the issue authority key. In a case where the pair of issue authority key and the issue scope is assigned by the DID server 220, the processing apparatus 110 can assign each unique DID to eDocs up to the upper limit number indicated by the issue scope.

The assignment destination processing apparatus indicates an ID of the processing apparatus 110 which is an assignment destination of the issue authority key (and the issue scope). The key assignment date and time is the date and time at which the issue authority key is assigned to the processing apparatus 110. The key end date and time is the date and time at which the assignment destination processing apparatus 110 uses up the issue authority key. In other words, the key end date and time is the date and time at which assignment of DIDs to eDocs of an upper limit number indicated by the issue scope assigned along with the issue authority key ends in the processing apparatus 110. In a case where a structure is employed in which the processing apparatus 110 uses up the issue scope, and then requests the next issue authority key and issue scope to the DID server 220, instead of explicitly recording the key end date and time of a certain issue authority key (referred to as a first key), the processing apparatus 110 may use the key assignment date and time of an issue authority key assigned following the issue authority key as the key end date and time of the first key. The issued DID list is a list of DIDs issued by the assignment destination processing apparatus 110 by using the issue authority key and issue dates thereof. The assignment destination processing apparatus 110 notifies the DID server 220 of a DID whenever the DID is issued by using the issue authority key, and the DID server 220 adds the received DID and an issue date thereof to an issued DID list corresponding to an issue authority key included in the DID.

The metadata server 230 preserves metadata of each eDoc sent from each processing apparatus 110. A data content of the preserved metadata is the same as that exemplified in FIG. 3. However, among the items of the metadata exemplified in FIG. 3, items (the document acquisition date and time, the metadata acquisition date and time, and the like) used by only the viewing terminal 104 are not managed by the metadata server 230.

Next, with reference to FIG. 6, a description will be made of data managed by the processing apparatus management server 240. The processing apparatus management server 240 stores a status history 242 of the processing apparatus 110 for each management target processing apparatus 110. The status history includes information regarding a status 244 of the processing apparatus 110 at a creation and individual update time point (creation/update date and time) in correlation with an ID of the processing apparatus 110.

The status 244 at an individual time point includes an installation location, a contractor ID, a manager name, a manager contact, a registered user list, software information 246, hardware information 248, a disk available capacity, and security certificate information. The installation location is information indicating an installation location of the processing apparatus 110, and includes information such as an address, a building name, or the number of stories. The contractor ID is an ID of a contractor using the processing apparatus 110. The manager name is a name of a manager of the processing apparatus 110. The manager is a user managing the processing apparatus 110 in a department or the like which is an installation destination of the processing apparatus 110. The manager contact is information (for example, an electronic mail address) regarding a contact of the manager. The registered user list is a list of user IDs of users (in other words, users using the processing apparatus 110 as a "predefined processing apparatus") registered in the processing apparatus 110.

The software information 246 includes an encode software name, an encode software version, an encryption software name, an encryption software version, and names and versions of other pieces of software installed in the processing apparatus 110. Here, the encode software is software which converts (encodes) a document input from the creation terminal 102 into a document with a dedicated format of the document management system. The encryption software is software which encrypts a document (for example, a document having a dedicated format through conversion).

The hardware information 248 includes items such as encode circuit information, an encode circuit FW version, and a manufacturer name of the processing apparatus 110. The encode circuit information is information indicating a model number of a hardware circuit used for encode processing. The encode circuit FW version is a version of firmware (FW) of the encode circuit.

The disk available capacity is an available capacity at the time of a secondary storage device such as a hard disk or a solid state drive of the processing apparatus 110.

The security certificate information is information (for example, information such as a subject identifier of the certificate, an issuer identifier, and the issue date and time) for specifying each security certificate installed in the processing apparatus 110 at that time.

Although not illustrated to avoid complexity, the status 244 includes the types of fonts (a list of font names) installed in the processing apparatus 110, an address (for example, an IP address) for network communication, a device ID of amounted secondary storage device (a hard disk drive or the like), information indicating a customization content for connecting the processing apparatus 110 to a process of a backbone system of an installation destination organization, and the installation date and time of an encryption key (used for communication path encryption or signature) used by the processing apparatus 110.

Figure 7:
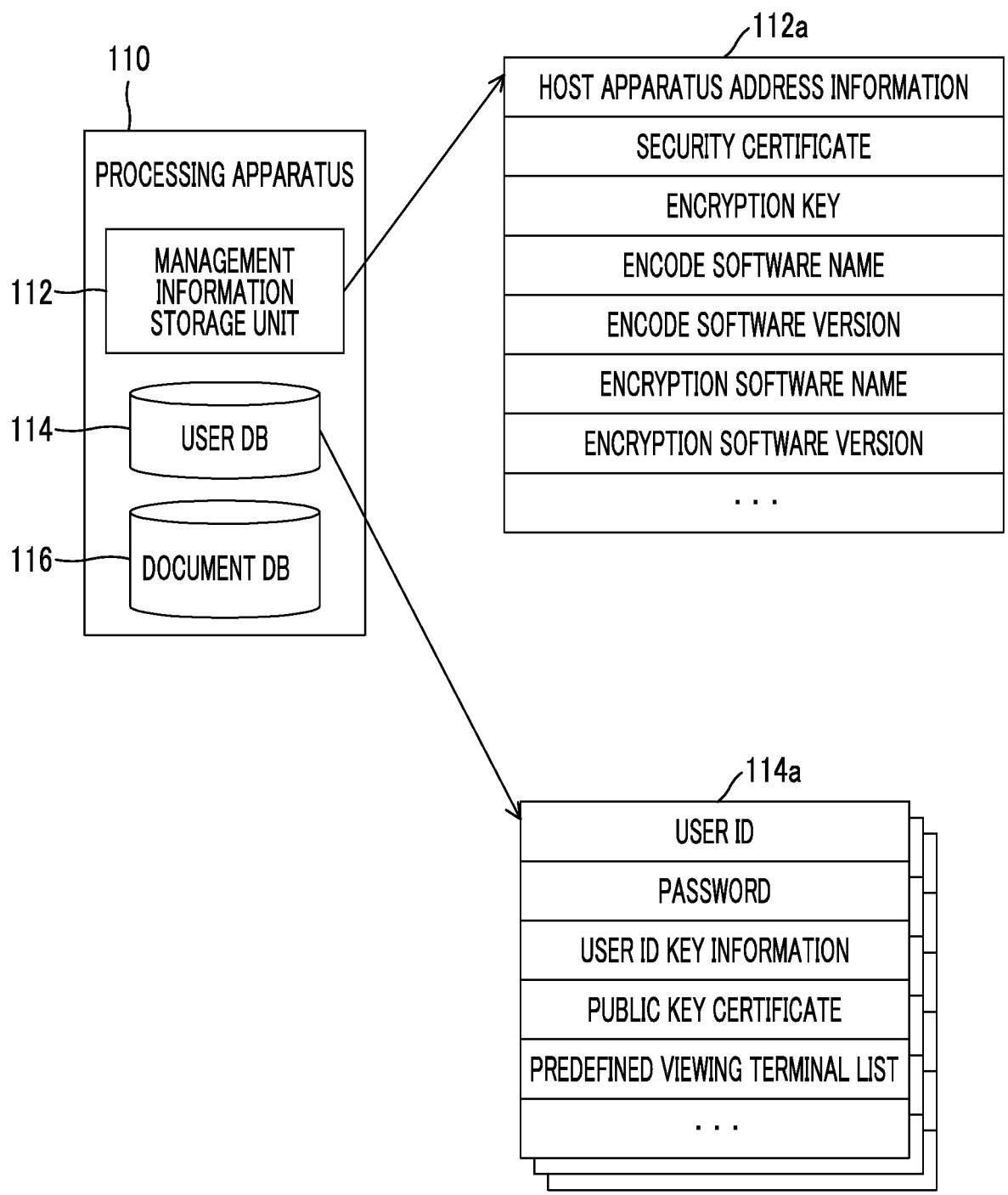
FIG. 7 is a diagram illustrating examples of a configuration of the processing apparatus and a data content of the processing apparatus.

Next, with reference to FIG. 7, a description will be made of a database group held in the processing apparatus 110. As illustrated, the processing apparatus 110 includes a management information storage unit 112, a user DB 114, and a document DB 116.

Management information 112a is stored in the management information storage unit 112. The management information 112a includes items such as host apparatus address information, a security certificate, an encryption key, an encode software name, an encode software version, an encryption software name, and an encryption software version. The host apparatus address information is information such as a communication address (for example, an IP address or a URL) of each host apparatus managing the processing apparatus 110. The management system 200 or each of the servers 210 to 240 thereof, or an in-organization management system 150 or each of servers 152 to 156 thereof which will be described later is an example of a host apparatus. The security certificate is a digital certificate used for the processing apparatus 110 to perform secure communication conforming to a public key base with other apparatuses on a network. The processing apparatus 110 holds a security certificate of each host apparatus as a partner with which frequent communication is performed. A security certificate of each user using the creation terminal 102 or the viewing terminal 104 may be held. The encryption key is an encryption key of the processing apparatus 110 used for encryption or decryption in order for the processing apparatus 110 to perform communication with other apparatuses on a network or for the purpose of digital signature (or generation of certification information similar thereto) put by the processing apparatus 110, and is, for example, a pair of a secret key and a public key assigned to the processing apparatus 110 on a public key basis. The encode software and the encryption software are respectively pieces of software for encoding (conversion into a dedicated format) and encryption installed in the processing apparatus 110.

User information 114a of each user (in other words, a user using the processing apparatus 110 as a "predefined processing apparatus") registered in the processing apparatus 110 is stored in the user DB 114. The user information 114a of each registered user includes items such as a user ID, a password, a user ID key information, public key information, and a predefined viewing terminal list. Such items have been described in the description (refer to FIG. 4) of the data held in the user ID server 210.

The document DB 116 preserves an eDoc file generated by the processing apparatus 110 and metadata corresponding to the eDoc file. The eDoc file and the metadata include information regarding a DID, and may thus be correlated with each other. Original data (data received from the creation terminal 102) before being encoded into an eDoc may be registered in the document DB 116 in correlation with a DID of the eDoc.

The creation terminal 102 and the viewing terminal 104 stores, for each user using the terminals, authentication information (a user ID, a password, or the like) of the user, an ID of a predefined processing apparatus, address information of the predefined processing apparatus, address information of a host apparatus (for example, the management system 200 or the in-organization management system 150 which will be described later), a security certificate of the processing apparatus or the host apparatus, an encryption key used for communication path encryption, and the like.

Flow of Process in System

In a case where the processing apparatus 110 is provided on the local network 108, a maintenance worker performing maintenance of the processing apparatus 110 registers information regarding a user using the processing apparatus 110 or information regarding the creation terminal 102 or the viewing terminal 104 which may be used by the user. The registered user information is also transmitted to and registered in the user ID server 210 (or the local user ID server 152 which will be described later) which is a host apparatus. After installation, in a case where the number of users using the processing apparatus 110 is increased or decreased, the maintenance worker performs work of adding and registering information regarding a new user to the processing apparatus 110 or deleting registration of information regarding a user not using the processing apparatus 110. A host apparatus such as the user ID server 210 is also notified of such addition or deletion, and, as a result, information held in the host apparatus is updated. The maintenance worker installs, in each creation terminal 102, software (for example, the software has a form of a device driver of the processing apparatus 110) which performs a process of requesting registration and delivery of a document to the processing apparatus 110. The maintenance worker registers information (for example, an apparatus name, a communication address, and wireless access setting) for communication with the processing apparatus 110 in each viewing terminal 104.

Next, with reference to FIG. 8, a description will be made of a flow of a process in a case where a document is registered and delivered via the document management system.

(1)-1: In a case where a user (delivering person) instructs the creation terminal 102 to register a document, the creation terminal 102 displays a screen for requesting input of login authentication information (for example, a user ID and a password or the authentication device 130). In a case where the delivering person inputs authentication information in response to the request, the creation terminal 102 transmits the authentication information to the processing apparatus 110 via the local network 108.

(1)-2: The processing apparatus 110 having received the login authentication information performs user authentication by using the information. Herein, it is assumed that the user authentication is successful (it is confirmed that the delivering person is an authorized user). In the illustrated example, login authentication is performed by using a login ID and a password, but, in a case where the creation terminal 102 copes with communication with the authentication device 130, login authentication may be performed by using the authentication device 130.

(2)-1: In a case where the login authentication is successful, the user selects a document desired to be registered in the document management system (and desired to be delivered to another user) from among documents held in the creation terminal 102, and instructs the document to be registered in the processing apparatus 110. Then, the software (for example, a device driver) serving as an interface with the processing apparatus 110 is activated, receives input of attribute data of the document from the user, and transmits the received attribute data and data of the document to the processing apparatus 110.

Figure 9:
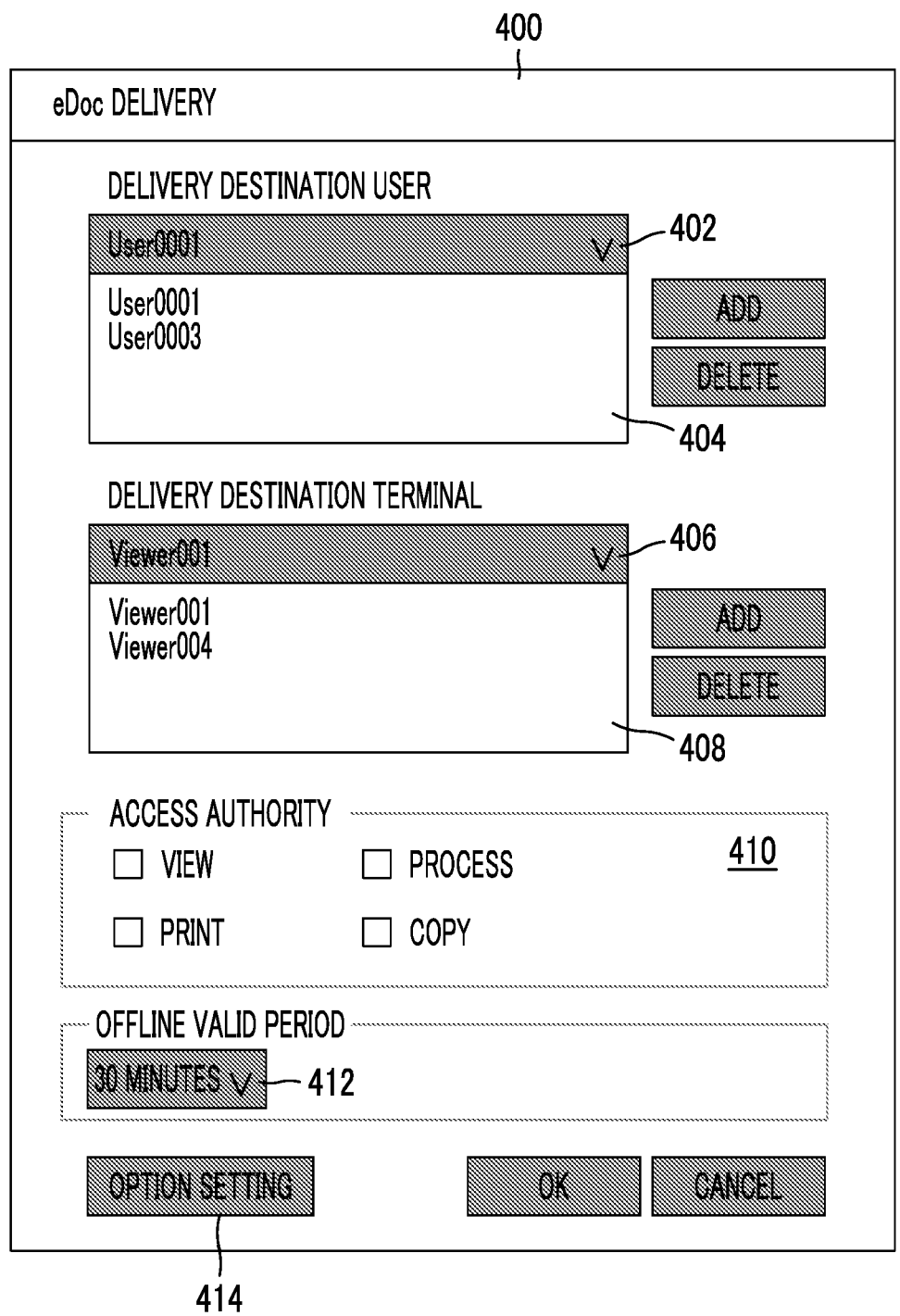
FIG. 9 is a diagram illustrating an example of an input screen for attribute data.

FIG. 9 illustrates an example of an input screen 400 for the attribute data. The input screen 400 includes a delivery destination user selection menu 402, a delivery destination user list field 404, a delivery destination terminal selection menu 406, a delivery destination terminal list field 408, an access authority setting field 410, an offline valid period menu 412, and an option setting call button 414.

The delivery destination user selection menu 402 is a pull-down type menu in which options of delivery destination users of the document are enumerated. The users as the options are users registered in the processing apparatus 110, and lists of IDs and user names of the users as the options may be acquired from the processing apparatus 110. Alternatively, the creation terminal 102 may acquire a list of users from the local user ID server 152 (refer to FIG. 12) managing information regarding users of the document management system belonging to an organization, and a delivering person may select users registered in other processing apparatuses 110 in the organization as delivery destinations. In this case, the respective users are displayed in the delivery destination user selection menu 402 in a display form in which the processing apparatuses 110 in which the users are registered are able to be differentiated from each other. For example, the users may be displayed in different colors or fonts for the respective processing apparatuses 110 in which the users are registered. Alternatively, there may be an aspect in which the menu is displayed in a hierarchical structure, the processing apparatus 110 is first selected, a list of users registered in the processing apparatus 110 is called, and a delivery destination user is selected from the list. A list of delivery destination users selected by the user is displayed in the delivery destination user list field 404. In a case where the delivering person selects a delivery destination user from the delivery destination user selection menu 402, and presses an "add" button on the right, a user ID or a user name of the delivery destination user is added to the delivery destination user list field 404. In a case where the delivering person selects a delivery destination user in the delivery destination user list field 404, and presses a "delete" button on the right, the delivery destination user is deleted from the delivery destination user list field 404 (that is, the delivery destination user is not designated as a delivery destination).

The delivery destination terminal selection menu 406 is a pull-down type menu in which options of the viewing terminals (viewers) 104 as delivery destinations of the document are enumerated. The viewing terminals 104 as the options are terminals registered in the processing apparatus 110, and lists of IDs and terminal names of the viewing terminals 104 as the options may be acquired from the processing apparatus 110. Alternatively, the processing apparatus 110 or the local user ID server 152 (refer to FIG. 12; and details thereof will be described later) may have a list of the viewing terminals 104 in the organization registered in the document management system, and the creation terminal 102 may present the list to the delivering person such that the viewing terminals 104 of users registered in other processing apparatuses 110 in the organization are selected as delivery destinations. A list of the viewing terminals 104 as delivery destinations selected from the delivery destination terminal selection menu 406 by the delivering person is displayed in the delivery destination user list field 404 in the same manner as in the delivery destination user list field 404.

A delivery destination viewing terminal 104 corresponding to a delivery destination user may be designated for each user. The creation terminal 102 may acquire a list of predefined viewing terminals of a delivery destination user from the processing apparatus 110 (or the local user ID server 152 or the user ID server 210) whenever the user is selected from the delivery destination user list field 404, and may set the list in the delivery destination terminal selection menu 406. In a case where the delivering person does not explicitly select the delivery destination viewing terminal 104 for a delivery destination user, a specific terminal (for example, the top of the list) in the list of predefined viewing terminals of the user is automatically selected as the delivery destination viewing terminal 104.

The access authority setting field 410 is a field for setting access authority (usage authority) of a delivery destination user for the document. In the illustrated example, checkboxes for four authority items such as viewing, processing (editing), printing, and copying are displayed, and the delivering person inputs a check into a checkbox of an item which is permitted to the delivery destination user for the document.

The offline valid period menu 412 is a pull-down menu displaying options of a length of an offline valid period set for the document. The delivering person selects a period set for the document which is registered in and delivered to the system this time from among offline valid periods in a plurality of stages displayed in the offline valid period menu 412.

Figure 10:
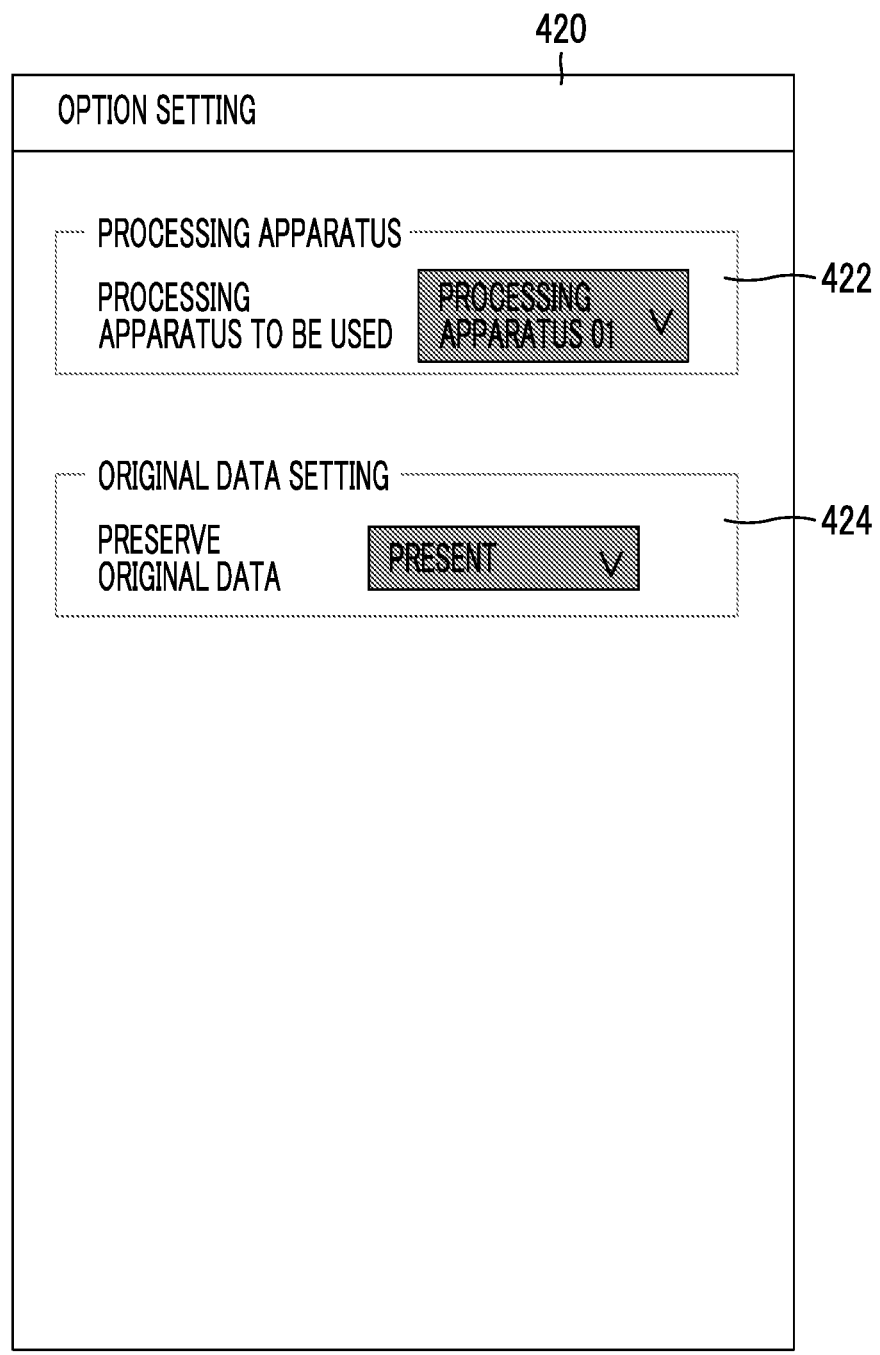
FIG. 10 is a diagram illustrating an example of an option setting screen.

In a case where the option setting call button 414 is pressed, the creation terminal 102 displays an option setting screen 420 exemplified in FIG. 10. The option setting screen 420 includes a processing apparatus designation field 422 and an original data setting field 424. The processing apparatus designation field 422 includes a pull-down menu indicating options of the processing apparatus 110 as a transmission destination of a document. This menu includes a list of the processing apparatuses 110 which are selectable from the creation terminal 102. The processing apparatuses 110 included in the list are the processing apparatuses 110 (the number thereof is fundamentally one, but may be plural) in the local system 100 to which the creation terminal 102 belongs. The processing apparatuses 110 in other local systems 100 in an identical organization may be included in the list. A pull-down menu for receiving a selection of whether or not original data which is a basis of an eDoc is preserved in the processing apparatus 110 is displayed in the original data setting field 424.

The attribute data sent from the creation terminal 102 to the processing apparatus 110 in step (2)-1 includes information such as delivery destination information (a list of users and a list of viewing terminals), access authority information, an offline valid period, and original data information, set on the setting screen.

Figure 8:
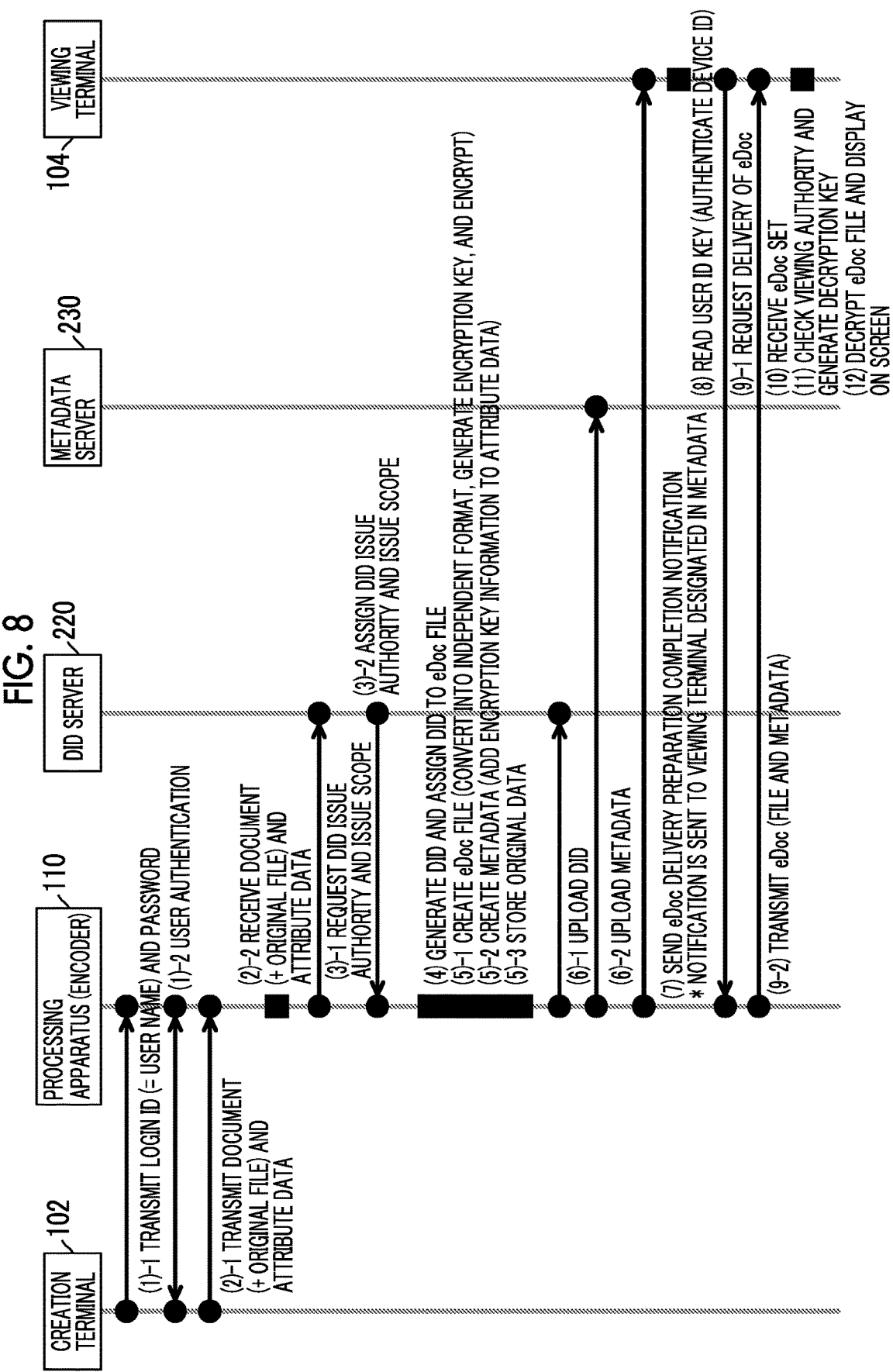
FIG. 8 is a diagram illustrating a flow of delivery and viewing of a document in the document management system.

FIG. 8 will be continuously described.

(2)-2: The processing apparatus 110 receives the document (referred to as a target document) and the attribute data from the creation terminal 102.

(3)-1: In a case where issue authority and an issue scope for a DID are not received (or the received issue scope is used up), the processing apparatus 110 requests new issue authority and issue scope to the DID server 220 of the management system 200. In a case where there is a received issue scope left, this request is not made, and the flow proceeds to step (4) which will be described later.

(3)-2: The DID server 220 transmits new issue authority and issue scope to the processing apparatus 110 in response to the request from the processing apparatus 110.

(4) The processing apparatus 110 issues a DID by using the issue authority assigned from the DID server 220, and assigns the DID to an eDoc (generated in the next step) generated from the target document.

(5)-1: The processing apparatus 110 generates an encryption key for encrypting the target document by using, for example, random numbers. The processing apparatus 110 converts the target document into an eDoc file. In other words, the target document is encoded with a dedicated format of the document management system, and encrypts an encoding result with the encryption key generated earlier, so as to generate the eDoc file. The generated eDoc file includes information regarding the DID generated earlier.

(5)-2: The processing apparatus 110 generates metadata of the generated eDoc. In other words, the DID generated earlier, the encode date and time, an ID of the processing apparatus 110, encryption information, and the like are added to the attribute data received from the creation terminal 102, and thus the metadata is generated (refer to FIG. 3). Here, the encryption information includes key information obtained by encrypting the encryption key used for encryption with a public key of a delivery destination user for each delivery destination user.

(5)-3: In a case where an instruction for storing original data is received from the creation terminal 102, the processing apparatus 110 preserves the document (or application data which is a basis of the document) received from the creation terminal 102.

(6)-1: The processing apparatus 110 uploads the DID generated earlier to the DID server 220. The DID server 220 stores the DID uploaded from the processing apparatus 110.

(6)-2: The processing apparatus 110 uploads the metadata generated earlier to the metadata server 230. The metadata server 230 stores the metadata uploaded from the processing apparatus 110.

(7) The processing apparatus 110 transmits a delivery preparation completion notification for the eDoc to each viewing terminal 104 which is a delivery destination of the generated eDoc. This notification includes information such as the DID and a document name of the eDoc generated earlier. The notification may include a thumbnail image of a representative page (a page designated in advance such as a top page) of the eDoc.

Figure 11:
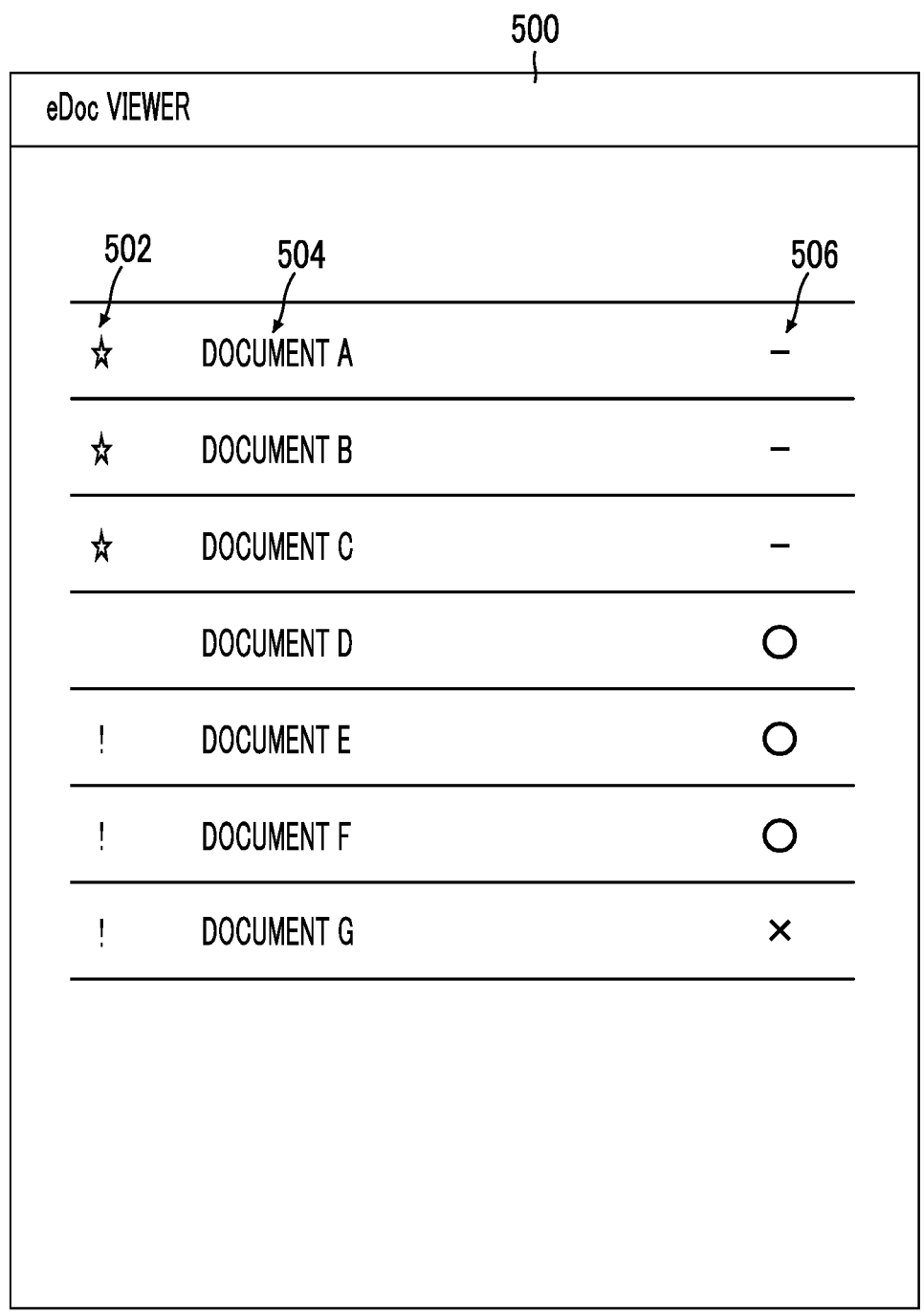
FIG. 11 is a diagram illustrating an example of a list screen.

Meanwhile, a user (referred to as a viewing person) using the viewing terminal 104 makes the authentication device 130 thereof come close to the card reader of the viewing terminal 104, and thus receives user authentication. The viewing terminal 104 displays a list screen on which a list of eDocs delivered thereto is displayed. FIG. 11 illustrates an example of a list screen 500. The list screen 500 in this example includes a notification mark 502, a document name 504 of the eDoc, and a viewing mark 506 for each eDoc. The notification mark 502 is a mark for notifying the viewing person of a state of the eDoc. A state of the eDoc indicated by the notification mark 502 includes "new arrival" (a state in which a document is delivered from the processing apparatus 110, and then is not opened yet; indicated by "☆" in FIG. 11), "normal" (no mark in FIG. 11), and "expired" (a state in which an access valid period has elapsed; indicated by "!" in FIG. 11). In the "expired" state, even in a case where an eDoc file is preserved in the viewing terminal 104, the eDoc file may not be viewed until the latest metadata for the eDoc is acquired from the processing apparatus 110 or the management system 200. In a case of an eDoc in the "normal" state, metadata of which an access valid period has not expired is preserved (cached) in the viewing terminal 104, and, thus, even in a case where the viewing terminal 104 is in an offline state with the processing apparatus 110 or the management system 200, the eDoc can be viewed. The viewing mark 506 indicates whether or not a combination of the viewing terminal 104 and a user (authenticated by using the authentication device 130) using the viewing terminal 104 matches a combination of a user and the viewing terminal 104 as a delivery destination of the eDoc indicated by metadata of the eDoc cached in the viewing terminal 104. In a case of matching, the eDoc is viewable ("◯" in FIG. 11), and, in a case of mismatching, the eDoc is not viewable ("X" in FIG. 11). In a case of an eDoc of which the delivery preparation completion notification is received, but an eDoc file and metadata are not received yet, the viewing terminal 104 has no information regarding a determination criterion for matching with a delivery destination combination, and thus the viewing mark 506 is "-" indicating an undefined state. In the illustrated example, three eDocs from the top are new arrivals, eDoc entities (files and metadata) thereof are not acquired yet, and thus the viewing mark 506 is a mark indicating an undefined state.

The viewing person selects an eDoc desired to be viewed on the list screen (FIG. 11), for example, through a touch operation, and gives a viewing instruction. Herein, it is assumed that a new arrival (the notification mark 502 is "☆") eDoc is selected as a viewing target.

(8) FIG. 8 will be continuously described. The viewing terminal 104 does not hold an eDoc file and metadata of the selected viewing target, and is thus required to acquire the eDoc file and the metadata from the processing apparatus 110. Therefore, the viewing terminal 104 transmits a user ID key which is authentication information acquired from the authentication device 130 of the viewing person to the processing apparatus 110 on the local network 108 connected thereto. The processing apparatus 110 verifies whether or not the user ID key certifies a user registered therein (user authentication). Herein, it is assumed that the user authentication is successful. In a case where the user ID key received from the viewing terminal 104 does not correspond to any user registered in the processing apparatus 110, the processing apparatus 110 may send the user ID key to a host apparatus (the user ID server 210 or the local user ID server 152) related to user authentication so as to request user authentication.

(9)-1: The viewing terminal 104 is notified that the user authentication in the processing apparatus 110 is successful, and sends a delivery request including a DID of the eDoc which is the viewing target selected by the viewing person to the processing apparatus 110.

(9)-2: The processing apparatus 110 returns an eDoc file and metadata corresponding to the DID included in the delivery request from the viewing terminal 104, to the viewing terminal 104.

(10) The viewing terminal 104 receives and preserves (caches) the eDoc file and the metadata sent from the processing apparatus 110.

(11) The viewing terminal 104 determines whether or not a combination matching a combination of the viewing terminal 104 and the viewing person using the viewing terminal 104 is present among combinations of delivery destination users and delivery destination terminals indicated by delivery destination information (refer to FIG. 3) in the metadata. In a case where it is determined that there is no combination, the viewing person is unable to view the eDoc file in the viewing terminal 104. In this case, the viewing terminal 104 displays an error message indicating that the eDoc file is not viewable. In this case, the viewing terminal 104 may delete the preserved eDoc file (and the corresponding metadata). On the other hand, in a case where it is determined that the combination of the viewing terminal 104 and the viewing person using the viewing terminal 104 is present in the delivery destination information in the metadata, the viewing terminal 104 permits the viewing person to view the eDoc. In this case, the viewing terminal 104 extracts a key corresponding to the viewing person from encrypted keys corresponding to the respective delivery destination users included in the encryption information in the metadata, and decrypts the key with a secret key (held in, for example, the authentication device 130) of the viewing person so as to restore a decryption key required to decrypt the eDoc file.

(12) The viewing terminal 104 reproduces a viewable document by decrypting the eDoc file by using the restored decryption key, and outputs the document (for example, displays the document on a screen). The viewing terminal 104 controls whether or not to receive an operation instruction for the document from the viewing person, according to the access authority information included in the metadata. The viewing terminal 104 does not fundamentally preserve the decrypted document in a file. In other words, after viewing is finished, the eDoc file and the metadata are preserved in a nonvolatile storage device of the viewing terminal 104, but the decrypted document is not preserved therein.

Next, with reference to FIG. 12, a description will be made of another example of the document management system. In the example illustrated in FIG. 12, a plurality of local systems 100 are present in an in-organization network which is a private network of an organization such as a company. The in-organization management system 150 is provided in the in-organization network. The in-organization management system 150 manages a process in the organization in the document management system or information required for the process. In other words, whereas the management system 200 is operated by a service provider of the document management system, and manages information or processes for a plurality of organizations using the document management system, the in-organization management system 150 manages the information or portions regarding the organizations during the processes under the management of the management system 200.

The in-organization management system 150 includes the local user ID server 152, a local DID server 154, and a local metadata server 156.

The local user ID server 152 manages information regarding users registered in the document management system among members of the organization. Information regarding each user held in the local user ID server 152 is the same as information regarding a general user held in the user ID server 210 described in FIG. 4. In a case where a user (that is, a user using the processing apparatus 110 as a "predefined processing apparatus") acquiring and using the processing apparatus 110 is registered in the processing apparatus 110, the processing apparatus 110 sends information regarding the registered user to the local user ID server 152 in the organization. The local user ID server 152 preserves the received information regarding the user, and sends the user ID server 210 of the central management system 200 via the wide area network 10. The user ID server 210 stores the received information regarding the user. In a case where the information regarding the user registered in the processing apparatus 110 is changed, a manager or the like changes the information regarding the user for the processing apparatus 110. The processing apparatus 110 transmits information (including, for example, a user ID, an item name of a changed information item, and a value after the item is changed) regarding a changed content of the user information to the local user ID server 152, and the local user ID server 152 changes the user information stored therein according to the received changed content. The local user ID server 152 sends the received information regarding the changed content to the central user ID server 210, and the user ID server 210 changes the user information held therein according to the sent information.

The local DID server 154 receives and stores a DID issued by the processing apparatus 110 in each local system 100 belonging to the in-organization network of the organization. Information held in the local DID server 154 is the same as information held in the DID server 220 described in FIG. 5. The local DID server 154 sends information regarding the DID received from the processing apparatus 110 to the central DID server 220, and the DID server 220 stores the information. The local DID server 154 is assigned with issue authority and an issue scope for a DID from the central DID server 220, and assigns issue authority and an issue scope for a DID to each processing apparatus 110 under the management thereof on the basis of the issue authority within the issue scope.

The local metadata server 156 receives and stores metadata of an eDoc generated by the processing apparatus 110 in each local system 100 belonging to the in-organization network of the organization. Information held in the local metadata server 156 is the same as information held in the metadata server 230. The local metadata server 156 sends the metadata received from the processing apparatus 110 to the central metadata server 230, and the metadata server 230 stores the metadata.

Figure 12:
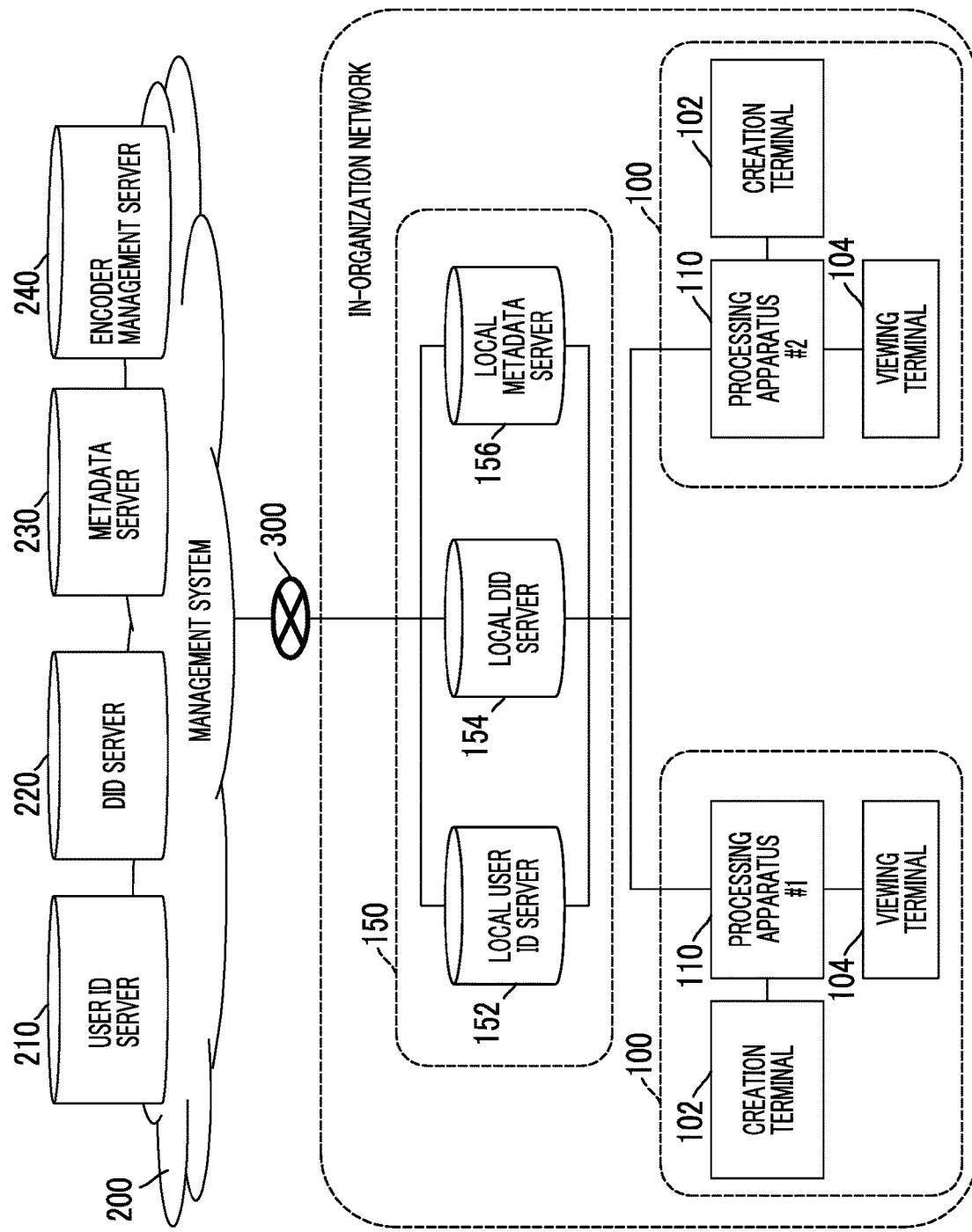
FIG. 12 is a diagram illustrating an example of a system configuration including an in-organization management system.

In the system in FIG. 12, in a case where the processing apparatus 110 receives a document registration (and delivery) request or an eDoc file or metadata acquisition request from a user who is not registered therein but is registered in another processing apparatus 110 in the identical organization, the processing apparatus 110 responds to the request via the in-organization management system 150.

Figure 13:
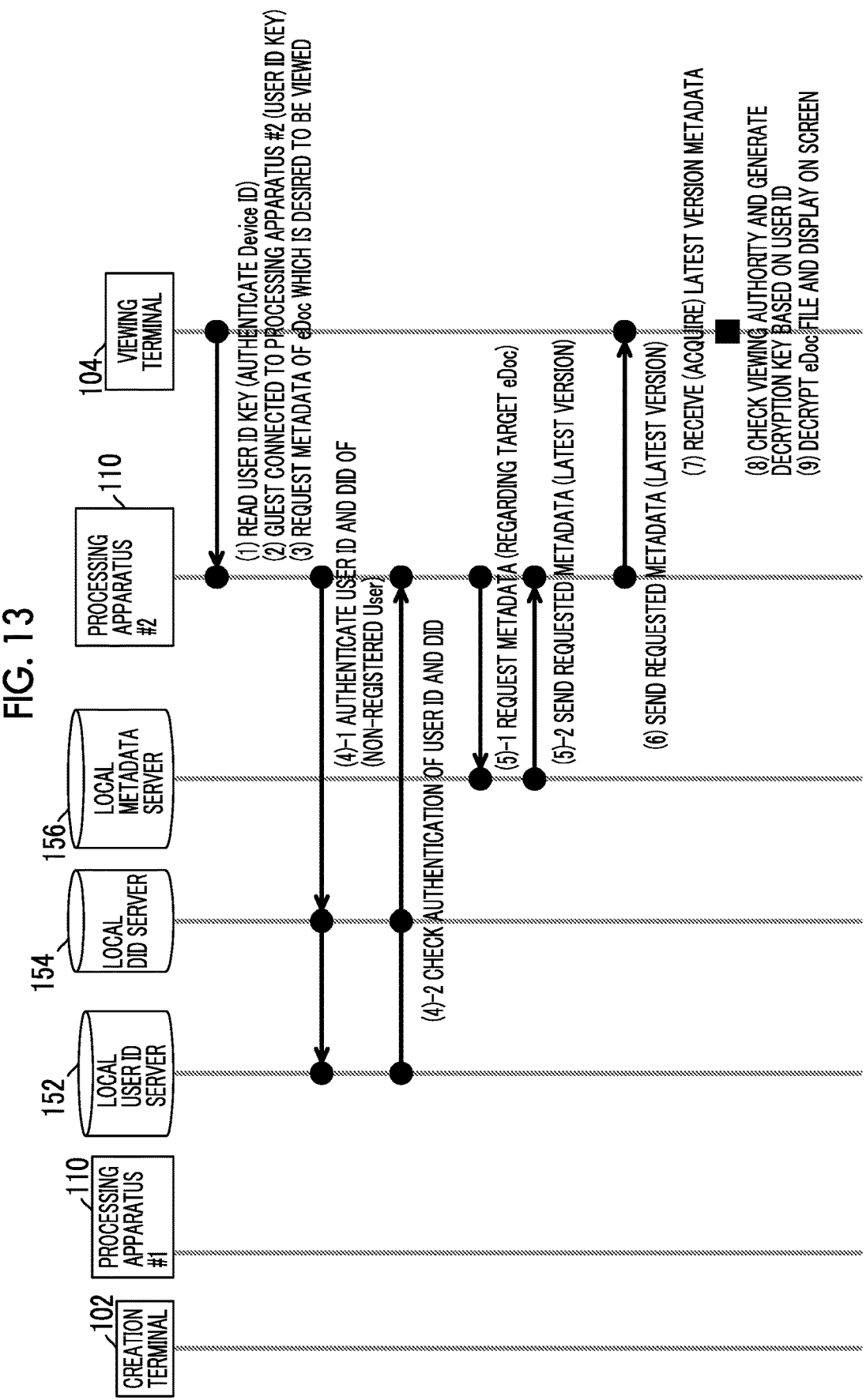
FIG. 13 is a diagram illustrating an example of a flow of a process in which a user acquires metadata of a document and views the document by using a processing apparatus in which the user is not registered.

As an example, a case is assumed in which a viewing person registered in a processing apparatus #1 in a first local system 100 located in a first department of the in-organization network preserves an eDoc which is registered in the processing apparatus #1 and is delivered, in the viewing terminal 104 thereof, and then moves to a second department under the management of a processing apparatus #2, and views the eDoc. It is assumed that metadata of the eDoc preserved in the viewing terminal 104 is old (that is, an access valid period has elapsed) at this time. In this case, in a case where the viewing person performs an operation of opening the eDoc in the viewing terminal 104, a process illustrated in FIG. 13 is performed.

First, the viewing terminal 104 finds the processing apparatus 110 from the local network 108 of a second local system 100 connected thereto. Consequently, the processing apparatus #2 is found. The processing apparatus #2 is different from the processing apparatus #1 having delivered the eDoc, and thus does not have an eDoc file or metadata of the eDoc.

(1) The viewing terminal 104 reads a user ID key (authentication information) from the authentication device 130 of the viewing person.

(2) The viewing terminal 104 transmits the user ID key acquired from the authentication device 130 to the processing apparatus #2 in order to perform user authentication for acquiring the latest metadata of the eDoc for which an instruction is given as a viewing target.

(3) The viewing terminal 104 requests metadata of the eDoc to the processing apparatus #2. The request includes a DID of the eDoc.

(4)-1: The processing apparatus #2 examines whether or not the user ID key received from the viewing terminal 104 is a user ID key of the user registered therein (user authentication). In this case, since the viewing person is registered in the processing apparatus #1, and is not registered in the processing apparatus #2, the processing apparatus #2 sends an authentication request including the user ID key to an address of the preset local user ID server 152. The processing apparatus #2 sends the DID included in the metadata from the viewing terminal 104 to the preset local DID server 154, so as to request authentication.

(4)-2: The local user ID server 152 verifies whether or not the user ID key received from the processing apparatus #2 is a user ID key of the user registered therein (user authentication). The viewing person as an owner of the user ID key is registered in the processing apparatus #1, and is also registered in the local user ID server 152 which is a host apparatus thereof as a user. Therefore, this user authentication is successful. The local user ID server 152 returns a response indicating that the authentication is successful to the processing apparatus #2.

The local DID server 154 examines whether or not the verification target DID sent from the viewing terminal 104 is an authorized DID, that is, a DID preserved therein. In this example, the DID of the eDoc is issued by the processing apparatus #1, and is also preserved in the local DID server 154 as a host apparatus of the processing apparatus #1 regarding a DID. Therefore, the DID is authenticated to be authorized. The local DID server 154 returns a response indicating that the DID is authenticated to be authorized, to the processing apparatus #2.

(5)-1: Since the user authentication and the DID authentication are successful, the processing apparatus #2 continuously performs a process for responding to the metadata request from the viewing terminal 104. In other words, the processing apparatus #2 sends the metadata request including the DID to an address of the preset local metadata server 156.

(5)-2: In a case where the metadata request is received from the processing apparatus #2, the local metadata server

156 returns metadata corresponding to the DID included in the request to the processing apparatus #2. In a case where metadata of an eDoc is changed by the delivering person in the processing apparatus 110, the change is immediately reflected in the local metadata server 156, and thus the metadata returned to the processing apparatus #2 at this time is the latest version of metadata of the viewing target eDoc.

(6) The processing apparatus #2 transmits the metadata received from the local metadata server 156 to the viewing terminal 104.

(7) The viewing terminal 104 receives and preserves (caches) the metadata from the processing apparatus #2.

(8) The viewing terminal 104 checks authority for a combination of the viewing terminal 104 and the viewing person by referring to delivery destination information of the received latest metadata. In other words, in a case where a combination matching the combination of the viewing terminal 104 and the viewing person is present among combinations of delivery destination user and delivery destination terminals indicated by the delivery destination information (refer to FIG. 3), it is determined that there is viewing authority, and, in a case where the combination is not present, it is determined that there is no viewing authority. In a case where it is determined that there is no viewing authority, the viewing terminal 104 performs error display. In a case where it is determined that there is viewing authority, the viewing terminal 104 extracts a key corresponding to the viewing person from encrypted keys corresponding to the respective delivery destination users included in the encryption information in the metadata, and decrypts the key with a secret key (held in, for example, the authentication device 130) of the viewing person so as to restore a decryption key required to decrypt the eDoc file.

(9) The viewing terminal 104 reproduces a viewable document by decrypting the eDoc file by using the restored decryption key, and outputs the document (for example, displays the document on a screen). It is controlled whether or not to receive an operation instruction for the document from the viewing person, according to the access authority information included in the metadata.

Next, with reference to FIG. 14, a description will be made assuming a flow of a process in a case where a user registered in the processing apparatus #1 of the first local system 100 registers a document in the document management system in the second department under the management of the processing apparatus #2. It is assumed that the user (a delivering person of the document) is not registered in the processing apparatus #2.

(1) In a case where the user instructs the creation terminal 102 thereof to register a document, the creation terminal 102 displays a screen for requesting input of login authentication information. In a case where the delivering person inputs authentication information (for example, a user ID and a password) in response to the request, the creation terminal 102 transmits the authentication information to the processing apparatus 110 via the local network 108.

(2) The processing apparatus #2 determines whether or not the authentication information received from the creation terminal 102 is authentication information of the user registered therein. In this case, the delivering person is not registered in the processing apparatus #2. In this case, the processing apparatus #2 sends the authentication information to the local user ID server 152 as a host apparatus, and requests authentication.

(3) The local user ID server 152 determines whether or not the received authentication information is authentication information of the user registered therein (user authentication). In this example, the delivering person is a user registered in the processing apparatus #1, and is thus also registered in the local user ID server 152. Therefore, the user authentication is successful. The local user ID server 152 returns information indicating that the user authentication is successful to the processing apparatus #2.

(4) In a case where a response indicating that the authentication is successful is received from the local user ID server 152, the processing apparatus #2 gives the response indicating that the user authentication is successful to the creation terminal 102.

(5) In a case where the user authentication is successful, the creation terminal 102 sends a document selected as a registration target by the user and attribute data input by the user to the processing apparatus #2.

(6) The processing apparatus #2 receives the document and the attribute data from the creation terminal 102.

(7)-1: In a case where issue authority and an issue scope for a DID are used up, the processing apparatus #2 requests new issue authority and issue scope to the local DID server 154. In a case where there is a received issue scope left, this request is not made, and the flow proceeds to step (8) which will be described later.

(7)-2: The local DID server 154 assigns new issue authority and issue scope to the processing apparatus #2 in response to the request from the processing apparatus #2. In a case where an issue scope assigned from the central DID server 220 is used up, the local DID server 154 requests new issue authority and issue scope to the DID server 220, and assigns issue authority and an issue scope for a DID to the processing apparatus #2 by using issue authority and an issue scope assigned in response thereto.

(8) The processing apparatus #2 issues a DID by using the assigned issue authority, and assigns the DID to an eDoc (generated in the next step) generated from the target document.

(9)-1: The processing apparatus #2 generates an encryption key for encrypting the target document, encodes the target document into a dedicated format of the present system, and encrypts an encoding result with the encryption key generated earlier, so as to generate an eDoc file.

(9)-2: The processing apparatus #2 adds items such as the DID generated earlier and the encode date and time to the attribute data received from the creation terminal 102, so as to generate metadata of the eDoc.

(10) The processing apparatus #2 uploads the generated DID to the local DID server 154, and uploads the generated metadata to the local metadata server 156. The local DID server 154 adds the DID uploaded from the processing apparatus #2 to an issued DID list (refer to FIG. 5) corresponding to an issue authority key included in therein, and also uploads the DID to the central DID server 220. The DID server 220 adds the DID uploaded from the local DID server 154 to the issued DID list (refer to FIG. 5) corresponding to the issue authority key. The local metadata server 156 preserves the metadata uploaded from the processing apparatus #2 and also uploads the metadata to the central metadata server 230. The metadata server 230 preserves the metadata uploaded from the local metadata server 156.

The processing apparatus #2 delivers the generated eDoc to a delivery destination designated by the delivering person. This process is the same as steps (7) to (12) in FIG. 8.

(11) The processing apparatus #2 transmits the generated eDoc file and metadata to the creation terminal 102. The processing apparatus #2 may preserve the eDoc file and the metadata, and may not preserve and delete the eDoc file and the metadata. In a case where the eDoc file and the metadata are not preserved and are deleted, the eDoc file and the metadata are preserved in only the processing apparatus #1 which is a predefined processing apparatus in a group of the processing apparatuses 110 of the organization in step (13) which will be described later. Whether or not the processing apparatus 110 which is not a predefined processing apparatus of the delivering person preserves an eDoc file and metadata of which registration and delivery are requested from the delivering person may be set in the processing apparatus 110.

(12) The creation terminal 102 preserves the eDoc file and the metadata received from the processing apparatus 110 for future transmission to the processing apparatus #1 which is a predefined processing apparatus of the delivering person.

(13) In a case where the delivering person carries the creation terminal 102 and returns to the first department to which the delivering person belongs, the creation terminal 102 finds the processing apparatus #1 which is a predefined processing apparatus of the delivering person on the first local network 108. In a case where the processing apparatus #1 is found, the creation terminal 102 registers the eDoc file and the metadata preserved in step (12) in the processing apparatus #1. Consequently, in a case where a content (for example, a delivery destination) of the metadata is desired to be changed, the delivering person may access the predefined processing apparatus #1, and may perform an operation for the change.

In the document management system described above, entity information (that is, an eDoc file) of a document which is instructed to be delivered from the creation terminal 102 to the processing apparatus 110 is held in only the processing apparatus 110 and the viewing terminal 104 which is a delivery destination, and is not available in other networks or apparatuses. Thus, a leakage risk of an eDoc file is minimized. Particularly, in a case where a delivery destination of an eDoc file is restricted to the viewing terminal 104 on the local network 108 in which the eDoc is generated, the eDoc does not come out of the local network 108.

On the other hand, since metadata of an eDoc is registered in the central management system 200 or the in-organization management system 150 of each organization, even in a case where the viewing terminal 104 is moved to various locations, the metadata can be acquired via the wide area network 10 or a private network of the organization. In a case where an instruction for viewing an eDoc is received from a user, the viewing terminal 104 acquires the latest metadata of the eDoc from the in-organization management system 150 or the central management system 200, and determines whether or not the user is permitted to view the eDoc on the basis of delivery destination information included in the latest metadata. In a case where the user is designated as a delivery destination during registration and delivery of the eDoc, but is not a delivery destination due to the subsequent delivery destination change, viewing is not permitted.

Figure 14:
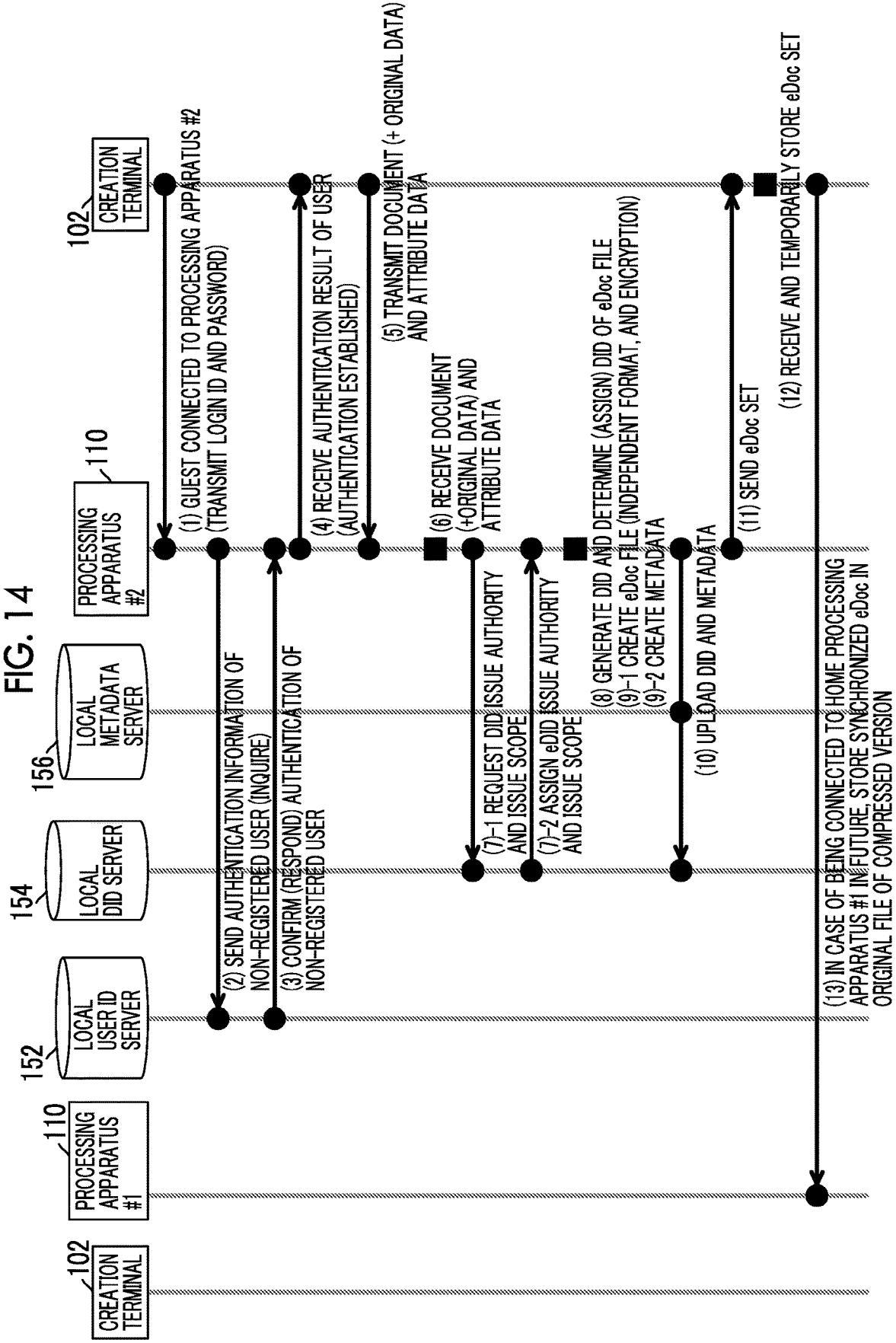
FIG. 14 is a diagram illustrating an example of a flow of a process in which the user registers a document in the document management system by using the processing apparatus in which the user is not registered.

In the examples in FIGS. 13 and 14, since the processing apparatus #1 and the processing apparatus #2 are all provided in an identical organization, and a delivery destination user is also supposed to belong to the organization, user authentication is performed by the local user ID server 152 of the organization. In contrast, in a case where a delivering person is a user belonging to an organization which is different from that of the processing apparatus #2, neither the processing apparatus #2 nor the local user ID server 152 which is a host apparatus thereof authenticates the viewing person. In this case, the user ID server 210 which is a further host apparatus may perform user authentication of the delivering person.

In the examples in FIGS. 13 and 14, another processing apparatus #2 relays exchange between the viewing terminal 104 of the user registered in the processing apparatus #1 and the local user ID server 152 or the local metadata server 156. However, this is only an example. Alternatively, for example, in a case where it is determined that the user is not registered in the processing apparatus #2 on the basis of authentication information of the user sent from the viewing terminal 104, the processing apparatus #2 may give a response about authentication impossibility to the viewing terminal 104. In this case, the viewing terminal 104 requests authentication to the local user ID server 152 by using address information of a host apparatus registered therein, and accesses the local metadata server 156 so as to acquire necessary metadata in a case where the authentication is successful.

The example in FIG. 13 is an example of a case where the user moves to the local system 100 under the management of the processing apparatus 110 which is different from a predefined processing apparatus of the user in the organization to which the user belongs, and views a document. However, the user may view the document delivered from the predefined processing apparatus of the user outside the organization to which the user belongs. In this case, the viewing terminal 104 of the user is authenticated by the user ID server 210 of the central management system 200, and acquires metadata of the document desired to be viewed from the metadata server 230.

Example of DID

Figure 15:
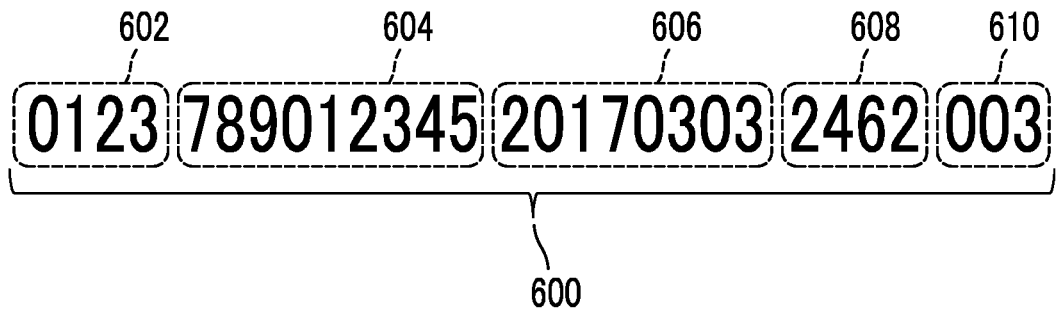
FIG. 15 is a diagram illustrating an example of a data content of a DID.

Next, with reference to FIG. 15, a description will be made of a configuration of a DID 600 used for identification information of an eDoc in the document management system.

As illustrated, the DID 600 includes an issue authority key 602, processing apparatus specific information 604, an issue date 606, an issue certification key 608, and an issue number 610. The number of digits of the illustrated DID 600 and the constituent elements 602 to 610 thereof is only an example.

The issue authority key 602 is key information for identifying issue authority assigned to the processing apparatus 110 by the DID server 220. In a case where a request for issue authority and an issue scope is received from the processing apparatus 110, the DID server 220 generates the issue authority key 602, and transmits the issue authority key 602 to the processing apparatus 110 along with a numerical value of an issue scope (for example, the number of documents of a hundred). In a case of a system configuration in which the local DID server 154 is interposed between the DID server 220 and the processing apparatus 110, for example, the DID server 220 collectively assigns a plurality of sets of issue authority keys and issue scopes to the local DID server 154. This assignment may be understood as a case where the DID server 220 requests the local DID server 154 to perform a process of assigning a plurality of issue authority keys and issue scopes to the processing apparatus 110. In a case where the processing apparatus 110 under the management of the local DID server 154 requests issue authority, the processing apparatus 110 may be assigned with an issue authority key and an issue scope which are not assigned among a plurality of assigned sets of issue authority keys and issue scopes.

The processing apparatus specific information 604 is information specific to the processing apparatus 110 issuing the DID. In other words, the processing apparatus specific information 604 in the DID 600 is examined, and thus the processing apparatus 110 issuing the DID 600 can be uniquely specified. The processing apparatus specific information 604 is held in the processing apparatus 110.

The issue date 606 is a character string indicating a date on which the DID is issued. The issue date of the DID is also a date on which an eDoc which is an assignment destination of the DID is generated (encoded).

The issue certification key 608 is key information for certifying that the processing apparatus 110 (specified by the processing apparatus specific information 604) has issued the DID by using issue authority indicated by the issue authority key 602. The issue certification key 608 is, for example, a value obtained by encrypting the issue authority key 602 with a secret key of the processing apparatus 110. In this case, in a case where a value obtained by decrypting the issue certification key 608 with a public key of the processing apparatus 110 matches the issue authority key 602, it is certified that the DID 600 has been issued by the processing apparatus 110 by using the issue authority key 602. A value obtained by encrypting a value of a portion (or a hash value of a predetermined number of digits generated on the basis of the value) excluding the issue authority key 602 in the DID 600 with a secret key of the processing apparatus 110 may be used as the issue certification key 608. In this case, in a case where a value obtained by decrypting the issue certification key 608 with a public key of the processing apparatus 110 is not contradictory to the value of the portion excluding the issue certification key 608 of the DID 600 (for example, a decryption result matches the hash value of the value), it is certified that the DID 600 has been issued by the processing apparatus 110 on the basis of the issue authority key 602, and there is no alteration in the portion other than the issue certification key 608 of the DID 600.

The issue number 610 is a serial number indicating an order of the DID 600 issued by the processing apparatus 110 by using the issue authority key 602. The maximum value taken by the issue number 610 of the DID 600 generated by using a certain issue authority key 602 is a value of an issue scope (the number of documents) assigned by the DID server 220 (or the local DID server 154) along with the issue authority key 602.

Change of Delivery Destination after Registration

Meanwhile, there may be a case where an eDoc is registered in the document management system, and then a delivering person (or another person having assigned delivery destination changing authority) wants to delete or add a delivery destination or to correct authority to access the eDoc, assigned to the delivery destination. In this case, the delivering person accesses, for example, the predefined processing apparatus 110 by using the creation terminal 102 or the viewing terminal 104 (hereinafter, collectively referred to as a user terminal), designates a DID of a target eDoc, and instructs a delivery destination (or access authority) editing process to be performed.

In a case where it is checked that the user having given the instruction is an authorized delivering person or the like (a general term of a delivering person and another person having assigned the delivery destination changing authority) of the target eDoc through user authentication, the processing apparatus 110 having received the instruction provides a screen for editing a delivery destination and access authority to the user terminal. The editing screen may be the input screen 400 illustrated in FIG. 9. The delivering person or the like adds or deletes a user and a viewing terminal as delivery destinations or changes an access authority content on the editing screen. In a case where the delivering person or the like performs a necessary change on the editing screen, and then performs an operation of establishing the change, the processing apparatus 110 reflects the change in metadata of the preserved eDoc, and also notifies the local metadata server 156 and the metadata server 230 which are host apparatuses of the change content. The local metadata server 156 and the metadata server 230 reflect the sent change content in metadata of the preserved eDoc. For example, in a case where even a user designated as a delivery destination during delivery, and is deleted from the delivery destination due to a subsequent change, the user is unable to view the eDoc. In a case where delivery destination information in metadata of an eDoc is changed as mentioned above, the processing apparatus 110 may give an instruction for deleting the eDoc file (and corresponding metadata) to a delivery destination viewing terminal 104 which is included in delivery destination information before the change but is not included in delivery destination information after the change.

In the above example, the processing apparatus 110 receives an instruction for changing a delivery destination of an eDoc or access authority, but, instead thereof or in addition thereto, a host apparatus, that is, the management system 200 (metadata server 230) or the in-organization management system 150 (local metadata server 156) may receive the changing instruction. In this case, the host apparatus transmits new metadata which is generated in response to the changing instruction to the processing apparatus 110 (and the local metadata server 156 of an organization to which the processing apparatus 110 belongs) having generated the eDoc, and thus replaces existing metadata in the processing apparatus 110 with the new metadata.

Status Management of Processing Apparatus

Next, a description will be made of control based on status management of the processing apparatus 110.

The processing apparatus 110 periodically notifies the management system 200 of a status thereof. In the management system 200, the processing apparatus management server 240 adds the received status to the status history 242 for the processing apparatus 110 in correlation with the reception date and time. The processing apparatus management server 240 checks the received status, and controls whether or not a service is able to be provided to a user of the processing apparatus 110 according to a result of the check.

Figure 6:
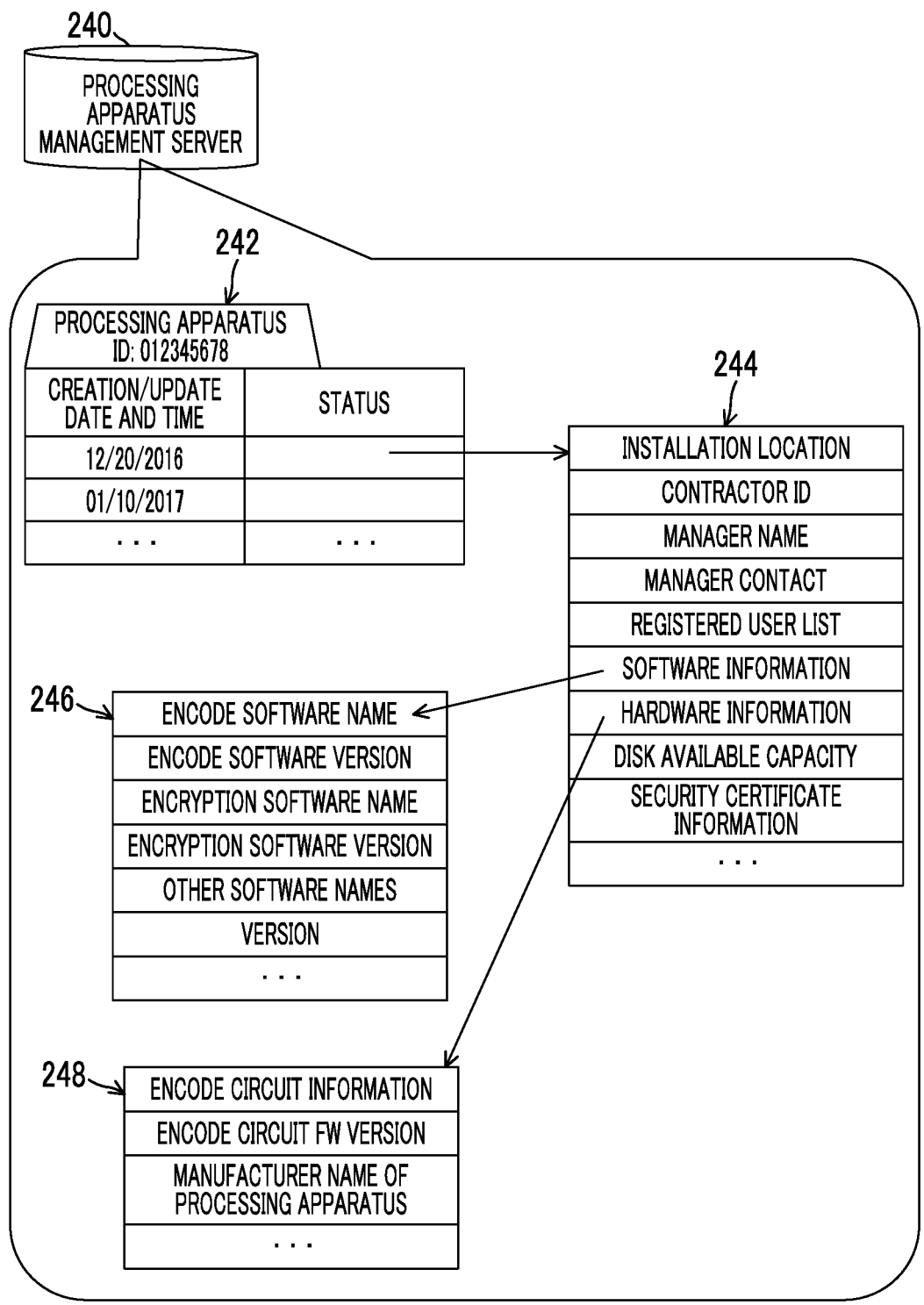
FIG. 6 is a diagram illustrating an example of a data content managed by a processing apparatus management server.

The status which is periodically transmitted from the processing apparatus 110 to the processing apparatus management server 240 includes the same items as those of the status 244 of the processing apparatus exemplified in FIG. 6 (however, in the status 244, the installation location, the encode circuit information, or the manufacturer name of the processing apparatus which is not changed depending on the processing apparatus 110 may not be periodically transmitted).

Figure 16:
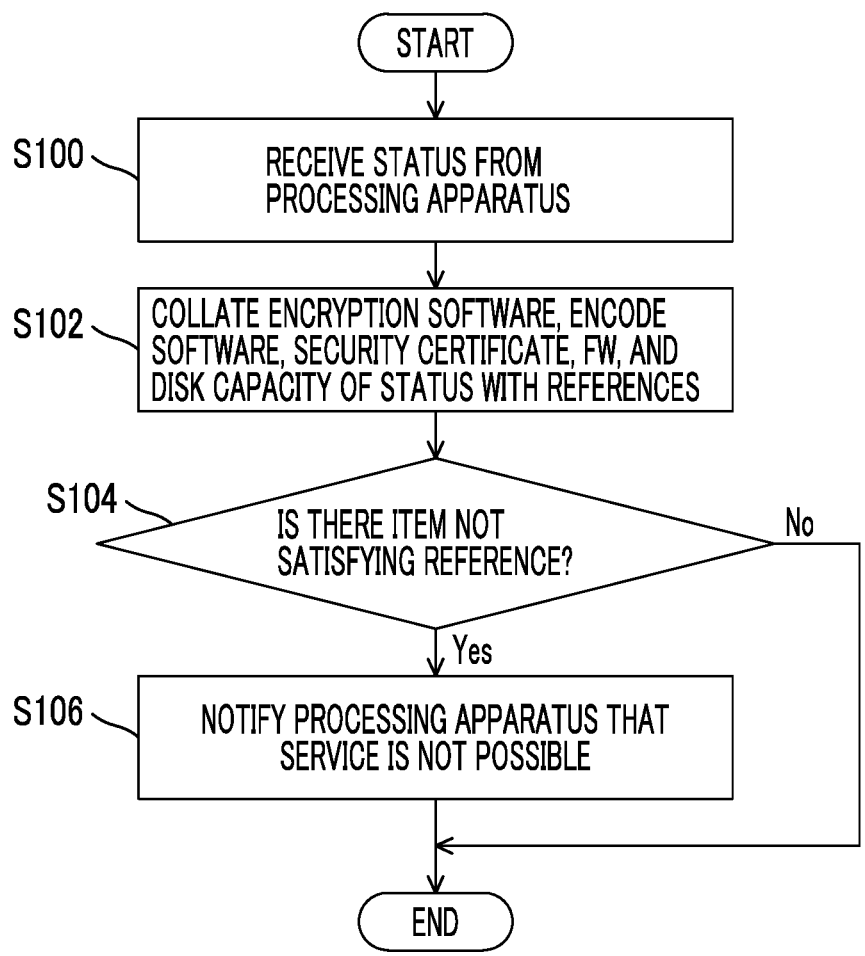
FIG. 16 is a diagram illustrating an example of a flow of a status check process for the processing apparatus, performed by the processing apparatus management server.

The processing apparatus management server 240 performs a process exemplified in FIG. 16 on the basis of a status sent from the processing apparatus 110.

First, in a case where a status is received from the processing apparatus 110 (S100), the processing apparatus management server 240 collates values of examination target items of the status with references of the respective items (S102). The examination target items include the name and the version of the encryption software, the name and the version of the encode software, the security certificate installed in the processing apparatus 110, the information (for example, identification information or the installation date and time of the key) regarding the encryption key (for example, a pair of a secret key and a public key, which is used for communication path encryption or signature) installed in the processing apparatus 110, the name and the firmware (FW) version of the encode circuit, the installed font type, and the available capacity of the disk (secondary storage device). Examples of the references of the respective items may be that the encryption software, the encode software, the firmware is the latest version (or a version following a certain version), the disk available capacity is equal to or more than a predetermined threshold value, there is no certificate included in a blacklist among the installed security certificates, a predetermined period does not elapse from the day on which the encryption key of the processing apparatus 110 is installed, and a predetermined (that is, predefined) type of font is installed.

For example, since an encryption key used for communication path encryption or signature by the processing apparatus 110 is desirably periodically changed to a new key in order to maintain safety thereof, it is determined that the reference is not satisfied after a predetermined period elapses from the installation date and time, a service is not provided (or a warning indicating that a service is impossible is issued), and replacement with a new key is prompted.

Next, it is determined whether or not there is an examination target item of the status received from the processing apparatus 110 does not satisfy the reference of the item (S104), and, in a case where there is no examination target item, and the processing apparatus management server 240 finishes the process for the processing apparatus 110 from which this status is received. In a case where there is an item not satisfying the reference in S104, the processing apparatus management server 240 notifies the processing apparatus 110 that a service is impossible (S106). The processing apparatus 110 receiving the notification stops a service of registering (delivering) a document in the document management system of the present exemplary embodiment. In other words, a document registration (delivery) request from the creation terminal 102 is not received, and a message indicating that a service is stopped is returned.

According to this control, a probability that the processing apparatus 110 may generate an eDoc with a quality not satisfying a reference is reduced. For example, according to the control, a service of the processing apparatus 110 is stopped before an eDoc of which an encryption intensity is not sufficient is generated by old encryption software. A service is stopped before a situation occurs in which, since a disk available capacity is small or firmware is old, an error occurs in an eDoc generation process, and, as a result, a document leaks. A service is stopped before the processing apparatus 110 not having a predetermined font replaces the font in a document with another font, and performs encoding, and thus image quality of an eDoc deteriorates. It is also hard to cause a situation in which, since firmware of the encode circuit is old, an image size of a document supported by the latest firmware is not supported, and an image size of an eDoc is restricted.

The examination target items of the status may be classified into items influencing the security of an eDoc and items not influencing the security, and a service of the processing apparatus 110 may be stopped only in a case where the former items do not satisfy references. In a case where the latter items do not satisfy references, a warning is sent to the processing apparatus 110 or a manager thereof, and defects for the items are prompted to be removed. After receiving the warning, the manager of the processing apparatus 110 repairs the processing apparatus 110 with respect to items with which the manager is able to cope, and requests a system administrator to send a maintenance worker with respect to items requiring an expert maintenance worker. In a case where it is determined that a specific item does not satisfy a reference among the examination target items, the processing apparatus management server 240 may automatically perform a preparation of sending a maintenance worker to the processing apparatus 110.

Figure 17:
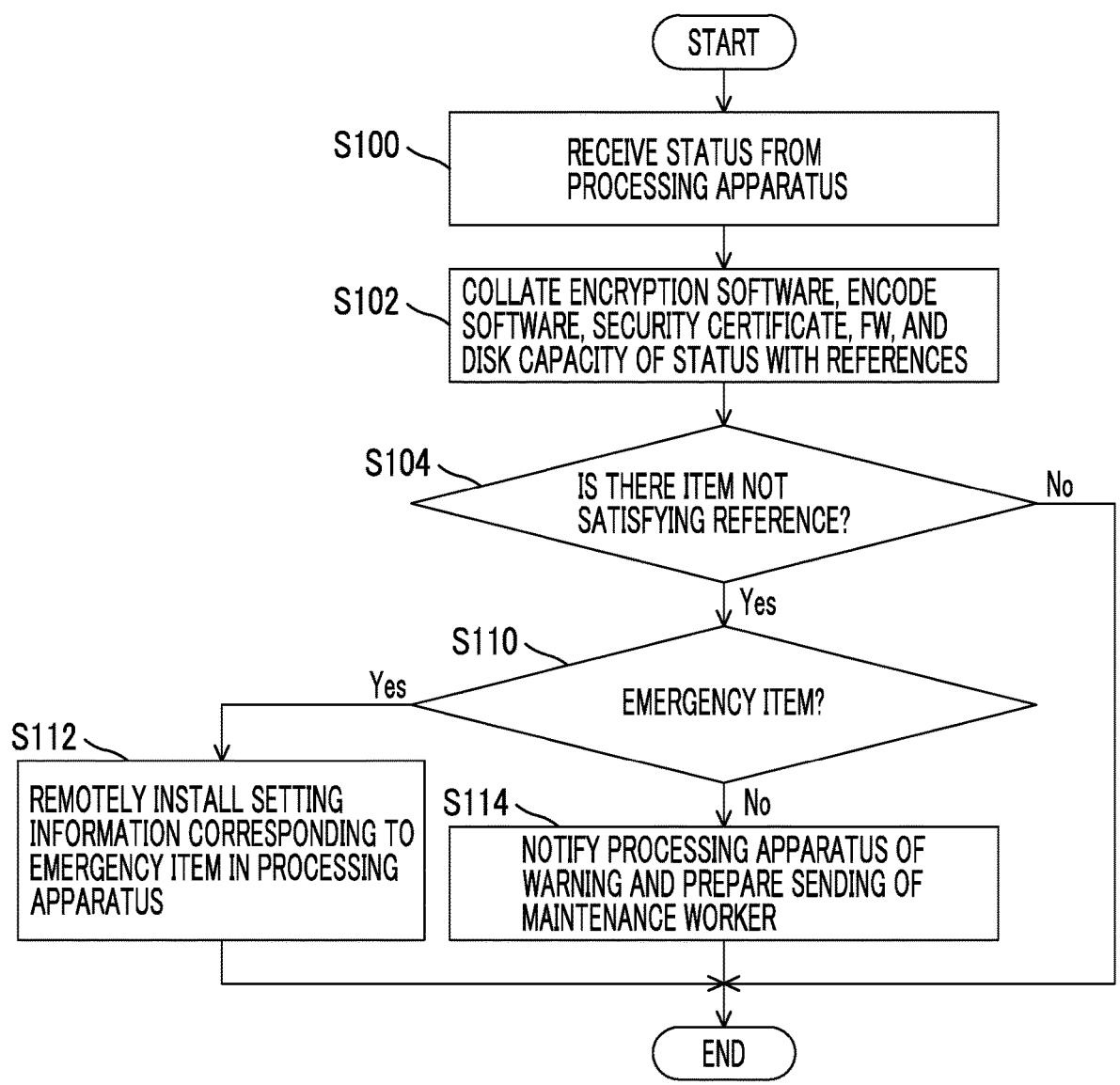
FIG. 17 is a diagram illustrating another example of a flow of a status check process for the processing apparatus, performed by the processing apparatus management server.

With reference to FIG. 17, a description will be made of a modification example of the process in FIG. 16.

In a procedure in FIG. 17, examination target items of the status of the processing apparatus 110 are classified into emergency items and other items according to levels thereof. The emergency items are items which have great influence on quality in terms of security of an eDoc generated by the processing apparatus 110 or the security of the document management system. An eDoc generated by the processing apparatus 110 in which the items do not satisfy the references may not secure sufficient safety, or, in a case where the processing apparatus 110 in which the items do not satisfy the references is continuously operated, the processing apparatus 110 may be a security hole (vulnerability) of the document management system. An example of the emergency item targets is a case where vulnerability is found in a version of the encryption software, a security certificate installed in the processing apparatus 110, or an encryption key installed in the processing apparatus 110.

One of methods for removing a problem due to the emergency items not satisfying the references is that the processing apparatus 110 in which the emergency items do not satisfy the references is stopped, a maintenance worker is sent and corrects and repairs the emergency items. There is inconvenience that a user is unable to use the processing apparatus 110 until the correction is completed.

Therefore, in the procedure in FIG. 17, in a case where an item not satisfying the reference is found in S104, the processing apparatus management server 240 determines whether or not the item is an emergency item (S110). In a case where the item is an emergency item, setting information for correcting a defect of the emergency item is remotely installed in the processing apparatus 110 from the processing apparatus management server 240 via the wide area network 10 (S112). Examples of the setting information for correcting a defect of the emergency item may include encryption software of the latest version, a security certificate of the latest version in which vulnerability is removed for a security certificate in which vulnerability is found, and a new pair of keys replacing a pair of a secret key and a public key of the processing apparatus 110 in which vulnerability is found.

For example, in a case of a new pair of keys, a phrase for generating the new pair of keys is prepared by the processing apparatus management server 240, the pair of keys is generated by using the phrase, and the generated pair of keys is securely transmitted to the processing apparatus 110 so as to be remotely installed.

Consequently, the setting information for the emergency item not satisfying the reference in the processing apparatus 110 is updated to setting information for satisfying the reference. According to the update, a value of the emergency item of the status of the processing apparatus 110 is updated.

In a case where a determination result in S110 is No (not corresponding to an emergency item), the processing apparatus management server 240 sends a warning indicating an item not satisfying the reference to the processing apparatus 110 or the manager, and a preparation of sending a maintenance worker is performed in order to correct the item of the processing apparatus 110 (S114). Regarding an item which is not an emergency item, a serious security problem hardly occurs even in a case where the processing apparatus 110 is continuously operated, and thus a maintenance worker is sent to cope with the item without stopping the processing apparatus 110. The processing apparatus management server 240 may not remotely install items other than the emergency items, and thus it is possible to prevent an increase in a load on the processing apparatus management server 240.

In the example in FIG. 17, setting information for an emergency item is installed in the processing apparatus 110 from the processing apparatus management server 240 in a top-down manner such that the setting information is installed in the processing apparatus 110, and a value of the emergency item of the status of the processing apparatus 110 is updated. In contrast, regarding items other than the emergency item of the status, for example, a maintenance worker sets or changes a value in each processing apparatus 110, and installs setting information (the latest version of the encryption software) corresponding to the items. As mentioned above, the processing apparatus management server 240 which is a host apparatus is notified of setting or a change of a status item value performed in the processing apparatus 110. The processing apparatus management server 240 changes a corresponding status item value of the processing apparatus 110 preserved therein according to the notification.

Verification of DID

In a case where a notification of a DID issued by the processing apparatus 110 is sent, a request (this request includes a DID) for metadata is sent from the viewing terminal 104, or a request for verification of a DID is received from a user or the like, the management system. 200 verifies whether or not the DID is correct.

In this case, the DID server 220 verifies the target DID 600 (refer to FIG. 15) with respect to the following matters.

(a) There is no contradiction between the issue authority key 602 and the processing apparatus specific information 604 of the DID 600.

The DID server 220 examines whether or not the issue authority key 602 is recorded as an issue authority key having the processing apparatus 110 indicated by the processing apparatus specific information 604 as an assignment destination in information (refer to FIG. 5) recorded therein. In a case where the issue authority key 602 is not recorded, the issue authority key 602 has not been issued to the processing apparatus 110 indicated by the processing apparatus specific information 604, and thus both of the two are contradictory to each other. In this case, the DID 600 is an illegal DID.

(b) There is no contradiction between the issue authority key 602 and the issue date 606 of the DID 600.

The DID server 220 records the key assignment date and time and the key end date and time in correlation with the issue authority key (refer to FIG. 5). In a case where the issue date 606 of the DID 600 is not included in a period from the key assignment date and time to the key end date and time, recorded in correlation with the issue authority key 602 of the DID 600, the issue authority key 602 is contradictory to the issue date 606. In this case, the DID 600 is an illegal DID.

(c) There is no contradiction among the issue authority key 602, the processing apparatus specific information 604, and the issue certification key 608 of the DID 600.

The DID server 220 decrypts the issue certification key 608 with a public key of the processing apparatus 110 indicated by the processing apparatus specific information 604, and determines whether or not an issue certification key indicated by a decryption result matches the issue certification key 608 of the DID 600. In a case of mismatching, there is a contradiction among the three pieces of information, and thus it is determined that the DID 600 is illegal.

(d) There is no contradiction between the issue number 610 of the DID 600 and an issue scope corresponding to the issue authority key 602.

The DID server 220 records an issue scope assigned to the processing apparatus 110 along with the issue authority key 602 (refer to FIG. 5). In a case where the issue number 610 of the DID 600 is larger than the issue scope recorded in correspondence to the issue authority key 602, the DID is illegal.

(e) The issue number 610 of the DID 600 is not contradictory to an issue number of an issued DID including the same issue authority key as the issue authority key 602 of the DID 600. In a case where a notification of an issued new DID is sent from the processing apparatus 110, this reference is used to verify whether or not the DID is contradictory to a DID which has already been issued.

The DID server 220 records a DID issued by using an issue authority key or information regarding the issue date and time in correlation with the issue authority key (the issued DID list in FIG. 5). The DID server 220 examines whether or not there is a DID having the same issue number as the issue number 610 of the DID 600 among issued DIDs having the same issue authority key as the issue authority key 602 of the verification target DID 600. In a case where there is such a DID, it is determined that the DID 600 is illegal.

(f) A combination of the issue date 606 and the issue number 610 of the DID 600 is not contradictory to a combination of an issue date and an issue number of an issued DID including the same issue authority key as the issue authority key 602 of the DID 600.

The DID server 220 determines whether or not a combination of the issue date 606 and the issue number 610 of the verification target DID 600 is contradictory to a combination of an issue date and an issue number of each issued DID including the same issue authority key as the issue authority key 602 of the DID 600, that is, an anteroposterior relationship is reversed. For example, in a case where an issued DID of which an issue number is smaller despite an issue date being later than that of the DID 600 is found, the DID 600 is contradictory to the issued DID, that is, an anteroposterior relationship is reversed. In a case where such a contradiction is found, it is determined that only the verification target DID 600 or both of the DID 600 and the issued DID are illegal.

In a case where it is determined that a certain DID is illegal through verification according to a reference as described above, the DID server 220 sends a warning notification to a manager of the processing apparatus 110 related to the illegal DID by using an electronic mail or the like. The warning notification includes a message indicating that the processing apparatus 110 has issued a DID and a camouflaged DID has been found. The manager takes a measure to reinforce security due to the notification. The manager of the processing apparatus 110 or a contact thereof may be acquired from information (refer to FIG. 6) held in the processing apparatus management server 240. The processing apparatus 110 related to the illegal DID, which is a destination of the warning notification, is the processing apparatus 110 indicated by the processing apparatus specific information 604 included in the DID. The processing apparatus 110 which assigned the same issue authority key as an issue authority key included in the illegal DID in the past may be a destination of the warning notification.

Process in case where Vulnerability is found in Encryption of eDoc

Next, a description will be made of a process in a case where vulnerability is found in the encryption software used for encryption during generation of an eDoc file. In a case where an administrator of the document management system recognizes that vulnerability is found in a specific version of the encryption software used by any processing apparatus 110, the administrator transmits a vulnerability notification to each processing apparatus 110 from the management system 200. The vulnerability notification includes information regarding a software name and a version of the encryption software in which vulnerability is found. In a case where there is the in-organization management system 150, the vulnerability notification is forwarded to the in-organization management system 150 from the management system 200, and the in-organization management system 150 transmits the vulnerability notification to each processing apparatus 110 subordinate thereto. The processing apparatus 110 performs a process exemplified in FIG. 18 in response to the notification.

In a case where the vulnerability notification is received from a host apparatus (the management system 200 or the in-organization management system 150) (S200), the processing apparatus 110 specifies a file which is encrypted thereby by using a version of the encryption software in which the vulnerability indicated by the notification is found (S202). Each eDoc file and metadata thereof generated by the processing apparatus 110 are preserved in the document DB 116 of the processing apparatus 110, and an encryption software name and a version thereof used to generate each eDoc may be specified on the basis of the metadata of each eDoc file (refer to the metadata structure example illustrated in FIG. 3). In S202, the processing apparatus 110 specifies an eDoc in which a combination of the encryption software name and version included in the metadata matches a combination indicated by the vulnerability notification.

Next, the processing apparatus 110 re-encrypts each specified eDoc file with a version of the currently used encryption software installed therein (S204). In this example, it is supposed that the encryption software of the processing apparatus 110 is subject to appropriate version update, and thus vulnerability is not found in the version of the currently used encryption software of the processing apparatus 110. Generally, vulnerability is often found in a version of encryption software used in the past by the processing apparatus 110. In a case where a version of encryption software which is a target of the vulnerability notification is encryption software of the currently used version of the processing apparatus 110, the processing apparatus 110 downloads encryption software of the latest version from a host apparatus or the like, and performs re-encryption by using the latest version. In a case where vulnerability is found in the currently used encryption software of the latest version, the host apparatus is supposed to have encryption software of a newer version in which the vulnerability is removed or information regarding a delivery source of the software. Regarding the re-encryption, for example, a target eDoc file is decrypted by using information regarding a decryption key recorded in metadata corresponding to the eDoc file, and a decryption result is encrypted with a generated new encryption key by using encryption software of a version without vulnerability. It is assumed that information regarding a decryption key is included in the metadata preserved in the processing apparatus 110 in a state of being encrypted with, for example, a public key of the processing apparatus 110 (similarly, metadata sent to a host apparatus may include a decryption key encrypted with a public key of the host apparatus).

The processing apparatus 110 updates the metadata of the eDoc file according to the re-encryption (S206). In other words, the encode date and time and the encryption information (encryption software name and version information and key information) of the metadata (refer to FIG. 3) are rewritten to the re-encryption date and time, the encryption software name and version used for the re-encryption, and information regarding a decryption key for decryption. The processing apparatus 110 preserves the updated metadata (for example, preserves the latest metadata for the eDoc file), and uploads the metadata to the host apparatus. The host apparatus preserves the updated metadata which is uploaded.

Thereafter, the processing apparatus 110 performs a process of delivering the eDoc file obtained through the re-encryption to each delivery destination viewing terminal 104 indicated by delivery destination information of the metadata (S208). In other words, for example, a delivery preparation completion notification is sent to each delivery destination viewing terminal 104 (refer to step (7) in FIG. 8). This notification may include information indicating that the eDoc to be delivered is an updated version of a delivered eDoc in addition to a DID or a document name. In a case where a viewing person instructs the eDoc of which the delivery preparation completion notification is received due to the re-encryption to be a viewing target on the list screen 500 (refer to FIG. 11) of the viewing terminal 104, the viewing terminal 104 having received the delivery preparation completion notification overwrites the eDoc file acquired from the processing apparatus 110 on an eDoc file before being re-encrypted preserved in the viewing terminal 104 in response to the instruction. The viewing terminal 104 preserves the updated metadata received along with the eDoc file as the latest metadata of the eDoc. Consequently, the eDoc file encrypted with the vulnerable encryption software and the metadata corresponding thereto are removed from the viewing terminal 104, and are replaced with the eDoc file re-encrypted with the encryption software in which vulnerability is not found and the metadata.

The processing apparatus 110 may explicitly transmit a deletion notification including a DID of the eDoc to each delivery destination viewing terminal 104 at the time of sending a viewing preparation completion notification of the re-encrypted eDoc or before that. In this case, each viewing terminal 104 deletes an existing eDoc file (before being re-encrypted) having the DID in response to the instruction. In this case, existing metadata may also be deleted.

Another Example of Designation of Delivery Destination Terminal

In the example described hitherto, a user and the viewing terminal 104 which are selectable as delivery destinations on a UI screen (the input screen 400 in FIG. 9) of the creation terminal 102 by a delivering person are restricted to a user and the viewing terminal 104 registered in the processing apparatus 110 in the identical local system 100, or a user and the viewing terminal 104 (in this case, a user and the viewing terminal 104 registered in another processing apparatus 110 may be designated as delivery destinations) registered in the in-organization management system 150 of an identical organization.

However, there is a case where, in a conference where a user in an organization and people (guests) outside the organization are mixed with each other, the user wants to temporarily view a document such as a created memo to a guest. In this case, the guest or a portable terminal of the guest being registered in the processing apparatus 110 or a host apparatus thereof, and the registration being canceled after viewing is finished is complex work.

Therefore, in the document management system, an eDoc may be delivered to the viewing terminal 104 which may be determined as being a terminal of the guest, under a predetermined restriction.

For example, a terminal of a user near the creation terminal 102 is regarded as a guest terminal, and the guest terminal is added to options of the delivery destination terminal selection menu 406. Alternatively, a terminal of a user near the processing apparatus 110 is regarded as a guest terminal, and the guest terminal is added to options of the delivery destination terminal selection menu 406. The creation terminal 102 or the processing apparatus 110 is often provided in a room (for example, a room of a department or a conference room) of a building of an organization, and a person present near the creation terminal 102 or the processing apparatus 110 is supposed to obtain an appropriate permission for a conference and to be in the room.

For example, the processing apparatus 110 or the creation terminal 102 finds partner terminals which are able to communicate by using short-range radio communication such as Bluetooth Low Energy (registered trademark), and determines the found partner terminals, or terminals to which a distance (a communication distance between the apparatus or the terminal and a partner may be obtained in the short-range radio communication) therefrom is equal to or less than a predefined threshold value among the partner terminals, as guest terminals present near the processing apparatus 110 or the creation terminal 102. Guest names of the guest terminals detected by the processing apparatus 110 or the creation terminal 102 are displayed as options in a display aspect which is different from that of the viewing terminal 104 in the organization registered in advance, in the delivery destination terminal selection menu 406. The delivering person may select a guest terminal serving as a delivery destination.

Here, the processing apparatus 110 or the creation terminal 102 may not select all terminals located in the vicinity thereof, and may select only a terminal satisfying a predetermined condition among the terminals nearby as a guest terminal from delivery destination options. For example, there may be a condition that a version of a viewer application installed in a terminal or other specific software is equal to or higher than a certain version, or a terminal is not included in a predefined rejection terminal list.

Generally, a user carrying a guest terminal is not registered in the processing apparatus 110 or the local user ID server 152. Therefore, in a case where an eDoc file or metadata is requested from a guest terminal designated as a delivery destination of a document, the processing apparatus 110 may omit user authentication, and may deliver the data. A deletion instruction for deleting an eDoc file and metadata from the guest terminal in a case where a deletion condition is satisfied is incorporated into metadata of an eDoc delivered to the guest terminal. The deletion condition is, for example, a case where eDoc screen display is finished, or a case where a predetermined permission period elapses from a delivery time point. The guest terminal deletes the eDoc file and the metadata from the guest terminal at the time at which the deletion condition is satisfied. Consequently, an eDoc leakage risk due to a guest terminal is reduced.

Coping with Request from Terminal other than Delivery Destination Terminal

The example described hitherto relates to a push type delivery form in which the processing apparatus 110 delivers an eDoc (or a delivery preparation completion notification corresponding thereto) to the viewing terminal 104 which is designated as a delivery destination by a delivering person.

However, as another example, there may be a pull type delivery form in which a list of eDocs held in the processing apparatus 110 is provided to the viewing terminal 104 in response to a request from the viewing terminal 104, and a viewing target selected by a user from the list is delivered to the viewing terminal 104. In a case of the pull type delivery form, a delivery destination user may access the processing apparatus 110 from the viewing terminal 104 not designated as a delivery destination, and may request an eDoc. Countermeasures taken by the processing apparatus 110 in a case where there is such a request include the following methods.

(Method 1) In a case where an eDoc delivery request is received from the viewing terminal 104, the processing apparatus 110 determines whether or not the viewing terminal 104 corresponds to a viewing terminal designated as a delivery destination in delivery destination information of the latest metadata of the eDoc. In a case where it is determined that the viewing terminal 104 does not correspond, neither a file (entity) of the eDoc nor metadata thereof is transmitted to the viewing terminal 104. In a case where it is determined that the viewing terminal 104 corresponds, it is further determined whether or not a user (or a combination of the user and the viewing terminal 104) having made the delivery request is included in delivery destination information of the metadata. In a case where the user is included, delivery may be performed, and, in a case where the user is not included, delivery may not be performed.

As mentioned above, in Method 1, an eDoc (an entity file and metadata) is not delivered to the viewing terminal 104 which does not correspond to a delivery destination designated by a delivering person.

(Method 2) In this method, even in a case where the viewing terminal 104 having made an eDoc delivery request does not correspond to the delivery destination viewing terminal 104 defined delivery destination information of metadata of the eDoc, the processing apparatus 110 transmits an entity file and metadata of the eDoc in a case where a user (that is, a user using the viewing terminal 104) having issued the request is included in the delivery destination information as a delivery destination. However, in this case, the processing apparatus 110 incorporates flag information indicating that preservation is not possible into an eDoc file and metadata which are to be transmitted. The viewing terminal 104 displays the eDoc file and the metadata including the flag information indicating that preservation is not possible, but does not accept a preservation instruction from the user, and discards the eDoc file and the metadata without preservation in a case where the user finishes viewing.

Instead of the method in which an eDoc file and metadata transmitted to the viewing terminal 104 not designated as a delivery destination are not preserved in the viewing terminal 104, preservation may be temporarily permitted. However, in this case, in a case where the viewing terminal 104 opens the eDoc file again thereafter, the viewing terminal 104 requests (a request for obtaining permission of viewing) the latest metadata of the eDoc to the processing apparatus 110 or the like, but the processing apparatus 110 determines whether or not a combination of the viewing terminal 104 and the requesting user is included in delivery destination information of the metadata in response to the request, and gives an instruction for deleting the eDoc to the viewing terminal 104 in a case where the combination is not included. The viewing terminal 104 deletes the preserved eDoc file and metadata corresponding thereto in response to the instruction. The processing apparatus 110 may give a response about the latest metadata instead of explicitly giving an eDoc deletion instruction to the viewing terminal 104 having requested the latest metadata. In this case, it is determined whether or not a combination of the viewing terminal 104 and the current user is included in the received latest metadata, and, in a case where the combination is not included, the viewing terminal 104 may not open the eDoc, and may further delete the preserved eDoc file.

Figure 18:
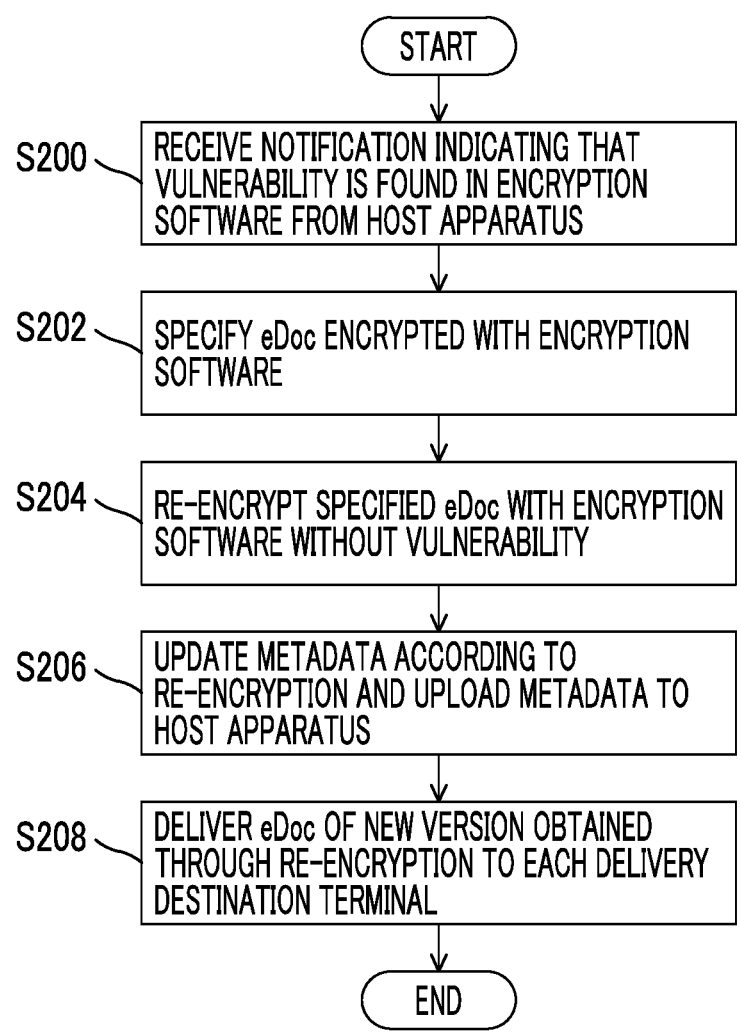
FIG. 18 is a diagram illustrating an example of a flow of a process in the processing apparatus in a case where vulnerability is found in encryption software.

In the example in FIG. 18 described above, the eDoc file after being re-encrypted takes over a DID of the eDoc file before being re-encrypted, but a DID which is different from that of the eDoc file before being re-encrypted may be assigned to the eDoc file before re-encrypted. In this case, the processing apparatus 110 gives an explicit deletion instruction including the DID of the eDoc file before being re-encrypted to each delivery destination viewing terminal 104, and thus the vulnerable eDoc file before being re-encrypted is not left in the viewing terminal 104. Correlation information indicating that the eDoc file after being re-encrypted and the eDoc file before being re-encrypted correspond to an identical document is recorded in metadata corresponding to the eDoc file after being re-encrypted or the processing apparatus 110 (or the DID server 220 or the local DID server 154 which is a host apparatus). In a case where the correlation information is recorded in the metadata corresponding to the eDoc after being re-encrypted, for example, the metadata may include the DID of the eDoc before being re-encrypted as an item of a "DID before being updated".

In the above example, an eDoc file is not delivered to terminals other than the viewing terminal 104 which is connectable to the local network 108 connected to the processing apparatus 110 in which the eDoc file is registered. However, in a special case where security is ensured, the eDoc file may be delivered to the viewing terminal 104 connected to another network from the processing apparatus 110. This example will be described below.

In this example, the processing apparatuses 110 are grouped, and an eDoc held in a certain processing apparatus 110 may be permitted to be delivered to the viewing terminal 104 connected to another processing apparatus 110 included in an identical group. A group is defined according to a contractor's request. For example, a group is defined in a form in which the processing apparatuses 110 corresponding to an identical contractor are set as a single group, or the processing apparatuses 110 provided in an identical base (a factory or an office) or a department of a company which is a contractor are set as a single group. In a case where a plurality of contractors perform cooperative work, the processing apparatuses 110 provided in a division for which the contractors perform cooperative work may be set as a single group.

Figure 19:
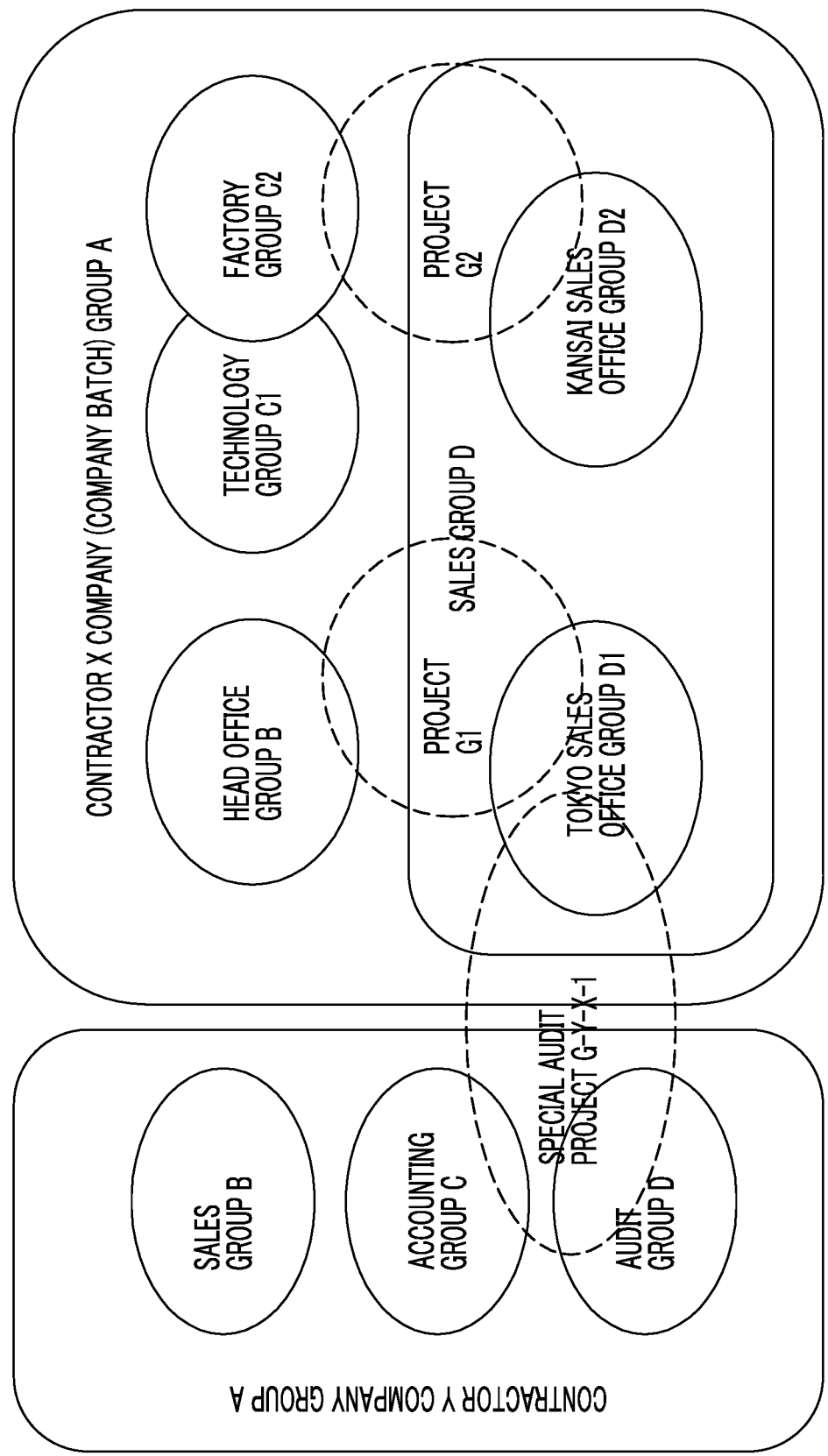
FIG. 19 is a diagram illustrating an example of setting a group in the processing apparatus.

FIG. 19 exemplifies groups set in two contractors such as an X company and a Y company. In this example, first, a group A formed of all processing apparatuses 110 provided in the X company is set in the X company. A group B formed of the processing apparatuses 110 provided in a head office of the X company, and groups C1, C2, and D formed of the processing apparatuses 110 respectively provided in a technology division, a factory division, and a sales division are set. The groups B, C1, C2, and D are included in the group A. The group D of the sales division includes a group D1 formed of the processing apparatuses 110 provided in a Tokyo sales office and a group D2 formed of the processing apparatuses 110 provided in a Kansai sales office. The groups A, B, C1, C2, D, D1, and D2 are groups provided according to an organization structure of the X company, and are supposed to be present substantially eternally. As mentioned above, the groups supposed to be eternally will be referred to as fixed groups. On the other hand, groups G1 and G2 for a temporary project made ad hoc are set in the X company. For example, the group G1 includes the processing apparatuses 110 provided in a division which participates in a corresponding project team. A group such as the groups G1 and G2, based on being temporary, will be referred to as a variable group.

Similarly, four fixed groups such as a group A formed of all processing apparatuses 110 provided in the Y company, and groups B, C, and D formed of processing apparatuses 110 respectively provided in a sales division, an accounting division, and an audit division are set in the Y company. The groups B, C, and D are included in the group A.

In the illustrated example, the X company and the Y company perform cooperative work, and a group G-Y-X-1 which is a variable group extending over the two companies and is formed of the processing apparatuses 110 included in divisions of the X company and the Y company relating to the cooperative work is set for a special audit project regarding the cooperative work.

Figures 20, 21:
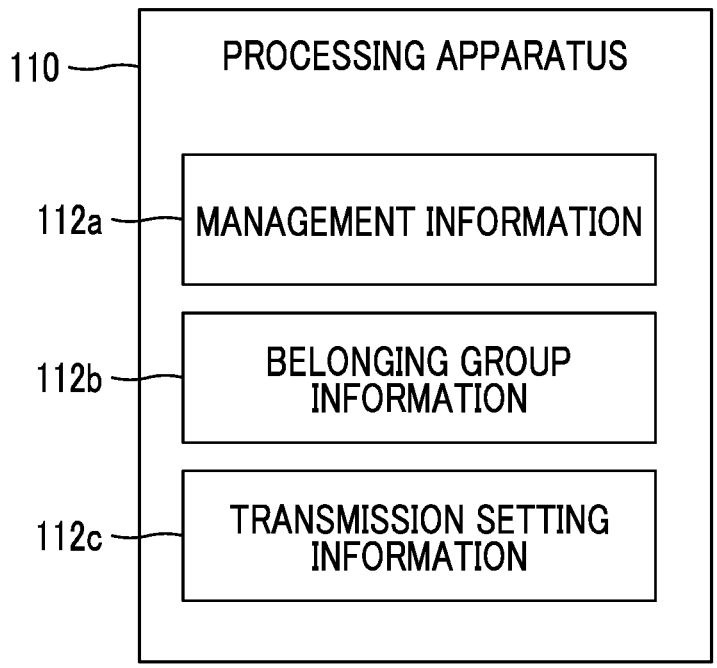
FIG. 20 is a diagram illustrating various pieces of information which is held in the processing apparatus for transmission management.
FIG. 21 is a diagram illustrating an example of transmission setting information in a certain processing apparatus.

Meanwhile, in this example, as illustrated in FIG. 20, in addition to management information 112*a*, belonging group information 112*b* and transmission setting information 112*c* are held in each processing apparatus 110.

The belonging group information 112*b* is information indicating a group to which the processing apparatus 110 belongs. As an example, belonging group information of the processing apparatus 110 is a list of IDs of groups to which the processing apparatus 110 belongs. A group ID is identification information for uniquely identifying a group globally. The global uniqueness of a group ID may be realized in a form including a globally unique contractor ID (for example, a serial number of a group of the contractor is merged into the contractor ID).

In addition to a group corresponding to a division in which the processing apparatus 110 is provided, a group ID of a higher group including the group is included. For example, in the example in FIG. 19, belonging group information the processing apparatus 110 provided in a department participating in the special audit project in the Tokyo sales office includes group IDs of four groups such as the groups D1, D, A, and G-Y-X-1.

The transmission setting information 112*c* is setting information for a transmission method in a case where an eDoc held in the processing apparatus 110 is transmitted in response to a request from another processing apparatus 110. In this example, in a case where a transmission request for the eDoc held in the processing apparatus 110 is received from another processing apparatus 110, and the processing apparatus 110 which is a request source belongs to an identical group, the processing apparatus 110 gives a response about the eDoc to the request source. Here, as described above, the processing apparatus 110 may belong to a plurality of groups, and thus the transmission setting information 112*c* is provided such that a transmission method or condition differs for each belonging group.

FIG. 21 illustrates an example of the transmission setting information 112c. The illustrated example is the transmission setting information 112c set in the processing apparatus 110 provided in a department which also participates in the special audit project in the Tokyo sales office of the X company in the group configuration example in FIG. 19. The processing apparatus 110 belongs to four groups such as the groups D1, D, A, and G-Y-X-1, and one of three-stage levels such as "AA", "BB", and "CC" is set for each of the four groups.

The level "AA" corresponds to a method in which a requested eDoc is immediately transmitted to a request source according to a predefined transfer protocol. This level is applied to a close group formed of the processing apparatuses 110 which are reliable to each other. There are various transfer protocols such as FTP, TFTP, FTPS, WebDAV, rsync, and SCP, and the predefined transfer protocol may be anyone thereof. In order to increase safety, a result obtained by adding a modification (for example, higher level encryption) to such a protocol may be used.

The level "BB" corresponds to a method in which a communication connection state with a request source is checked, and transmission is performed by using a transfer protocol (for example, a transfer protocol with the highest security) selected from among transfer protocols which are available to both of a request destination and the request source according to a predetermined reference. This level method is equivalent to a method used for general data transmission.

The level "CC" corresponds to a method in which a requested eDoc is transmitted to the processing apparatus 110 which is a request source only in a case where a person (for example, an owner, that is, a user having registered the eDoc in the processing apparatus 110) having specific high authority for the eDoc makes the request. A protocol used for transmission is determined through negotiation with the request source processing apparatus 110 in the same manner as in the level "BB". The level "CC" is supposed to be applied to a group or the like including the processing apparatus 110 with low reliability regarding security.

A cache period of the eDoc in the transmission destination processing apparatus 110 may be correlated with each level. As a level becomes higher, a cache period becomes longer. A high level of a group indicates that reliability between the processing apparatuses 110 belonging to the group is high. In the above example, the level is lowered in an order of "AA", "BB", and "CC".

The processing apparatus 110 transmits a requested eDoc to a request source along with information regarding a cache period corresponding to a level determined for the request source. The request source processing apparatus 110 caches the transmitted eDoc for the cache period, and responds by using the cached eDoc in a case where a request for the eDoc is received for the period.

The transmission setting information exemplified in FIG. 21 includes two columns such as "matching" and "special setting". The "matching" is a column indicating a level applied to a matching belonging group between the processing apparatus 110 holding a transmission request target eDoc and the processing apparatus 110 which is a transmission request source. The "special setting" is a column for omnipotent setting used for business audit or management. For example, the "special setting" enables an eDoc to be transmitted from the processing apparatuses 110 belonging to all fixed groups to an apparatus of an auditor or a manager. A request source being an apparatus of an auditor or the like is certified by the apparatus transmitting special authentication information indicating the auditor to the processing apparatus 110 which is a request destination.

The above-described belonging group information 112b and transmission setting information 112c are set in each processing apparatus 110 by, for example, a manager of each processing apparatus 110 or a service person of a vendor providing the service of the system.

The belonging group information 112b and the transmission setting information 112c held in the processing apparatus 110 are registered in the processing apparatus management server 240 illustrated in FIG. 6 as the item of the status 244 of the status history 242 corresponding to a processing apparatus ID of the processing apparatus 110.

Hereinafter, a description will be made of a process in which a user registered in a certain processing apparatus 110 (referred to as a "home apparatus") acquires an eDoc in the home apparatus from another base outside a local network connected to the home apparatus via the processing apparatus 110 (referred to as an "away apparatus") present in the base. An ID of the home apparatus is registered as a predefined processing apparatus ID of the user in the user ID server 210 (refer to FIG. 4). Typically, the user accesses the local network 108 connected to the home apparatus, and receives delivery of an eDoc registered in the home apparatus. Herein, a description will be made of a flow of a case where, when the user goes to another place, and the user receives delivery of an eDoc from the home apparatus via an away apparatus connected to the local network 108 of the place.

Figure 22:
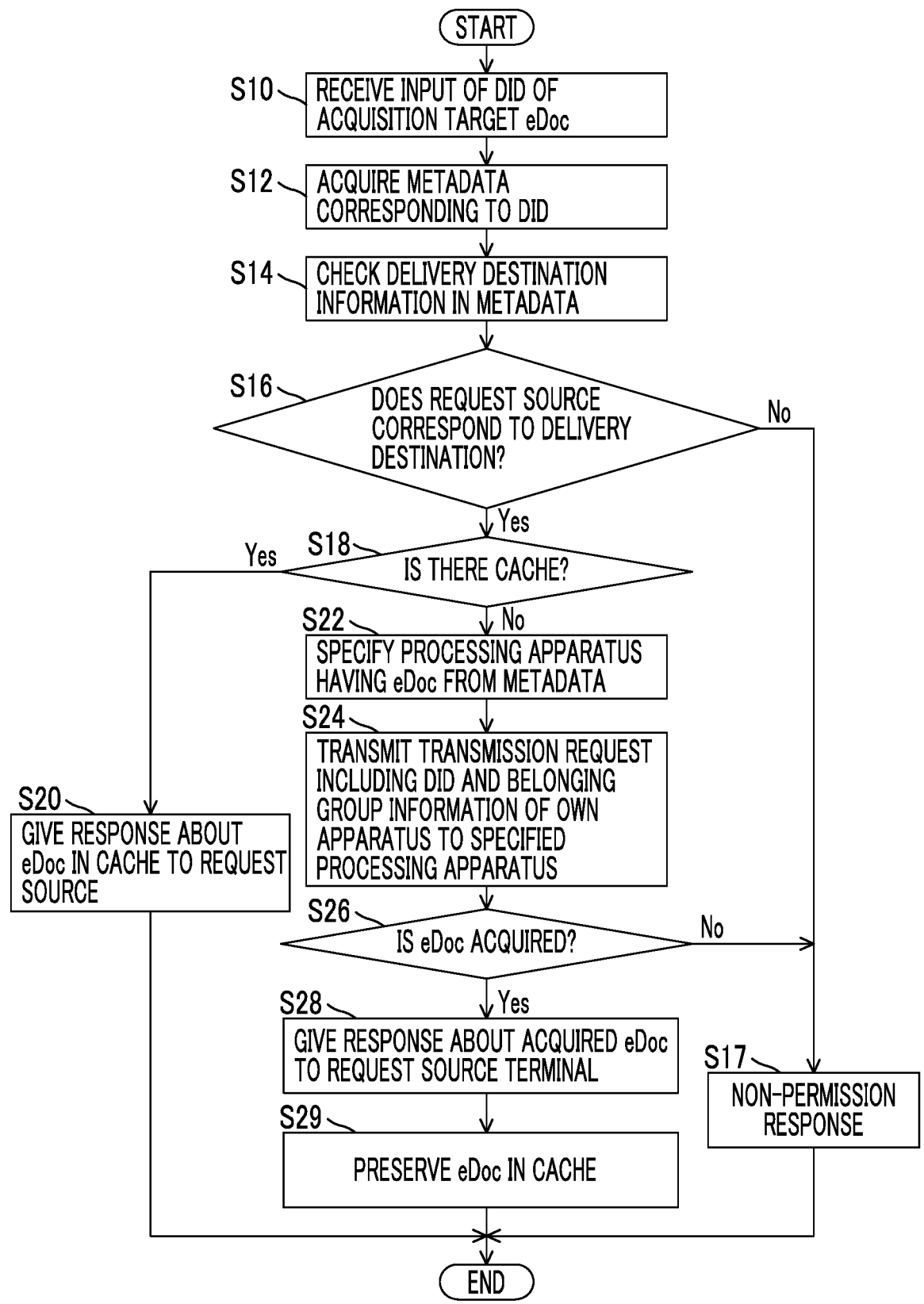
FIG. 22 is a diagram illustrating an example of a process procedure in a processing apparatus corresponding to an away apparatus.

With reference to FIG. 22, a description will be made of an example of a process procedure in the away apparatus. In this procedure, the away apparatus receives input a DID of an acquisition target eDoc from the viewing terminal 104 of a user (a user who is not registered in the away apparatus) (S10). Here, before this step, the away apparatus may subject the user accessing thereto to user authentication by using the user ID server 210 which is a host apparatus. After the user authentication, the viewing terminal 104 of the user may acquire a list of eDocs in which the user is set as a delivery destination from the metadata server 230 or the home apparatus, present the list to the user, and receive selection of an acquisition target.

Next, the away apparatus acquires the latest metadata corresponding to the DID which is input in S10 from the metadata server 230 (S12), and checks whether or not the user is included in delivery destination information (refer to FIG. 3) of the metadata (S14 and S16). In a case where the user is not included in the delivery destination information, the away apparatus sends error information indicating that delivery is not permitted to the viewing terminal 104 (S17). The viewing terminal 104 displays the information indicating that delivery is not possible on a screen according to the error information.

In a case where it is checked that the user is a delivery destination of an eDoc in S16, it is examined whether or not a file of the eDoc is present in a cache of the away apparatus (S18). In a case where the eDoc remains in the cache in a state of having already been acquired from the home apparatus, a determination result in S18 is Yes. In this case, the away apparatus gives a response about the eDoc in the cache to the viewing terminal 104 (S20).

In a case where a determination result in S18 is No, the away apparatus specifies a home apparatus having the eDoc on the basis of metadata thereof (S22). A processing apparatus corresponding to a processing apparatus ID included in the metadata (refer to FIG. 3) is a home apparatus. The away apparatus acquires address information of the home apparatus from the management system 200, accesses the home apparatus by using the address information, and sends a transmission request for the eDoc (S24). The transmission request includes a DID of the eDoc and belonging group information of the away apparatus.

Next, the away apparatus determines whether or not the eDoc is provided from the home apparatus in response to the transmission request (S26). As will be described later, in a case where the away apparatus does not belong to a group common to the home apparatus, the home apparatus does not transmit the eDoc to the away apparatus, and thus a determination result in S26 is No. In this case, the away apparatus sends error information indicating that delivery is not permitted to the viewing terminal 104 (S17). The viewing terminal 104 displays information indicating that delivery is not possible on a screen according to the error information.

In a case where a determination result in S26 is Yes, the away apparatus gives a response about the eDoc transmitted from the home apparatus to the viewing terminal 104 of the request source user (S28). The away apparatus caches the eDoc in a storage device thereof (S29). Here, in a case where a cache period is designated in the eDoc transmitted from the home apparatus, the away apparatus deletes the eDoc from the cache in a case where the cache period elapses from a time point at which the eDoc is acquired. The cache period is defined separately from a valid period of the eDoc on the viewing terminal 104. In a case where the cache period is not designated, an old eDoc is discarded according to a typical cache algorithm such as Least Recently Used.

Figure 23:
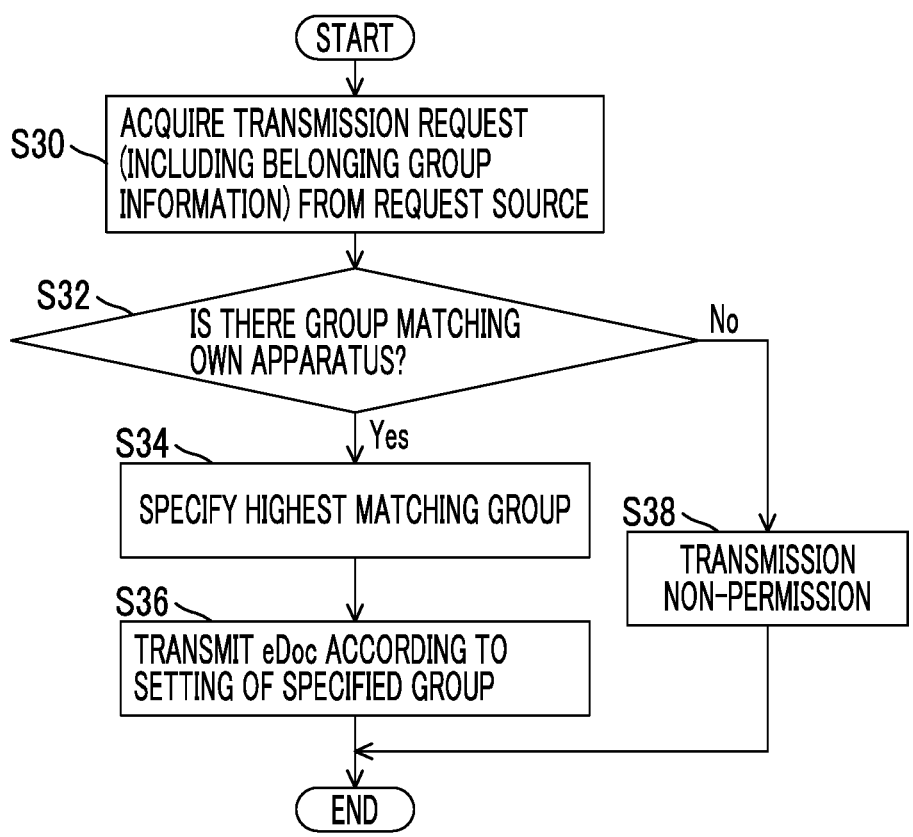
FIG. 23 is a diagram illustrating an example of a process procedure in a processing apparatus corresponding to a home apparatus.

With reference to FIG. 23, a description will be made of an example of a process procedure in the home apparatus in a case where a transmission request for an eDoc is received from the away apparatus. In a case where a transmission request is received from the away apparatus (S30), the home apparatus compares belonging group information (of the away apparatus) in the transmission request with belonging group information of the home apparatus, and determines whether or not there is a group ID matching (common to) between both of the pieces of information (S32). In a case where there is no common group ID, the home apparatus gives a response about information indicating that the requested eDoc is not transmitted to the away apparatus (S38). In this case, since the away apparatus does not belong to the same group as that of the home apparatus, and thus is not a clearly reliable apparatus, the home apparatus does not permit transmission.

In a case where a determination result in S32 is Yes, the home apparatus specifies the highest level in levels of a group ID matching between both of the pieces of information (S34), and transmits the eDoc to the away apparatus by using a transmission method corresponding to the specified level (S36). In a case where a cache period is set in the specified level, information indicating the cache period is transmitted to the away apparatus in correlation with the eDoc. In a case where the highest level specified in S34 is the level "CC", the home apparatus may determine whether or not a user ID related to a transmission request source corresponds to a person (for example, an owner) having specific high authority for the eDoc, and may proceed to S36 where the eDoc is transmitted in a case where the user ID corresponds, and may proceed to S38 where a response about information indicating that transmission is not permitted is given in a case where the user ID does not correspond.

A tunneling protocol is incorporated into the processing apparatus 110 which is required to pass a firewall in order to transmit an eDoc. The incorporated tunneling protocol may be any of L2F, PPTP, L2TP, GRE, and IPsec. There may be a procedure in which a plurality of protocols are incorporated, and a protocol common to a transmission partner is selected and used.

The stability of transmission may be increased by setting an upper limit of a data amount of an eDoc which is permitted to be automatically transmitted according to the process procedure depending on the type of transfer protocol used for transmission of an eDoc or the use and/or the type of tunneling protocol. In a case where a data amount exceeds the upper limit, the eDoc may be divided into portions which are equal to or less than the upper limit so as to be transmitted.

In the above example, the belonging group information 112*b* of each processing apparatus 110 includes not only an ID of a group to which the processing apparatus 110 directly belongs, but also IDs of all groups to which the processing apparatus 110 hierarchically belongs, such as an ID of a wider group including the group, but such a form of the belonging group information 112*b* is only an example. Instead of the processing apparatus 110 having the belonging group information 112*b*, there may be a form in which the belonging group information 112*b* is held in a server provided on a network which is accessible from the processing apparatus 110, and the processing apparatus 110 refers thereto. The processing apparatus 110 may have only an ID of a group to which the processing apparatus 110 directly belongs, and may refer to information regarding a hierarchical relationship between groups from a server on a network.

As exemplified above, the processing apparatuses 110 are grouped according to a contractor's request, and transmission of an eDoc is permitted between the processing apparatuses 110 in an identical group. Therefore, a user has an increasing chance to be able to acquire an entity of the eDoc addressed to the user even in a case where the user is present in a place other than a place (for example, an office of the user) where the processing apparatus 110 to which the user is registered is present.

As mentioned above, the document management system including the processing apparatus 110 and the management system 200 has been described.

Next, a description will be made of an example of a case where document transmission control according to an exemplary embodiment of the invention is applied to the document management system. The present exemplary embodiment provides a structure in which a user securely transmits an eDoc stored in a predefined processing apparatus 110 thereof to a transmission destination user using another processing apparatus 110 as a "predefined processing apparatus".

As described above, a public key certificate of the processing apparatus, issued from a certificate authority based on a public key which is a basis of information security in the document management system, is installed in the processing apparatus 110 of each user (for example, a company) in the local system 100. The public key certificate is subjected to maintenance so as to be appropriately updated before lapsing. Each processing apparatus 110 registers an information set for specifying the processing apparatus 110 (hereinafter, referred to as a "specifying information set") and a public key certificate of a public key thereof in the management system 200 (particularly, the processing apparatus management server 240). Here, the specifying information set of the processing apparatus 110 includes, for example, a processing apparatus ID, state information regarding a contract, and security maintenance information.

The processing apparatus ID may be unique identification information assigned by the management system 200, and may employ other identification information such as an IP address, an FQDN, or a MAC address of the processing apparatus 110. The processing apparatus ID may be a combination of two or more such as an IP address and the FQDN. The specifying information set and the public key certificate of the processing apparatus 110 are included in management information (refer to FIG. 6) of the processing apparatus 110 held in the processing apparatus management server 240 of the management system 200. For example, the processing apparatus ID and the contractor ID in FIG. 6 are examples of elements included in the specifying information set. The specifying information set is used as specific information of the processing apparatus 110 during authentication of the processing apparatus 110 in the management system 200 which will be described later. An arrangement order of items of the management information of the processing apparatus 110 held in the processing apparatus management server 240 is determined in advance in the specifying information set, and the processing apparatus 110 and the management system 200 configures the specifying information set of the processing apparatus 110 according to the determination.

Figure 24:
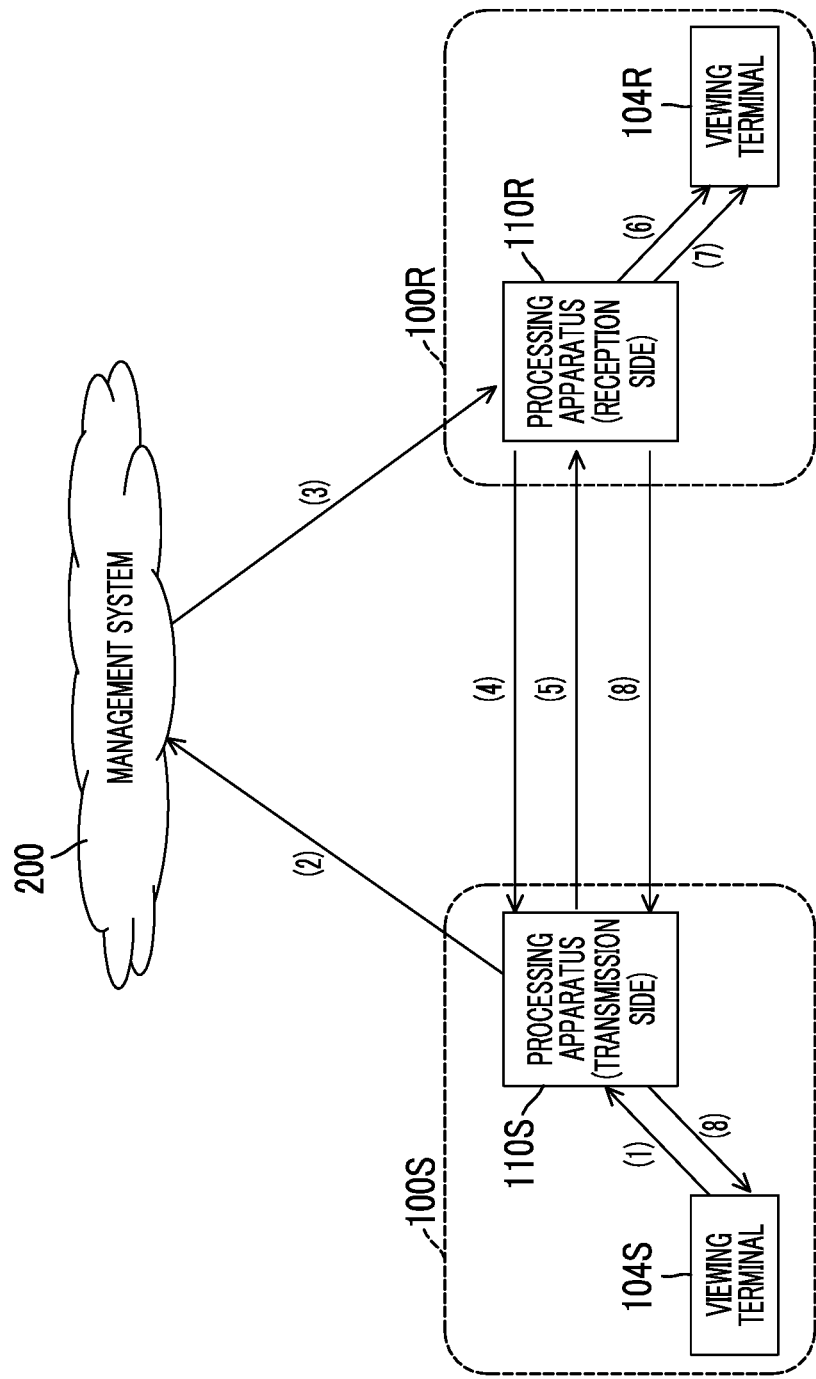
FIG. 24 is a diagram for explaining a process of an exemplary embodiment in which a document is transmitted via a transmission side and reception side processing apparatuses in a system of the exemplary embodiment.

With reference to FIG. 24, a description will be made of a flow of document transmission in the present exemplary embodiment. The flow illustrated in FIG. 24 is configured with the respective steps from the following (1) to (8).

(1) A transmitting person gives a transmission instruction to a processing apparatus 110S.

(2) The processing apparatus 110S on the transmission side requests transmission permission to the management system 200.

(3) The management system 200 instructs a processing apparatus 110R on the reception side to start a reception process.

(4) The processing apparatus 110R requests the processing apparatus 110S to transmit an eDoc.

(5) The processing apparatus 110S transmits the eDoc to the processing apparatus 110R.

(6) The processing apparatus 110R provides the eDoc to a terminal of a transmission destination user.

(7) The terminal of the transmission destination user displays the eDoc.

(8) The transmitting person is notified that the eDoc is viewed at the transmission destination.

Hereinafter, a process content of each step will be described in more detail.

(1) The transmitting person gives a transmission instruction to the processing apparatus 110S.

In the example in FIG. 24, the transmitting person logs into the processing apparatus 110S in a local system 100S from a viewing terminal 104S thereof via a network in the local system 100S on the transmission side. The transmitting person selects a transmission target from a protected document (eDoc file) group preserved in the processing apparatus 110S, and gives an instruction for starting a transmission process. The transmitting person may give an instruction for starting a transmission process from the creation terminal 102 instead of the viewing terminal 104. In this case, in a case where a document created by the creation terminal 102 is registered in the processing apparatus 110S, the transmitting person may give an instruction for starting a transmission process for an eDoc generated due to registration of the document.

The processing apparatus 110S having received the starting instruction encrypts (that is, electronic signature) specifying information set thereof with a secret key thereof, so as to generate encrypted specifying information. Instead of the specifying information set, encrypted specifying information may be generated by encrypting a digest value (for example, a hash value) thereof with the secret key. The encrypted specifying information functions as an electronic signature of the processing apparatus 110S. The processing apparatus 110S sends an authentication request including the generated encrypted specifying information (that is, the electronic signature thereof) and a processing apparatus ID thereof to the management system 200.

The management system 200 performs an authentication process for the authentication request from the processing apparatus 110S. In the authentication process, the encrypted specifying information included in the authentication request is decrypted with a public key indicated by a public key certificate (this is held in the processing apparatus management server 240; the "security certificate information" in FIG. 6) of the processing apparatus 110S. It is determined whether or not a decryption result matches the specifying information set (or a digest value thereof) of the processing apparatus 110S held in the processing apparatus management server 240, and, in a case of matching, the authentication is successful, and, in a case of mismatching, authentication fails. In a case of an authentication failure, the management system 200 sends a notification indicating the authentication failure to the processing apparatus 110S on the transmission side, records a log indicating the authentication failure in a log server (not illustrated), and finishes the process. In a case of authentication success, the management system 200 sends information required to decrypt and authenticate a transmission request (will be described later) from the processing apparatus 110R on the reception side used by a destination user, to the processing apparatus 110S on the transmission side along with a notification of the authentication success. The information sent at this time includes, for example, identification information (for example, a processing apparatus ID, an IP address, or an FQDN) and a public key certificate of the processing apparatus 110R on the reception side.

The processing apparatus 110S on the transmission side having received the notification of the authentication success provides an UI screen (for example, configured with a web page) for condition designation to the viewing terminal 104S of the transmitting person. The viewing terminal 104S displays the UI screen, and receives input to each input field on the screen from the transmitting person.

The UI screen for condition designation includes an input field for a transmission destination of an eDoc. A transmission destination in this case is a user normally using another local system 100. Herein, it is assumed that a user (referred to as a receiving person) in the local system 100R on the reception side is designated as a destination. A transmission destination may be designated, for example, by inputting identification information of the receiving person known to the transmitting person, such as an electronic mail address or an employee number. Information regarding a user registered in the processing apparatus 110 in each local system 100 is held in the management system 200 (user ID server 210), and includes an electronic mail address of the user and other identification information. Therefore, in a case of inquiring of the management system 200, information such as a user ID of a user corresponding to the electronic mail address or a "predefined processing apparatus ID" (refer to FIG. 6) of the user may be acquired.

The UI screen for condition designation includes several fields for inputting tag information to be sent to the receiving person along with an eDoc to be transmitted. The tag is displayed in the same form as a tag attached to a cover or a specific page of the eDoc in a case where the eDoc is displayed in a transmission destination. The input fields regarding the tag information include, for example, a field for inputting a message (for example, a comment which the transmitting person wants to deliver to the receiving person) displayed in an image of the tag, a field for designating a form of the tag (for example, a shape of the tag such as a rectangular shape or a heart shape or a display color of the tag), and a field for designating whether or not the tag information is to be encrypted. The tag information is metadata (hereinafter, referred to as tag metadata) which is different from the above-described metadata defining authority to access an eDoc, and may be preserved or transmitted in correlation with the eDoc. The UI screen may include a field for designating whether or not the tag metadata is to be additionally registered in the metadata server 230 of the management system 200 (that is, preserved in the metadata server 230 even after transmission is finished). The user performs input on each input field on the UI screen, and instructs an eDoc which is initially selected to be transmitted. Authority to access the tag metadata attached to an eDoc may be set separately from authority (defined by the delivery destination information in FIG. 3, for example) to access the eDoc. Consequently, the transmitting person can perform designation in which a message content (a title or a comment) included in the tag metadata is viewed to a specific user among transmission destination users of the eDoc, and is not viewed to other users.

(2) The processing apparatus 110S on the transmission side requests transmission permission to the management system 200.

Figure 25:
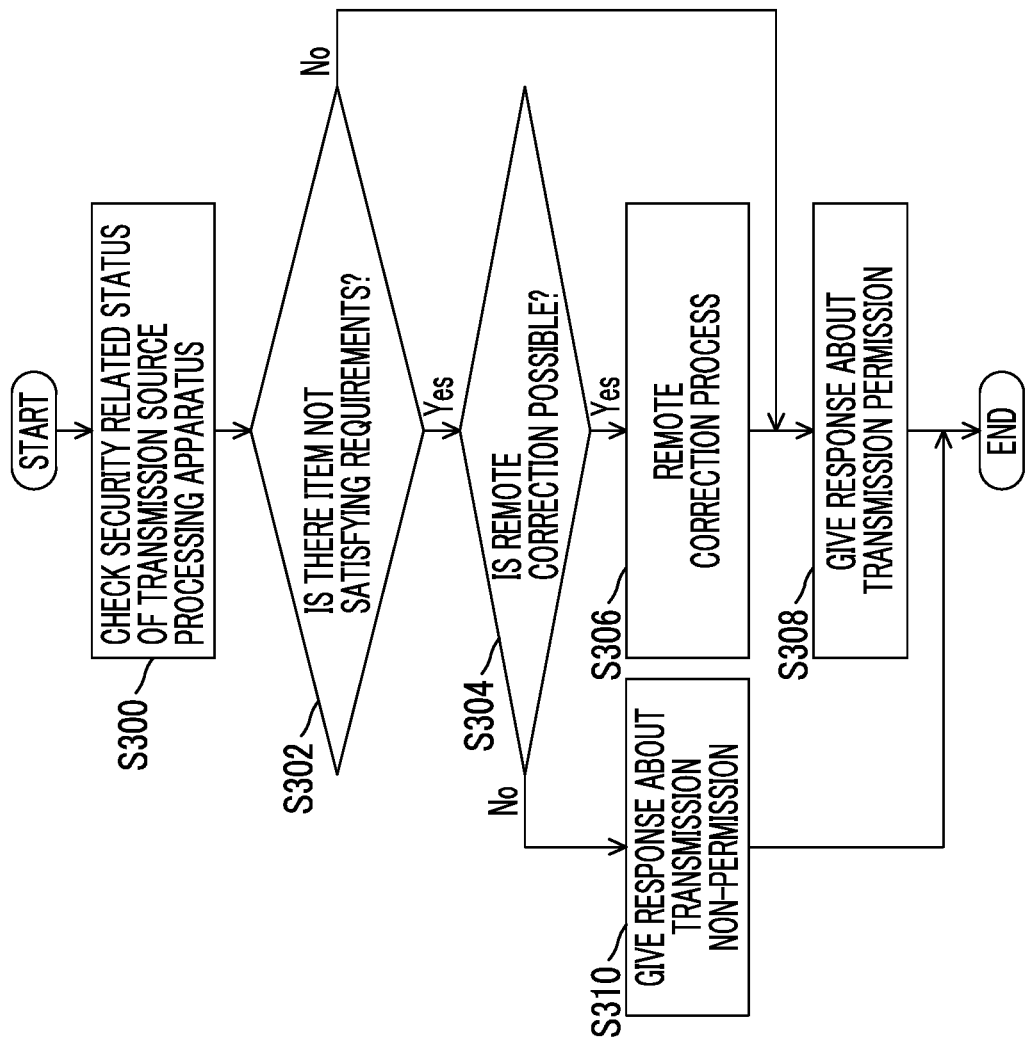
FIG. 25 is a diagram illustrating an example of a procedure of checking a security requirement for the transmission side processing apparatus, performed by the management system.

The processing apparatus 110S having received the transmission instruction from the viewing terminal 104S of the transmitting person requests permission of transmission of the eDoc to another processing apparatus 110 to the management system 200. In response to the request, the management system 200 determines whether or not a status of the processing apparatus 110S satisfies information security requirements (hereinafter, simply referred to as "security requirements") for transmitting an eDoc to another processing apparatus 110. In a case where the security requirements are satisfied, transmission to the processing apparatus 110S is permitted, and, in a case where the security requirements are not satisfied, transmission is inhibited. With reference to FIG. 25, a description will be made of an example of a transmission permission determination process in the management system 200.

In a case where a request for transmission permission is received from the processing apparatus 110S on the transmission side, the management system 200 examines values of items regarding eDoc transmission of a status (refer to FIG. 6) of the processing apparatus 110S managed by the processing apparatus management server 240 (S300), and determines whether or not there is an item not satisfying security requirements for eDoc transmission among the items (S302). In S302, the management system 200 may acquire predetermined items regarding at least the eDoc transmission of the latest status at that time from the processing apparatus 110S, and may determine whether or not there is an item not satisfying security requirements among the acquired items.

Here, determination target items may include, for example, a version of an operating system, a name and a version of encryption software, a name and a version of encode software, a security certificate installed in the processing apparatus 110, information (for example, identification information or the installation date and time of a key) regarding an encryption key (for example, a pair of a secret key and a public key, which is used for communication path encryption or signature) installed in the processing apparatus 110, a name and a version of firmware (FW) of an encode circuit, a version of virus check software, a version of virus definition data, and a setting state of the virus check software. Such items are related to security of a transmitted eDoc for the same reason as in the case of the procedure in FIG. 16, and thus it is checked whether or not the items satisfy security requirements for eDoc transmission. The security requirements in this case may be the same as or different from determination references in the procedure in FIG. 16. For example, in the present exemplary embodiment, there is a probability that a transmission target eDoc is sent to the processing apparatus 110R on the reception side via the Internet, and thus a security reference used for determination may be stricter than the determination reference in the procedure in FIG. 16.

In S302, it may be determined whether or not there is a transfer protocol satisfying security requirements for eDoc transmission among one or more transfer protocols installed in the processing apparatus 110S. Among the transfer protocols, there are ones subjected to transmission path encryption and others not subjected to the transmission path encryption, and, even in a case where the transmission path encryption is performed, available encryption methods and encryption parameters such as a key length are variously different from each other. Therefore, conditions for the types of transfer protocols, or encryption methods or encryption parameters used for the transfer protocols are defined as security requirements for permitting eDoc transmission, and it is determined in S302 whether or not the processing apparatus 110S on the transmission side has a transfer protocol satisfying the conditions. In a case where the processing apparatus 110S does not have any transfer protocol satisfying the conditions, a determination result in S302 is Yes (there is an item not satisfying the security requirements).

In a case where a determination result in S302 is No, that is, there is no item not satisfying the security requirements for eDoc transmission to another processing apparatus 110 among the items of the status of the processing apparatus 110S, the management system 200 gives a response about transmission permission to the processing apparatus 110S (S308).

In a case where a determination result in S302 is Yes, there are items (referred to as insufficient items) not satisfying the security requirements for eDoc transmission to another processing apparatus 110 among the items of the status of the processing apparatus 110S. In this case, the management system 200 determines whether or not correction for enabling the insufficient items to satisfy the security requirements is remotely possible from the management system 200 (S304). In a case where the remote correction of insufficient items is not technically possible, a determination result in S304 is No. For example, installation or update of the encryption software, the encode software, or the transfer protocol in the processing apparatus 110S may be technically remotely performed. However, even in a case where remote correction is technically possible, there is an item which is not permitted to be automatically remotely corrected without a prior notification by a manager on the user side (that is, the local system 100 side), and, thus, in a case where there is any item corresponding to an item of which automatic correction is not permitted among the insufficient items, a determination result in S304 is No. In a case where correction of all of the insufficient items is remotely and technically possible, and remote automatic correction is permitted by the user side, a determination result in S304 is Yes.

In a case where a determination result in S304 is Yes, the management system. 200 remotely corrects each insufficient item in the processing apparatus 110S (S306). After the correction is completed, a response about information indicating requested transmission is permitted is given to the processing apparatus 110S (S308).

As will be described later in detail, permission of transmission at this time is merely to permit a preparation process (a process illustrated in FIG. 26) required for transmission to be advanced, and is not to permit an encrypted document to be actually transmitted. After the permission, the preparation process is performed, and then the identical security requirements are checked for the transmission destination processing apparatus 110R (a process illustrated in FIG. 28). After it is checked that the processing apparatus 110R also satisfies the security requirements, actual transmission of an encrypted document is permitted for the first time.

In a case where a determination result in S304 is No, the management system 200 gives a response about information indicating that the requested transmission is not permitted to the processing apparatus 110S (S310). The processing apparatus 110S having received the response cancels transmission of the transmission target eDoc. The processing apparatus 110S displays a message indicating that transmission of the requested eDoc is not permitted for the reason of security on the viewing terminal 104S of the transmitting person. The processing apparatus 110S may notify the manager of the processing apparatus 110S of information indicating that transmission of the eDoc requested from the user is not permitted, and information regarding the reason (for example, an insufficient item) of the non-permission or correction for removing the non-permission. The manager determines whether or not correction for removing the non-permission is to be performed according to the notification.

Figure 26:
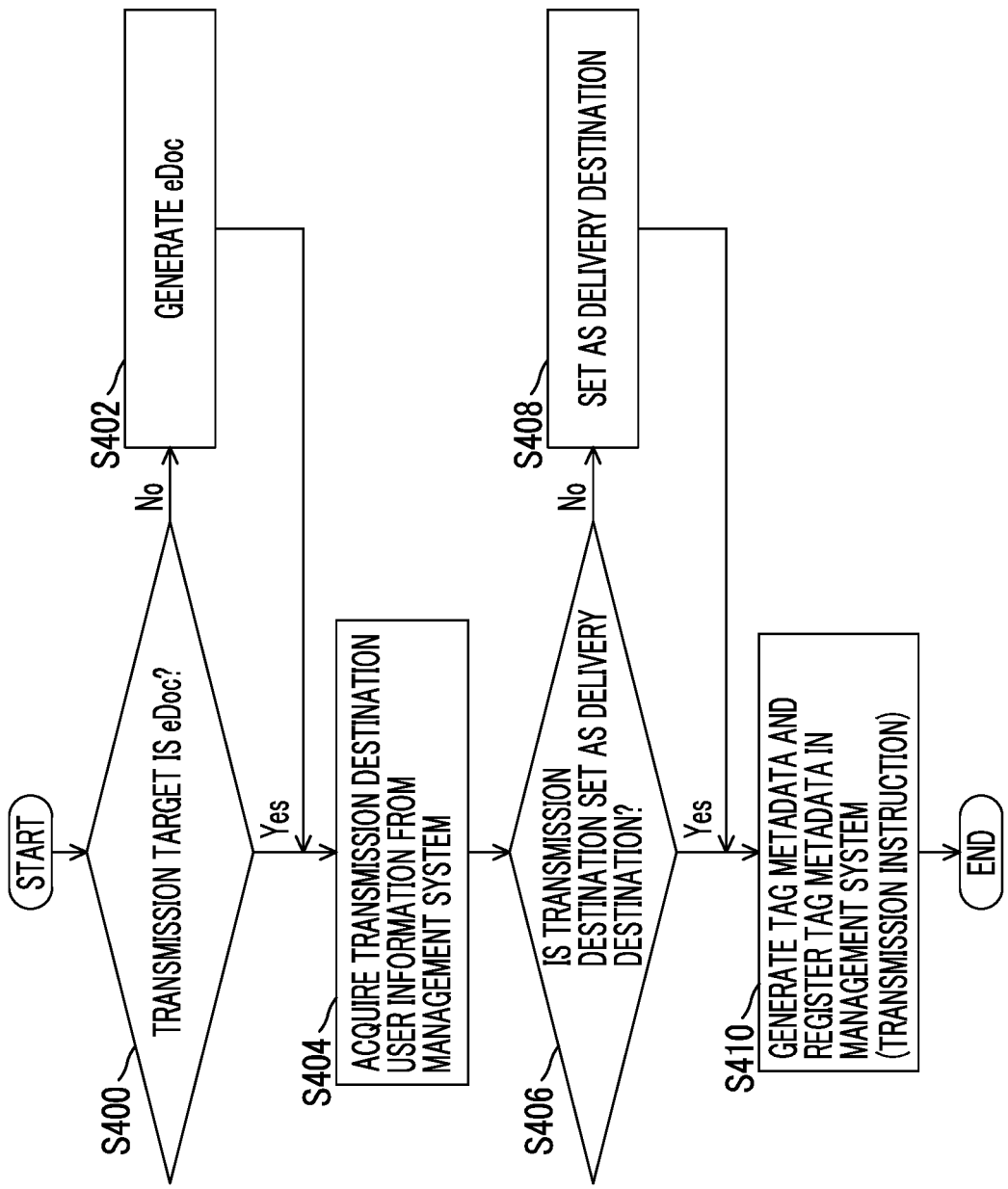
FIG. 26 is a diagram illustrating an example of a procedure of a transmission preparation process performed by the transmission side processing apparatus.

Security requirements used in the process in FIG. 26 may be appropriately set and changed on the management system 200 side according to a threat situation in a network such as the Internet.

In a case where permission is obtained from the management system 200 in S308, the processing apparatus 110S on the transmission side performs a preparation process illustrated in FIG. 26.

First, the processing apparatus 110S determines whether or not a document designated as a transmission target is an eDoc (S400). In a case where the document is not an eDoc (for example, in a case where a document created by the creation terminal 102 is instructed to be transmitted), the processing apparatus 110S encodes the document so as to generate an eDoc and preserve the eDoc (S402), and proceeds to S404. In a case where the designated transmission target is an eDoc, the processing apparatus 110S skips S402 and proceeds to S404.

Next, the processing apparatus 110S acquires user information (for example, a user ID or a predefined processing apparatus ID) corresponding to transmission destination information (for example, an electronic mail address) which is input by the transmitting person, from the management system 200 (S404). The processing apparatus 110S acquires metadata (refer to FIG. 3) of the transmission target eDoc, particularly, delivery destination information from the management system 200, and determines whether or not the transmission destination user is included in the delivery destination information as a delivery destination (S406). In a case where the transmission destination user is not included, the processing apparatus 110S adds the user ID of the transmission destination user to the delivery destination information of the management system (S408).

The processing apparatus 110S generates tag metadata according to tag information which is input by the transmitting person, and registers the generated tag metadata in the metadata server 230 in correlation with a DID of the eDoc (S410). In a case where encryption of the tag metadata is designated, encryption is performed, and then the tag metadata is registered in the metadata server 230. The encryption is performed by using, for example, a session key which is automatically generated. In a case where the encrypted tag metadata is sent to the transmission destination, the session key encrypted with a public key of the transmission destination user is also sent.

FIG. 27 exemplifies data items including tag metadata. The exemplified items include items set by the processing apparatus 110S on the transmission side, items set by the management system 200, and items set by the processing apparatus 110R on the reception side. Above all, a metadata number is identification information specific to the tag metadata, and is set by the management system 200. ID information of the processing apparatus 110R on the reception side is specified by the management system 200 on the basis of transmission destination information sent from the processing apparatus 110S on the transmission side, and is set in the tag metadata. A metadata type includes not only main metadata including delivery destination information (refer to FIG. 3) for managing authority to access an eDoc, but also several types of tag metadata such as tag metadata for eDoc transmission and types other than a tag. A transmission time is a time point at which the tag metadata and an eDoc attached with the tag metadata are instructed to be transmitted. An encryption flag is a flag designating whether or not the tag metadata is to be encrypted. An eDoc-ID is ID information (DID) of the eDoc attached with the tag metadata. Items such as the metadata type, the transmission time, the encryption flag, the eDoc-ID, an ID and other information of the processing apparatus 110S of the transmitting person or the transmission side, an ID and other information of the receiving person, and a title, a display content, a display color, or a shape of the tag are set by the processing apparatus 110S on the transmission side. A viewed flag is a flag indicating whether or not a transmission destination user has viewed the tag, and is set by the processing apparatus 110R on the reception side. A display state number is a number indicating a display state of the tag in a terminal of the transmission destination user, and is also set by the processing apparatus 110R on the reception side on the basis of a notification from the terminal. A response request flag is a flag indicating whether or not a response to a transmitted eDoc is requested to the transmission destination, and is set by the processing apparatus 110S on the transmission side on the basis of an input from the transmitting person.

The flow of the process in FIG. 24 will be continuously described.

(3) The management system 200 instructs the processing apparatus 110R on the reception side to start a reception process.

In a case where registration of the tag metadata for eDoc transmission is received from the processing apparatus 110S on the transmission side, the management system 200 performs an authentication process on the processing apparatus 110R on the reception side. In other words, the management system 200 requests the processing apparatus 110R to submit encrypted specifying information. In response to the request, the processing apparatus 110R generates encrypted specifying information by encrypting a specifying information set thereof (or a digest value thereof) with a secret key thereof, and sends the generated encrypted specifying information to the management system 200. The management system 200 decrypts the encrypted specifying information received from the processing apparatus 110R with a public key of the processing apparatus 110R. It is determined whether or not a decryption result matches the specifying information set (or a digest value thereof) of the processing apparatus 110R held in the processing apparatus management server 240, and, in a case of matching, the authentication is successful, and, in a case of mismatching, authentication fails. In a case of an authentication failure, the management system 200 records a log indicating the authentication failure in a log server (not illustrated). In this case, the management system 200 sends a notification of the authentication failure to the processing apparatus 110R, and also sends a notification indicating that authentication of the processing apparatus 110R on the reception side fails to the processing apparatus 110S on the transmission side.

In a case of authentication success, the management system 200 determines whether or not a status of the processing apparatus 110R satisfies security requirements for eDoc reception from another processing apparatus 110.

FIG. 28 exemplifies a procedure of a determination process on security requirements for the processing apparatus 110R.

In this procedure, the management system 200 examines items regarding the eDoc transmission (transfer) of the status (refer to FIG. 6) of the processing apparatus 110R on the reception side managed by the processing apparatus management server 240 (S500), and determines whether or not there is an item not satisfying security requirements for eDoc transmission among the items (S502). In S500 and S502, the management system 200 may acquire predetermined items regarding at least the eDoc transmission of the latest status at that time from the processing apparatus 110R, and may determine whether or not there is an item not satisfying security requirements among the acquired items.

The security requirements used as determination references here may be the same as the security requirements used for a determination in above step (2) for the processing apparatus 110S on the transmission side. However, a single difference is a requirement regarding a transfer protocol. In a case of the processing apparatus 110S on the transmission side, in a case where the processing apparatus 110S has one or more transfer protocols satisfying a certain condition, transmission is permitted, but, in a case of the processing apparatus 110R on the reception side, the processing apparatus 110R is required to have the same transfer protocols as the transfer protocols satisfying the condition of the processing apparatus 110S on the transmission side such that reception is permitted. In a case where such transfer protocols are not present in the processing apparatus 110R on the reception side, the security requirements regarding transfer protocols are not satisfied. In this case, in a case where such transfer protocols are able to be configured in the processing apparatus 110R through automatic installation or update from the remote management system 200 (that is, there is no need to obtain permission from the manager side of the processing apparatus 110R), the security requirements regarding transfer protocols may be satisfied. Conversely, in a case where automatic installation or update of the transfer protocols is not permitted, the security requirements regarding transfer protocols may not be satisfied.

In a case where a determination result in S502 is No, the management system 200 instructs the processing apparatus 110R to start an eDoc reception process (S508).

In a case where a determination result in S502 is Yes, there are insufficient items for the security requirements among the items of the status of the processing apparatus 110R. In this case, the management system 200 determines whether or not correction for enabling the insufficient items to satisfy the security requirements is remotely possible from the management system 200 (S504). In a case where the remote correction of insufficient items is not technically possible, or there is an item of which remote correction is not permitted by the manager of the processing apparatus 110R, a determination result in S504 is No. In a case where correction of all of the insufficient items is remotely and technically possible, and remote automatic correction is permitted by the user side, a determination result in S504 is Yes.

In a case where a determination result in S504 is Yes, the management system. 200 remotely corrects each insufficient item in the processing apparatus 110R (S506). After the correction is completed, the processing apparatus 110R is instructed to start the eDoc reception process (S508).

In a case where a determination result in S504 is No, the management system 200 sends a notification that reception of an eDoc is not permitted to the processing apparatus 110R on the reception side, and also sends a notification that transmission of the eDoc is not permitted to the processing apparatus 110S on the transmission side (S510). The processing apparatus 110S on the transmission side having received the notification cancels transmission of the transmission target eDoc. The processing apparatus 110S displays a message indicating that transmission of the requested eDoc is not permitted for the reason of security on the viewing terminal 104S of the transmitting person. The processing apparatus 110S may notify the manager of the processing apparatus 110S of information indicating that transmission of the eDoc requested from the user is not permitted, and information regarding the reason (for example, an insufficient item on the reception side) of the non-permission.

The reception process starting instruction sent from the management system. 200 to the processing apparatus 110R in S508 includes the tag metadata registered from the processing apparatus 110S on the transmission side. The reception process starting instruction may include not the whole tag metadata but only items thereof (for example, communication address information such as a processing apparatus ID and an IP address of the processing apparatus 110S on the transmission side, and a DID of a transmission target eDoc) required to request eDoc transmission to the processing apparatus 110S on the transmission side. The starting instruction includes transfer protocol information indicating one or more transfer protocols which satisfy security requirements for eDoc transmission and are held in common to the processing apparatuses 110S and 110R on the transmission side and the reception side.

FIG. 24 will be continuously described.

(4) The processing apparatus 110R requests the processing apparatus 110S to transmit an eDoc.

The processing apparatus 110R on the reception side having received the reception process starting instruction requests the processing apparatus 110S on the transmission side to transmit the transmission target eDoc by using information included in the starting instruction. The transmission request is made to a communication address of the processing apparatus 110S included in the information. The transmission request includes identification information (DID) of the transmission target eDoc included in the information. The transmission request includes transfer protocol information included in the information. The transfer protocol information is a list of transfer protocols which are selectable for transmission of the eDoc and satisfy security requirements. The transmission request includes a processing apparatus ID of the processing apparatus 110R on the reception side, a user ID of the receiving person, and the transmission time included in the tag metadata. Since there is a case where eDocs having an identical DID are sent to an identical receiving person (the transmission destination processing apparatus 110R and the transmission destination user) from the processing apparatus 110S on the transmission side at intervals a plurality of times, the transmission time information is included in the transmission request in order to specify an eDoc transmitted at which time.

(5) The processing apparatus 110S transmits the eDoc to the processing apparatus 110R.

The processing apparatus 110S on the transmission side having received the transmission request from the processing apparatus 110R on the reception side checks whether or not the transmission request relates to the eDoc which is instructed to be transmitted thereby. In other words, the processing apparatus 110S holds tag metadata for the eDoc which was instructed to be transmitted in the past thereby, and examines whether or not there is tag metadata matching a combination of a DID of the transmission target eDoc, a user ID of the receiving person, a processing apparatus ID of the processing apparatus 110R on the reception side included in the transmission request, and a transmission time among items thereof which are not transmitted to the processing apparatus 110R on the reception side. In a case where there is corresponding tag metadata, the processing apparatus 110 determines that the transmission request is authorized, and transmits a transmission target eDoc file to the processing apparatus 110R on the reception side by using a transfer protocol which is selected from the list of transfer protocols included in the transfer protocol information of the transmission request on the basis of a predetermined reference. During the transmission, in addition to encryption used by the transfer protocol to be used, the eDoc file may be encrypted with a public key of the receiving person.

The processing apparatus 110S on the transmission side and the processing apparatus 110R on the reception side respectively transmit pieces of log information indicating whether or not transmission and reception of the eDoc are successful, to the management system 200. The management system 200 records the received log information in a log server (not illustrated).

(6) The processing apparatus 110R provides the eDoc to the terminal of the transmission destination user.

The processing apparatus 110R having received the eDoc file transmitted from the processing apparatus 110S on the transmission side notifies the receiving person (indicated by the tag metadata corresponding to the eDoc file) that the eDoc file addressed to the receiving person has arrived. This notification is sent to the predefined viewing terminal 104S (a terminal designated in advance in the predefined viewing terminal list in FIG. 4) of the receiving person.

(7) The terminal of the transmission destination user displays the eDoc.

The receiving person viewing the notification that the eDoc file has arrived instructs the eDoc file to be opened on the viewing terminal 104R. In response to the instruction, in a case where the viewing terminal 104R acquires metadata (refer to FIG. 3) corresponding to the eDoc file, and confirms that a user ID of the receiving person is included in delivery destination information of the metadata, the eDoc file is decrypted by using key information in the metadata so as to be displayed on a screen. Consequently, the receiving person can view the eDoc file. In a case where the eDoc file is displayed, a tag image generated according to tag information in the tag metadata may be displayed, for example, in an aspect of being attached to a cover or the like of a document indicated by the eDoc file. The tag image is to display a title of the tag and comment text on the tag with a shape and a color indicated by the tag information. The viewing terminal 104R acquires access authority information set in the tag metadata from the management system 200, checks whether or not the reception destination user has access authority for the tag metadata on the basis of the information, and does not display the tag image in a case where there is no access authority.

(8) The transmitting person is notified that the eDoc is viewed at the transmission destination.

In a case where the received eDoc is displayed, the viewing terminal 104R of the receiving person sends a notification indicating a state in which the eDoc has been viewed to the processing apparatus 110R. This notification includes information regarding a time point (viewing time) at which the display is performed. The processing apparatus 110R having received the notification sends a notification (including the viewing time) indicating that the eDoc has been viewed to the management system 200 and the processing apparatus 110S on the transmission side. In response to the notification, the processing apparatus 110S on the transmission side sends a notification indicating that the transmitted eDoc has been viewed to the viewing terminal 104S of the transmitting person. The transmitting person views the notification on the viewing terminal 104S, and thus recognizes that the sent eDoc has been viewed. The management system. 200 and the processing apparatus 110S on the transmission side change the viewed flag in the tag metadata corresponding to the eDoc to "viewed" according to the notification indicating that the eDoc has been viewed.

As described above, in the present exemplary embodiment, an eDoc file is directly transmitted from the processing apparatus 110S on the transmission side to the processing apparatus 110R on the reception side in a peer-to-peer manner without using intermediate servers including the management system 200. Thus, an eDoc leakage risk is lower than in a method in which data is temporarily accumulated in an intermediate server from a transmission side, and a reception side acquires the data from the server. The eDoc file is transmitted to the viewing terminal 104R of the receiving person from the processing apparatus 110R via the local network 108 of the local system 100R. The local network 108 is protected from an external network such as the Internet by a firewall or the like, and thus a risk that an eDoc in the local system 100R on the reception side leaks to the outside is also low.

On the other hand, tag metadata and other metadata are registered in the management system 200, and may be referred to from various processing apparatuses 110 including the processing apparatus 110S on the transmission side and the processing apparatus 110R on the reception side. Therefore, for example, when the transmission destination user goes to a place where another processing apparatus 110 which is different from the processing apparatus 110R is present, the viewing terminal 104R of the user may access another processing apparatus 110, recognizes that there is an eDoc file transmitted from the transmitting person on the basis of metadata or tag metadata (including an ID of the transmission destination user as a delivery destination or a transmission destination) of the eDoc, and download the eDoc file via another processing apparatus 110.

In the present exemplary embodiment, an eDoc is transmitted between the processing apparatus 110S on the transmission side and the processing apparatus 110R on the reception side only in a case where both of the apparatuses satisfy security requirements for transmission of the eDoc. Therefore, the eDoc is not transmitted in a state in which security is low (for example, a state in which transmission path encryption in a sufficient intensity is not performed).

In the flow of the process described with reference to FIG. 24, first, it is determined whether or not the transmission source processing apparatus 110S satisfies security requirements for eDoc transmission, and, in a case where it is determined that the security requirements are satisfied, it is determined whether or not the transmission destination processing apparatus 110R satisfies security requirements. However, this flow is only an example. In a case where the transmission source processing apparatus 110S sends tag metadata (refer to FIG. 27) including information regarding the processing apparatus 110S and the transmission destination processing apparatus 110R to the management system 200, the management system 200 determines whether or not each of the processing apparatuses 110S and 110R satisfies security requirements. In a case where it is determined that either of the two apparatuses does not satisfy the security requirements (that is, this may not be handled by remote correction), the management system 200 may send a notification indicating that eDoc transmission related to the tag metadata is not permitted to the processing apparatus 110S (and the processing apparatus 110R).

In the above example, the processing apparatus 110R on the reception side acquires information (included in tag metadata) regarding the processing apparatus 110S on the transmission side from the management system 200, and downloads a target eDoc from the processing apparatus 110S on the transmission side by using the information. However, this is only an example. Alternatively, the processing apparatus 110S on the transmission side may acquire information such as a processing apparatus ID or a communication address of the processing apparatus 110R on the reception side from the management system 200, and may transmit an eDoc to the processing apparatus 110R on the reception side by using the information. In this case, before transmission of the eDoc is started, the management system 200 may send tag metadata to the processing apparatus 110R on the reception side, and, in a case where the eDoc is transmitted from the processing apparatus 110S on the transmission side, the processing apparatus 110R may check whether or not a processing apparatus ID of the transmission source or a DID of the transmitted eDoc matches a value of a corresponding item of the received tag metadata. In a case of mismatching, the processing apparatus 110R may not receive the eDoc.

Each apparatus such as the creation terminal 102, the viewing terminal 104, the processing apparatuses 110, 110S, and 110R, the local user ID server 152, the local DID server 154, the local metadata server 156, the user ID server 210, the DID server 220, the metadata server 230, and the processing apparatus management server 240 is realized by causing a computer to execute a program for realizing a function of each apparatus. Here, the computer has a circuit configuration in which, for example, as hardware, a microprocessor such as a CPU, a controller controlling memories (primary storages) such as a random access memory (RAM) and a read only memory (ROM), and a fixed storage device such as a flash memory, a solid state drive (SSD), or a hard disk drive (HDD), various input/output (I/O) interfaces, and a network interface controlling connection to a network such as a local area network, are connected to each other via, for example, a bus. A program in which a process content of each function is described is preserved in a fixed storage device such as a flash memory via a network, and is installed in the computer. The program stored in the fixed storage device is read to the RAM, and is executed by the microprocessor such as a CPU such that the above-described functional module group is realized.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system comprising:
a first apparatus; a second apparatus; and a management apparatus,
wherein the first apparatus includes
a first memory that stores an encrypted document,
a first processor that notifies the management apparatus, via a first input/output device, of a first state of the first apparatus regarding information security requirements,
the first processor that sends, via the first input/output device, information for specifying the first apparatus which is a transmission source and information for specifying the second apparatus which is a transmission destination to the management apparatus, and requests transmission permission to the management apparatus, and
the first processor transmits, via the first input/output device, the encrypted document to the second apparatus in a case where the transmission permission is obtained from the management apparatus in response to the request,
wherein the second apparatus includes
a second processor that notifies the management apparatus, via a second input/output device, of a second state of the second apparatus regarding the information security requirements, and
receives, via the second input/output device, the encrypted document from the first apparatus in a case where the transmission permission is obtained from the management apparatus in response to the request, and
wherein the management apparatus includes
a third processor that issues the transmission permission for transmission of the encrypted document from the first apparatus to the second apparatus in a case where both the first state sent from the first apparatus and the second state sent from the second apparatus satisfy the information security requirements in response to the request for transmission permission from the first apparatus, wherein the first processor of the first apparatus sends, to the management apparatus, additional information including information for specifying the first apparatus, information for specifying the second apparatus, and document identification information of the encrypted document which is a transmission target, and also stores the additional information in the first memory, wherein the third processor of the management apparatus transmits the additional information from the first apparatus to the second apparatus in a case where the transmission permission is issued, wherein the second processor of the second apparatus sends a transmission request including the document identification information of the encrypted document to the first apparatus by using the additional information received from the management apparatus, and receives the encrypted document transmitted from the first apparatus in response to the transmission request, and wherein, in a case where the transmission permission is obtained from the management apparatus, the first processor of the first apparatus transmits the encrypted document corresponding to the document identification information to the second apparatus in a case where a transmission request including the document identification information indicated by the additional information is received from the second apparatus indicated by the stored additional information.

2. The information processing system according to claim 1,
wherein the third processor of the management apparatus performs correction and then issues the transmission permission in a case where the first apparatus and the second apparatus are able to satisfy the information security requirements through the correction from the management apparatus.

3. The information processing system according to claim 1
wherein the additional information further includes comment information from a transmitting person for the encrypted document corresponding to the additional information,
wherein the first processor of the first apparatus is further configured to
receive, via the first input/output device, setting of access authority for the encrypted document and setting of access authority for the additional information, and
register information regarding the access authority for the encrypted document and information regarding the access authority for the additional information in the management apparatus,
wherein the third processor of the management apparatus is further configured to
provide the information regarding the access authority for the encrypted document and the information regarding the access authority for the additional information registered from the first apparatus, to the second apparatus, and
wherein the second processor of the second apparatus is further configured to
control access to each of the encrypted document and the additional information by referring to the information regarding the access authority for the encrypted document and the information regarding the access authority for the additional information provided from the management apparatus.

4. The information processing system according to claim 2,
wherein the additional information further includes comment information from a transmitting person for the encrypted document corresponding to the additional information,
wherein the first processor of the first apparatus is further configured to
separately receive, via the first input/output device, setting of access authority for the encrypted document and setting of access authority for the additional information, and
register information regarding the access authority for the encrypted document and information regarding the access authority for the additional information in the management apparatus,
wherein the third processor of the management apparatus is further configured to
provide the information regarding the access authority for the encrypted document and the information regarding the access authority for the additional information registered from the first apparatus, to the second apparatus, and
wherein the second processor of the second apparatus is further configured to
control access to each of the encrypted document and the additional information by referring to the information regarding the access authority for the encrypted document and the information regarding the access authority for the additional information provided from the management apparatus.

5. The information processing system according to claim 1,
wherein the additional information is transmitted to the management apparatus, and the encrypted document is not transmitted to the management apparatus.

6. The information processing system according to claim 2,
wherein the additional information is transmitted to the management apparatus, and the encrypted document is not transmitted to the management apparatus.

7. The information processing system according to claim 3,
wherein the additional information is transmitted to the management apparatus, and the encrypted document is not transmitted to the management apparatus.

8. The information processing system according to claim 4,
wherein the additional information is transmitted to the management apparatus, and the encrypted document is not transmitted to the management apparatus.

9. The information processing system according to claim 1,
wherein the management apparatus holds information regarding a user registered in each of a plurality of processing apparatuses including the first apparatus and the second apparatus,
wherein, in a case where a transmission instruction in which a transmission destination user and a transmission target encrypted document are specified is received from a user registered in the first apparatus, the first apparatus sends the transmission destination user to the management apparatus as information for specifying the second apparatus, and
wherein the management apparatus specifies the processing apparatus in which the transmission destination user is registered as the second apparatus among the plurality of processing apparatuses by using the held information.

10. The information processing system according to claim 2,
wherein the management apparatus holds information regarding a user registered in each of a plurality of processing apparatuses including the first apparatus and the second apparatus,
wherein, in a case where a transmission instruction in which a transmission destination user and a transmission target encrypted document are specified is received from a user registered in the first apparatus, the first apparatus sends the transmission destination user to the management apparatus as information for specifying the second apparatus, and
wherein the management apparatus specifies the processing apparatus in which the transmission destination user is registered as the second apparatus among the plurality of processing apparatuses by using the held information.

11. The information processing system according to claim 1,
wherein the management apparatus holds information regarding a user registered in each of a plurality of processing apparatuses including the first apparatus and the second apparatus,
wherein, in a case where a transmission instruction in which a transmission destination user and a transmission target encrypted document are specified is received from a user registered in the first apparatus, the first apparatus sends the transmission destination user to the management apparatus as information for specifying the second apparatus, and
wherein the management apparatus specifies the processing apparatus in which the transmission destination user is registered as the second apparatus among the plurality of processing apparatuses by using the held information.

12. The information processing system according to claim 2,
wherein the management apparatus holds information regarding a user registered in each of a plurality of processing apparatuses including the first apparatus and the second apparatus,
wherein, in a case where a transmission instruction in which a transmission destination user and a transmission target encrypted document are specified is received from a user registered in the first apparatus, the first apparatus sends the transmission destination user to the management apparatus as information for specifying the second apparatus, and
wherein the management apparatus specifies the processing apparatus in which the transmission destination user is registered as the second apparatus among the plurality of processing apparatuses by using the held information.

13. The information processing system according to claim 3,
wherein the management apparatus holds information regarding a user registered in each of a plurality of processing apparatuses including the first apparatus and the second apparatus,
wherein, in a case where a transmission instruction in which a transmission destination user and a transmission target encrypted document are specified is received from a user registered in the first apparatus, the first apparatus sends the transmission destination user to the management apparatus as information for specifying the second apparatus, and
wherein the management apparatus specifies the processing apparatus in which the transmission destination user is registered as the second apparatus among the plurality of processing apparatuses by using the held information.

14. The information processing system according to claim 9,
wherein, in a case where transmission permission is obtained from the management apparatus in response to the request, the first processor of the first apparatus transmits the encrypted document to the second apparatus in a peer-to-peer manner, and
wherein the second apparatus provides the encrypted document received by the second processor from the first apparatus, to the transmission destination user via a local network connected to the second apparatus.

15. An information processing apparatus comprising:
a first memory;
a first input/output device; and
a first processor communicatively coupled to the first memory and the first input/output device, wherein the first processor is configured to:
notify a management apparatus, via the first input/output device, of a first state of the information processing apparatus regarding information security requirements,
send, via the first input/output device, information for specifying the information processing apparatus which is a transmission source and information for specifying a transmission destination apparatus to the management apparatus, and request& transmission permission to the management apparatus, and
transmit, via the first input/output device, an encrypted document to the transmission destination apparatus in a case where transmission permission is obtained from the management apparatus in response to the request for transmission permission, wherein transmission permission for transmission of the encrypted document is issued by the management apparatus in a case where both the first state and the second state satisfy the information security requirements,
wherein the first processor of the information processing apparatus sends, to the management apparatus, additional information including information for specifying the information processing apparatus, information for specifying the transmission destination apparatus, and document identification information of the encrypted document which is a transmission target, and also stores the additional information in the first memory,
wherein a third processor of the management apparatus transmits the additional information from the information processing apparatus to the transmission destination apparatus in a case where the transmission permission is issued,
wherein a second processor of the transmission destination apparatus sends a transmission request including the document identification information of the encrypted document to the information processing apparatus by using the additional information received from the management apparatus, and receives the encrypted document transmitted from the information processing apparatus in response to the transmission request, and wherein, in a case where the transmission permission is obtained from the management apparatus, the first processor of the information processing apparatus transmits the encrypted document corresponding to the document identification information to the transmission destination apparatus in a case where a transmission request including the document identification information indicated by the additional information is received from the transmission destination apparatus indicated by the stored additional information.

16. The information processing apparatus according to claim 15,
wherein the additional information further includes comment information from a transmitting person for the encrypted document corresponding to the additional information,
wherein the first processor of the information processing apparatus is further configured to
receive setting of access authority for the encrypted document and setting of access authority for the additional information, and
register information regarding the access authority for the encrypted document and information regarding the access authority for the additional information in the management apparatus, so that the transmission destination apparatus controls access to each of the encrypted document and the additional information by referring to the information regarding the access authority for the encrypted document and the information regarding the access authority for the additional information.

17. A non-transitory computer readable medium storing a program, when executed by a first processor within a computer causes the first processor to:
notify a management apparatus of a first state of the computer regarding information security requirements;
send information for specifying the computer which is a transmission source and information for specifying a transmission destination apparatus to the management apparatus, and requests transmission permission to the management apparatus; and
transmit an encrypted document to the transmission destination apparatus in a case where transmission permission is obtained from the management apparatus in response to the request for transmission permission, wherein transmission permission for transmission of the encrypted document is issued by the management apparatus in a case where both the first state and the second state satisfy the information security requirements,
wherein the first processor of the computer sends, to the management apparatus, additional information including information for specifying the transmission source computer, information for specifying the transmission destination apparatus, and document identification information of the encrypted document which is a transmission target, and also stores the additional information in the first memory,
wherein a third processor of the management apparatus transmits the additional information from the computer to the transmission destination apparatus in a case where the transmission permission is issued,
wherein a second processor of the transmission destination apparatus sends a transmission request including the document identification information of the encrypted document to the computer by using the additional information received from the management apparatus, and receives the encrypted document transmitted from the computer in response to the transmission request, and
wherein, in a case where the transmission permission is obtained from the management apparatus, the first processor of the computer transmits the encrypted document corresponding to the document identification information to the transmission destination apparatus in a case where a transmission request including the document identification information indicated by the additional information is received from the transmission destination apparatus indicated by the stored additional information.

* * * * *